(12) United States Patent
Miyazaki et al.

(10) Patent No.: US 8,195,713 B2
(45) Date of Patent: Jun. 5, 2012

(54) INFORMATION LIFE-CYCLE MANAGEMENT SYSTEM, INFORMATION MANAGEMENT SERVER APPARATUS, ELECTRONIC MEDIA CONTROL APPARATUS, AND STORAGE MEDIUM

(75) Inventors: Shingo Miyazaki, Fuchu (JP); Minako Ogawa, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 124 days.

(21) Appl. No.: 12/852,111

(22) Filed: Aug. 6, 2010

(65) Prior Publication Data

US 2010/0318581 A1    Dec. 16, 2010

Related U.S. Application Data

(63) Continuation of application No. PCT/JP2009/052089, filed on Feb. 6, 2009.

(30) Foreign Application Priority Data

Feb. 7, 2008 (JP) ................................ 2008-027776

(51) Int. Cl.
  *G06F 7/00* (2006.01)
(52) U.S. Cl. ............. 707/803; 707/809; 705/28; 705/51
(58) Field of Classification Search ........... 707/999.102, 707/662, 694, 803, 809; 705/28, 51
See application file for complete search history.

(56) References Cited

U.S. PATENT DOCUMENTS

| 5,978,581 | A  | * | 11/1999 | Sadiq et al. | .................. | 717/104 |
| 7,680,830 | B1 | * | 3/2010 | Ohr et al. | .................. | 707/999.2 |
| 7,747,579 | B2 | * | 6/2010 | Prahlad et al. | ................ | 707/672 |
| 2004/0167829 | A1 |  | 8/2004 | Fujita |  |  |
| 2005/0171914 | A1 |  | 8/2005 | Saitoh |  |  |
| 2006/0010150 | A1 | * | 1/2006 | Shaath et al. | ................. | 707/102 |

FOREIGN PATENT DOCUMENTS

| JP | 2004-102627 | 4/2004 |
| JP | 2005-190365 | 7/2005 |
| JP | 2005-259108 | 9/2005 |
| JP | 2007-88796 | 4/2007 |
| WO | WO 02-065222 | 8/2002 |

OTHER PUBLICATIONS

Ubiquitous ID center homepage, http://www.uicenter.org/japanese.html, http://www.uidcenter.org/index-en.html, 6 pages, downloaded Aug. 2, 2010.

(Continued)

*Primary Examiner* — Hosain Alam
*Assistant Examiner* — Jieying Tang
(74) *Attorney, Agent, or Firm* — Oblon, Spivak, McClelland, Maier & Neustadt, L.L.P.

(57) ABSTRACT

In one embodiment of the present invention, the information management server apparatus includes an information management relation DB which stores the issued management ID and forming time and date information, user information, a medium type, a use limitation policy, and information management server information in a header portion of the copied management file in association with each other with respect to a management ID of a management file in management file copying request information. The electronic medium control apparatus requests an electronic copying of the management file. The management file is managed in the information management relation DB.

9 Claims, 42 Drawing Sheets

OTHER PUBLICATIONS

EPC global homepage, http://www.epcglobalinc.org/home, 2 pages, downloaded Aug. 2, 2010.

International Preliminary Report on Patentability issued Sep. 16, 2010 in International Application No. PCT/JP2009/052089 (English Translation).

Extended European Search Report issued Apr. 27, 2011, in Application No. / Patent No. 09708939.5-2221 / 2254078 PCT/JP2009052089.

EPO: "Mitteilung des Europaischen Patentamts vom 1. Oktober 2007 über Geschäftsmethoden = Notice from European Patent Office dated Oct. 1, 2007 concerning business methods = Communiqué de L'Office européen des brevets, en date du 1 er octobre 2007, concernant les méthodes dans le domaine des activités" Nov. 1, 2007 Journal Officiel De L'Office Europeen des Brevets . Official Journal of the European Patent, Office. AMTSBLATTT Des Europaeischen Patentamts, OEB, Munchen, DE, pp. 592-593, XP007905525 ISSN: 0170-9291.

Ubiquitous ID center homepage, http://www.uicenter.org/japanese.html, http://www.uidcenter.org/index-en.html, 6 pages.

EPC global homepage, http://www.epcglobalinc.org/home, 2 pages.

\* cited by examiner

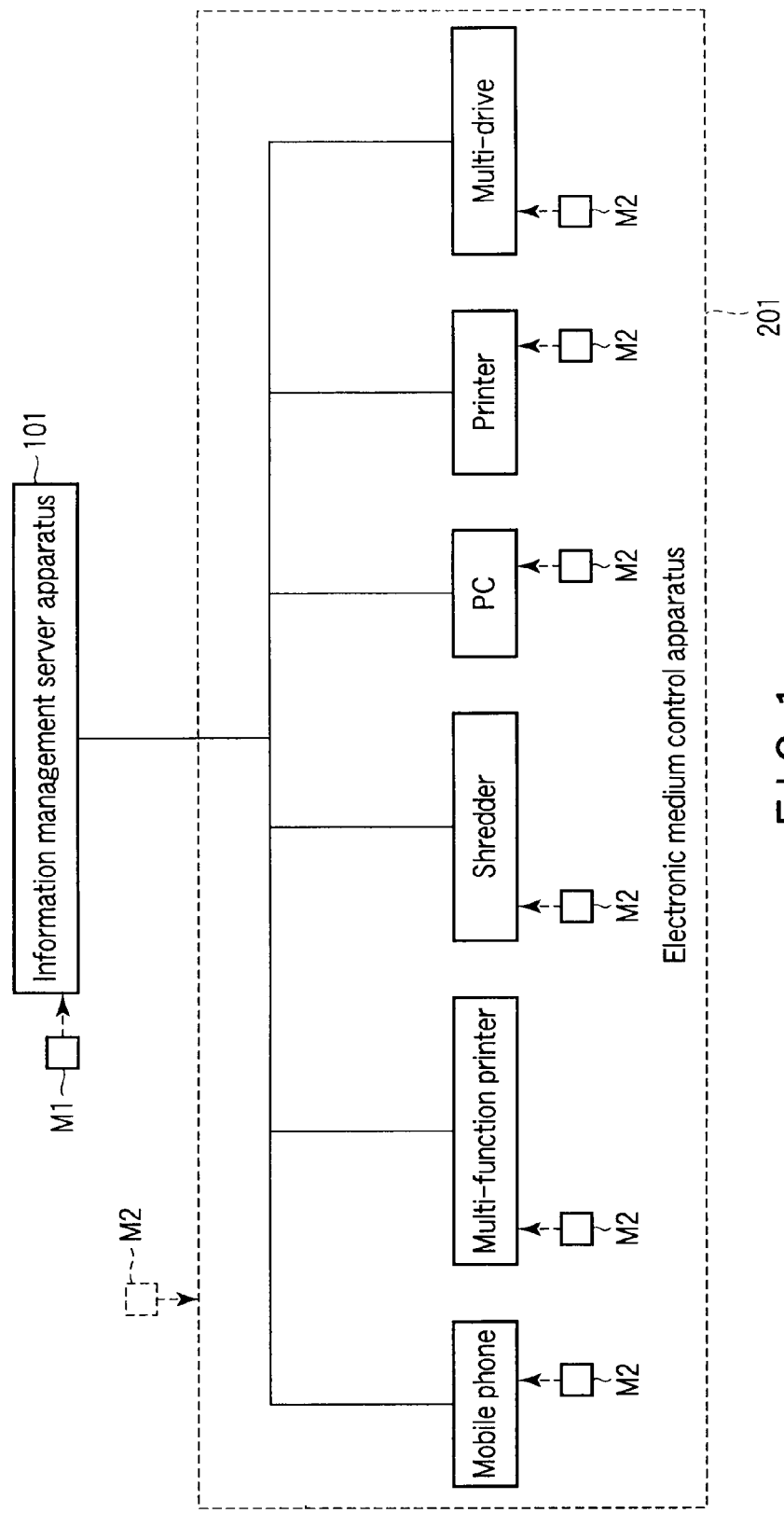
F I G. 1

| Management file | | |
|---|---|---|
| | Header portion | |
| | | Management ID of the electronic data |
| | | Management ID of parent information medium |
| | | File information (including file type, alive information, and former information) |
| | | File storage information (information related to encryption) |
| | | Use limitation policy |
| | | Information management server information |
| | Body portion | |
| | | Electronic data body (or encrypted electronic data body) |
| | Authentication data portion | |
| | | Authentication data |

FIG. 3

| Type of information medium of parent information | New registration (parent) | Copy of information (child, grandchild) | | | Discarding |
|---|---|---|---|---|---|
| | | Management ID / Electronic data | Paper medium / Management ID | Recording media / Management ID | |
| Management ID / Electronic data | Configuration 1 [PC : new] Configuration 8 [PC : existing ID registration] | Configuration 1 [PC] | Configuration 2 [Copying machine] Configuration 3 (PC leads) | Configuration 7 [Media drive with ID reader] | Configuration 1 [PC] |
| Paper medium / Management ID | Configuration 8 [ID reader : existing ID registration] | Configuration 4 [Scanner] | Configuration 5 [Copying machine] | — | Configuration 8 [Paper shredder] |
| Recording media / Management ID | Configuration 9 [Media drive with ID reader] | Configuration 9 [Media drive with ID reader] | Configuration 10 [Media drive with ID reader/writer] | Configuration 11 [Media drive with ID reader/writer] | Configuration 12 [Media shredder] |

Temporary conversion into electronic data

F I G. 4

| Management ID | Issuing time and date | Issuing request source information | Expiration date | Invalidation request source information |
|---|---|---|---|---|
| 1000101 | yyyy/mm/dd | Apparatus A (ip:10.xxx.xx.x) | — | — |
| 1001101 | yyyy/mm/dd | Apparatus A (ip:10.xxx.xx.x) | — | — |
| 1001102 | yyyy/mm/dd | Apparatus A (ip:10.xxx.xx.x) | — | — |
| 1001201 | yyyy/mm/dd | Apparatus A (ip:10.xxx.xx.x) | — | — |
| 1001301 | yyyy/mm/dd | MFP X (ip:10.xxx.xx.x) | yyyy/mm/dd | — |
| 1002101 | yyyy/mm/dd | Apparatus A (ip:10.xxx.xx.x) | yyyy/mm/dd | MFP X (ip:10.xxx.xx.x) |

Management ID management DB 121

F I G. 6

Management file management table

| Management ID | Status | Header portion information | Management file substance |
|---|---|---|---|
| 1000101 | In browsing | alive (2007/04/22~) | 1000101.ilc |
| 1001101 | — | dead (2007/06/12~2007/09/17) | — |
| 1010101 | Usable | alive (2007/05/19~) | 1001102.ilc |
| 1020101 | Usable | alive (2007/06/11~) | 1001201.ilc |
| 1030101 | — | dead (2007/07/30~2007/09/27) | — |

Access log table

| Time and date | Operation type | User information | Management ID | Management file name |
|---|---|---|---|---|
| 2007/04/22 10:22 | Log-in | alice | — | — |
| 2007/04/22 11:23 | New registration | alice | 1000101 | 1000101.ilc |
| 2007/04/22 16:03 | Log-out | alice | — | — |
| ... | ... | ... | ... | ... |
| 2007/09/27 15:32 | Browse | bob | 1030101 | 1030101.ilc |
| 2007/09/27 15:41 | Erase | bob | 1030101 | 1030101.ilc |
| ... | ... | ... | ... | ... |

Management client DB

F I G. 9

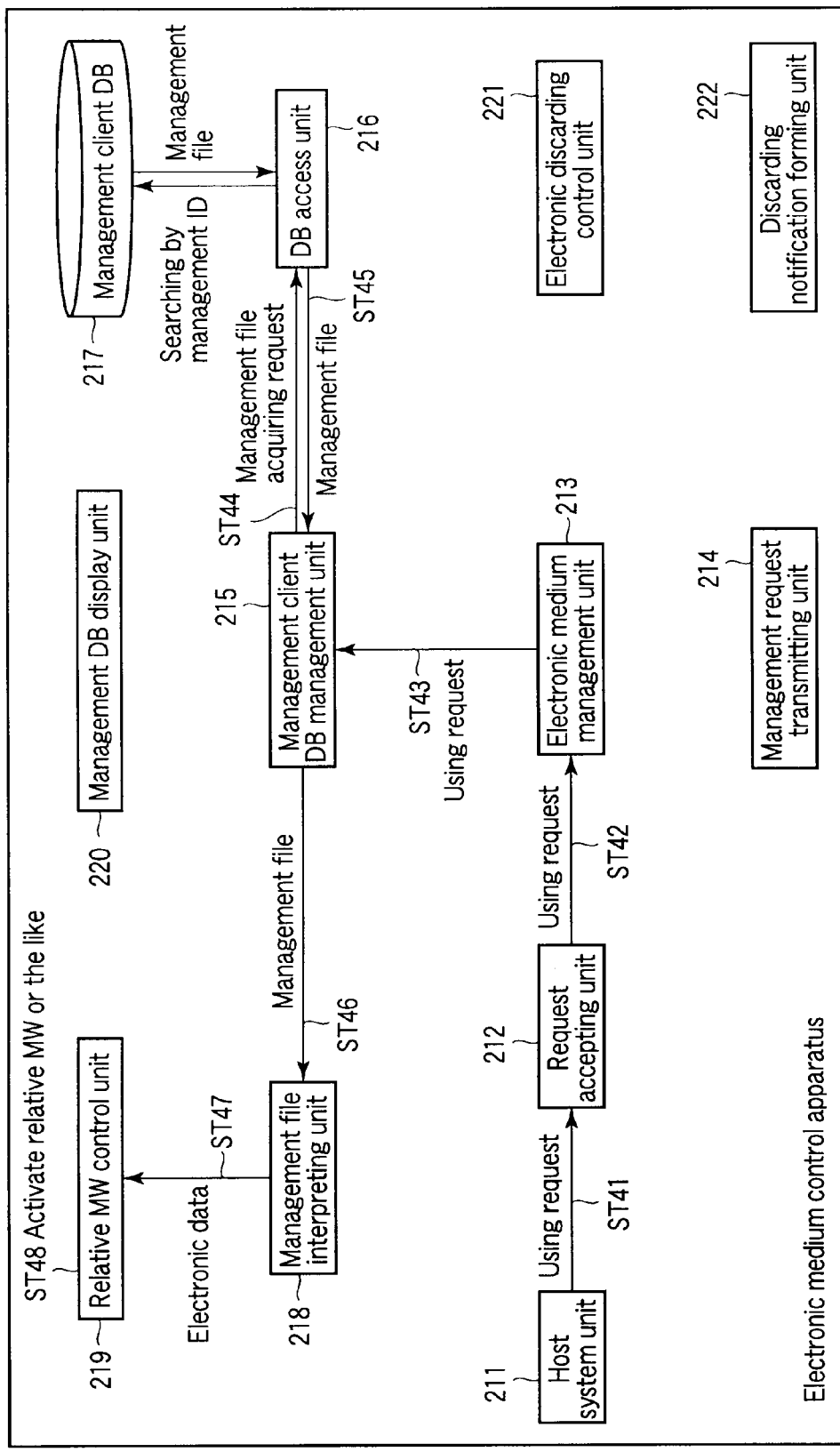
F I G. 12

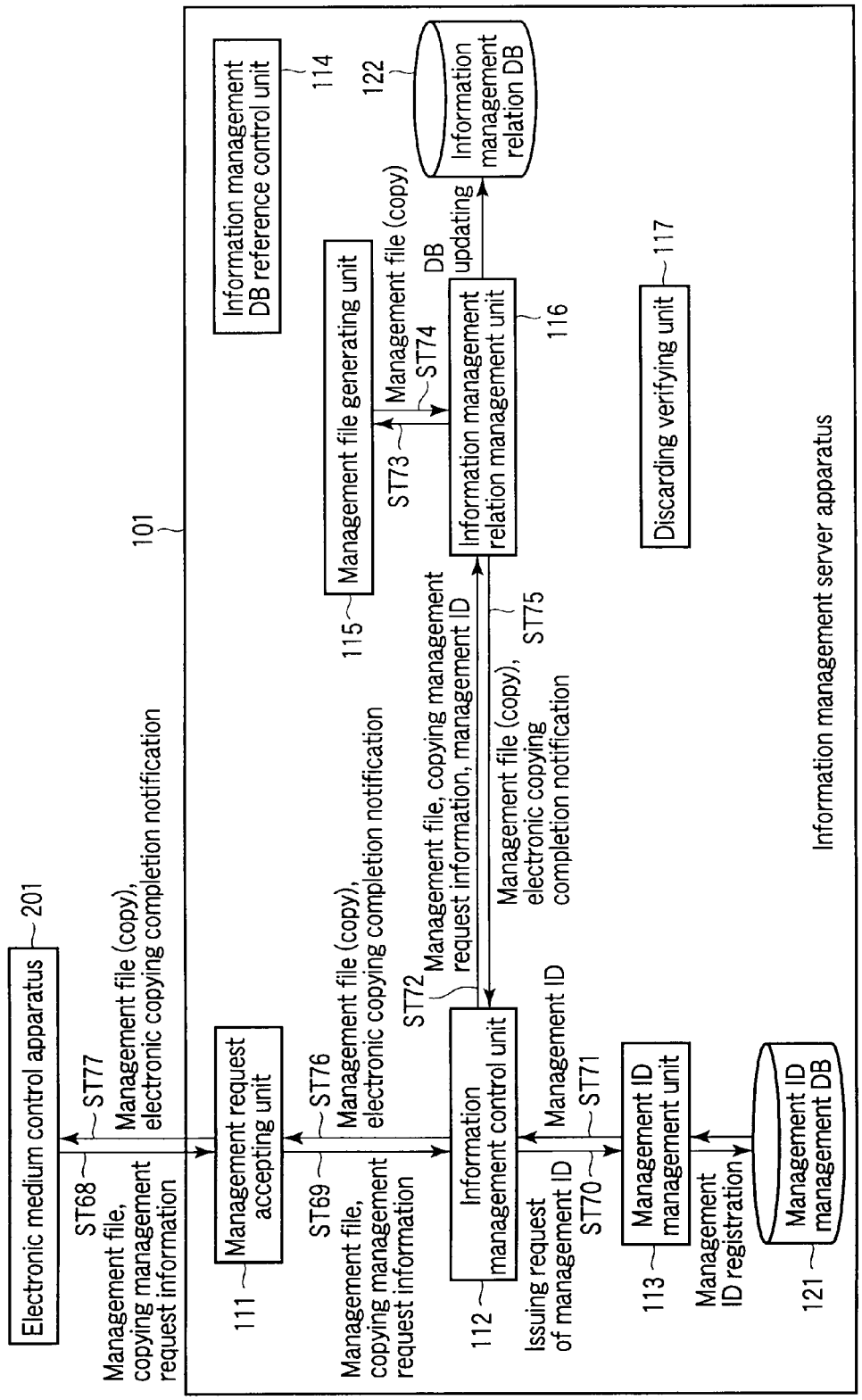
F I G. 14

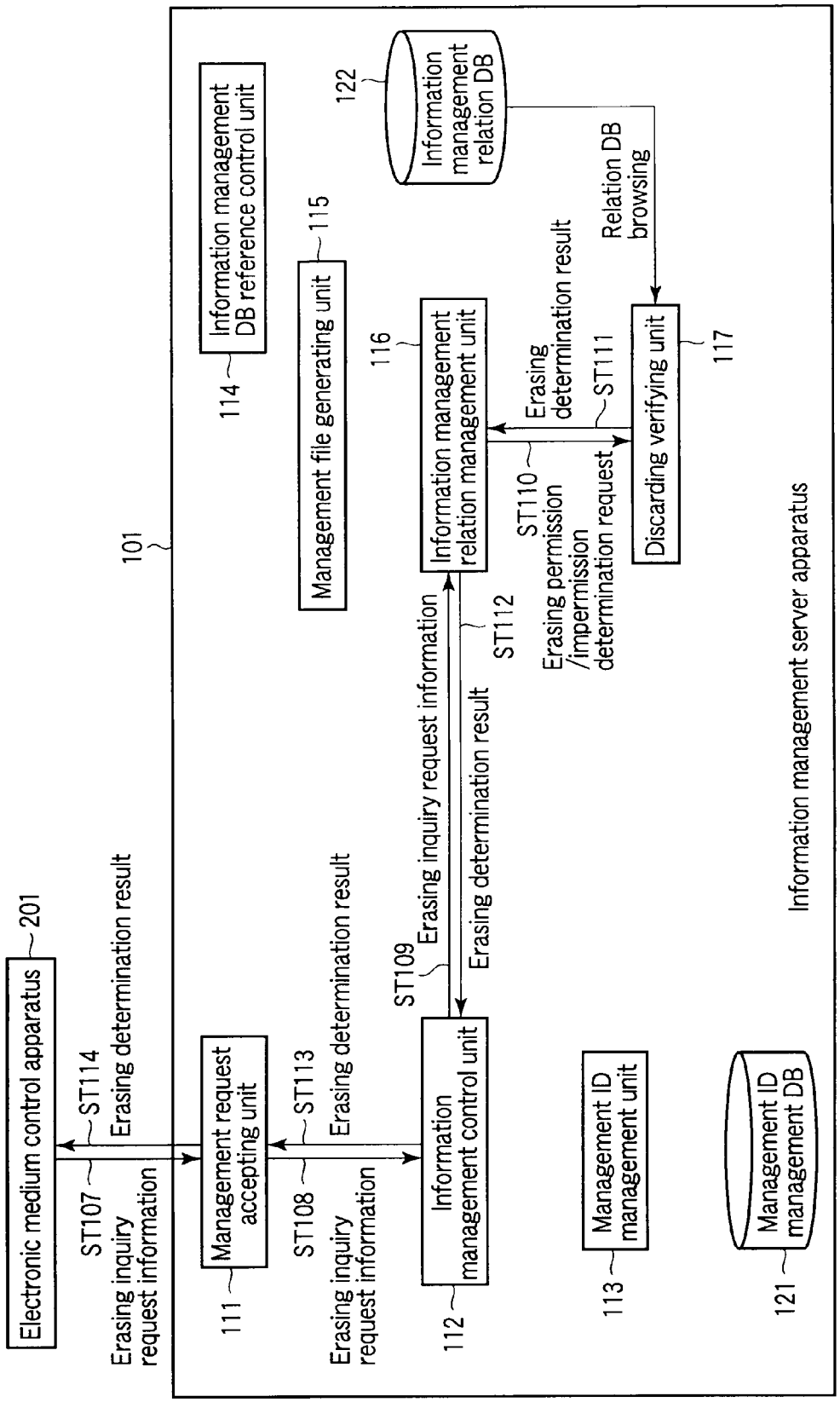
F I G. 17

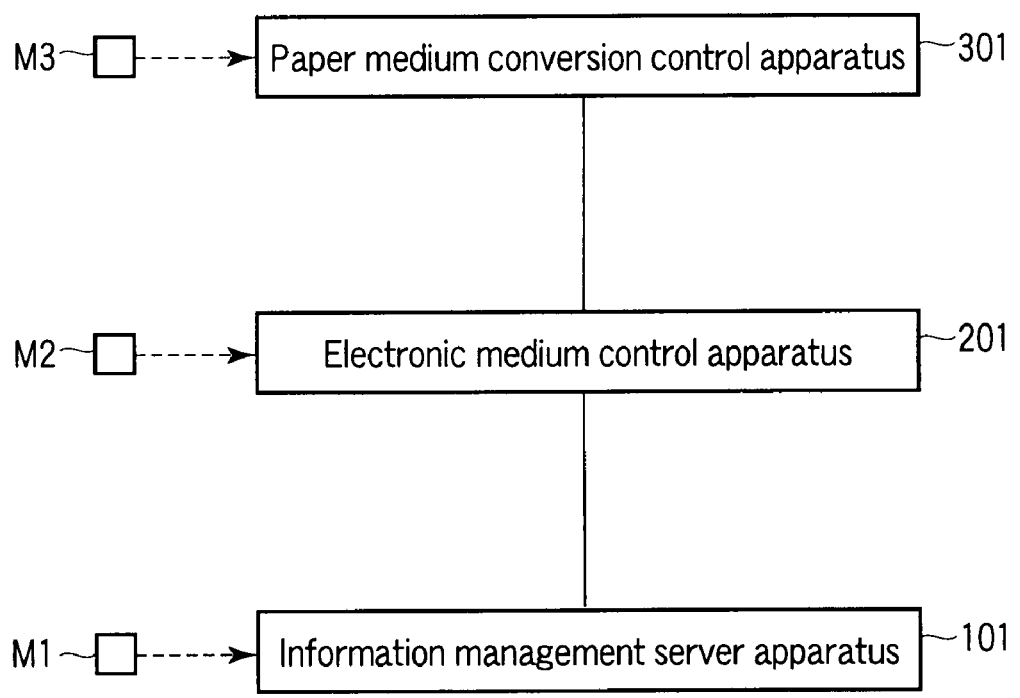
F I G. 25

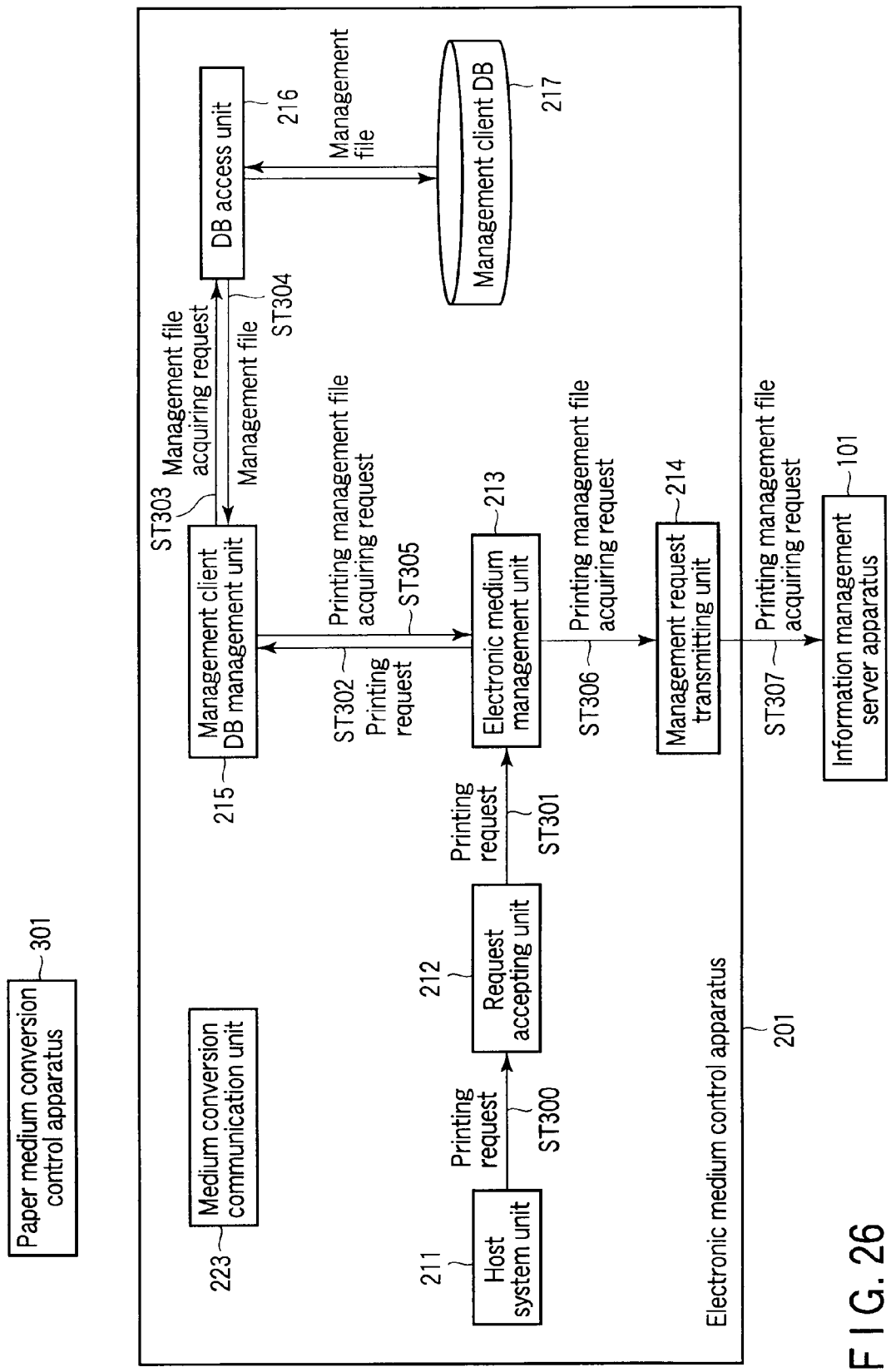
F I G. 26

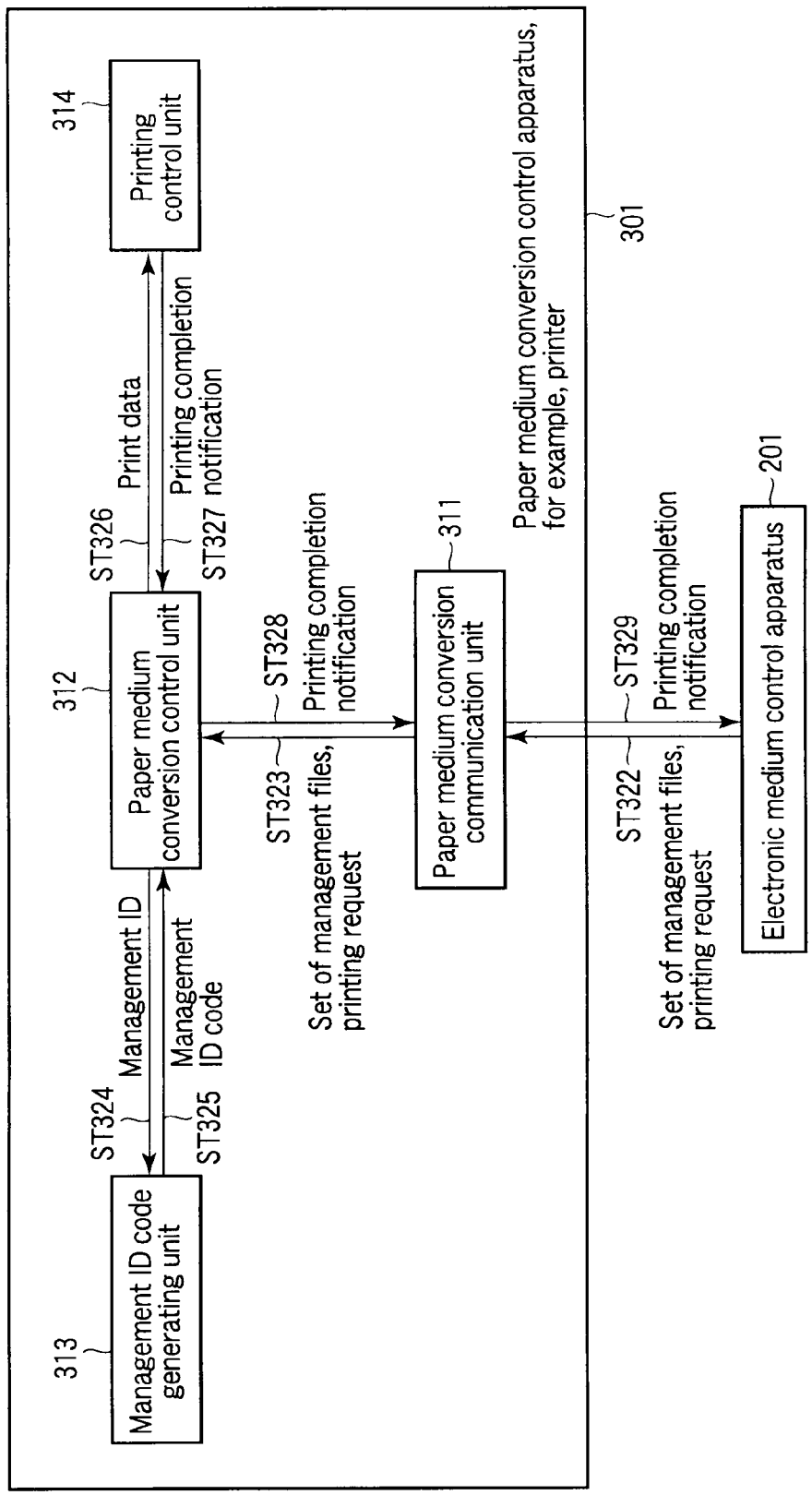
F I G. 29

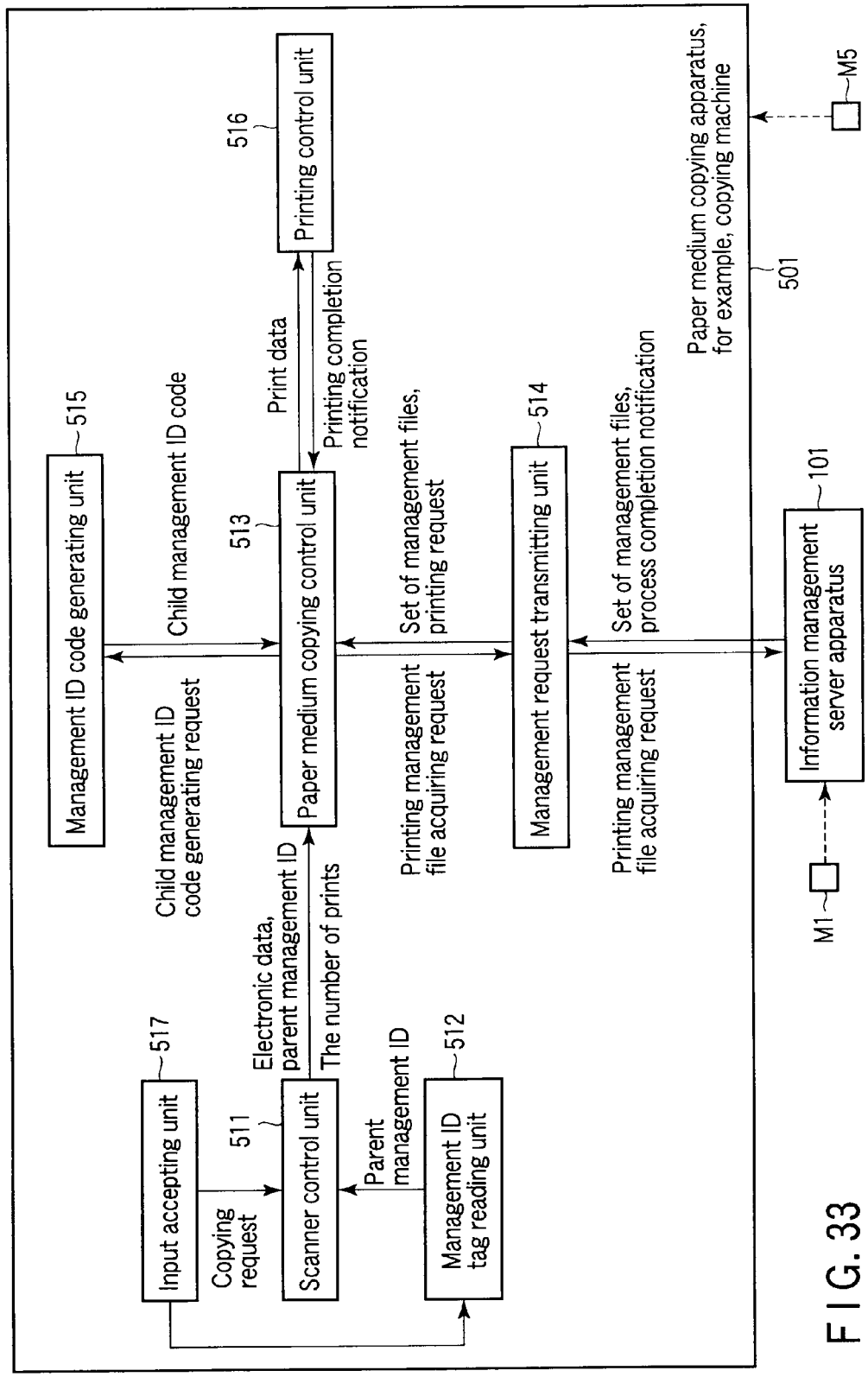
F I G. 33

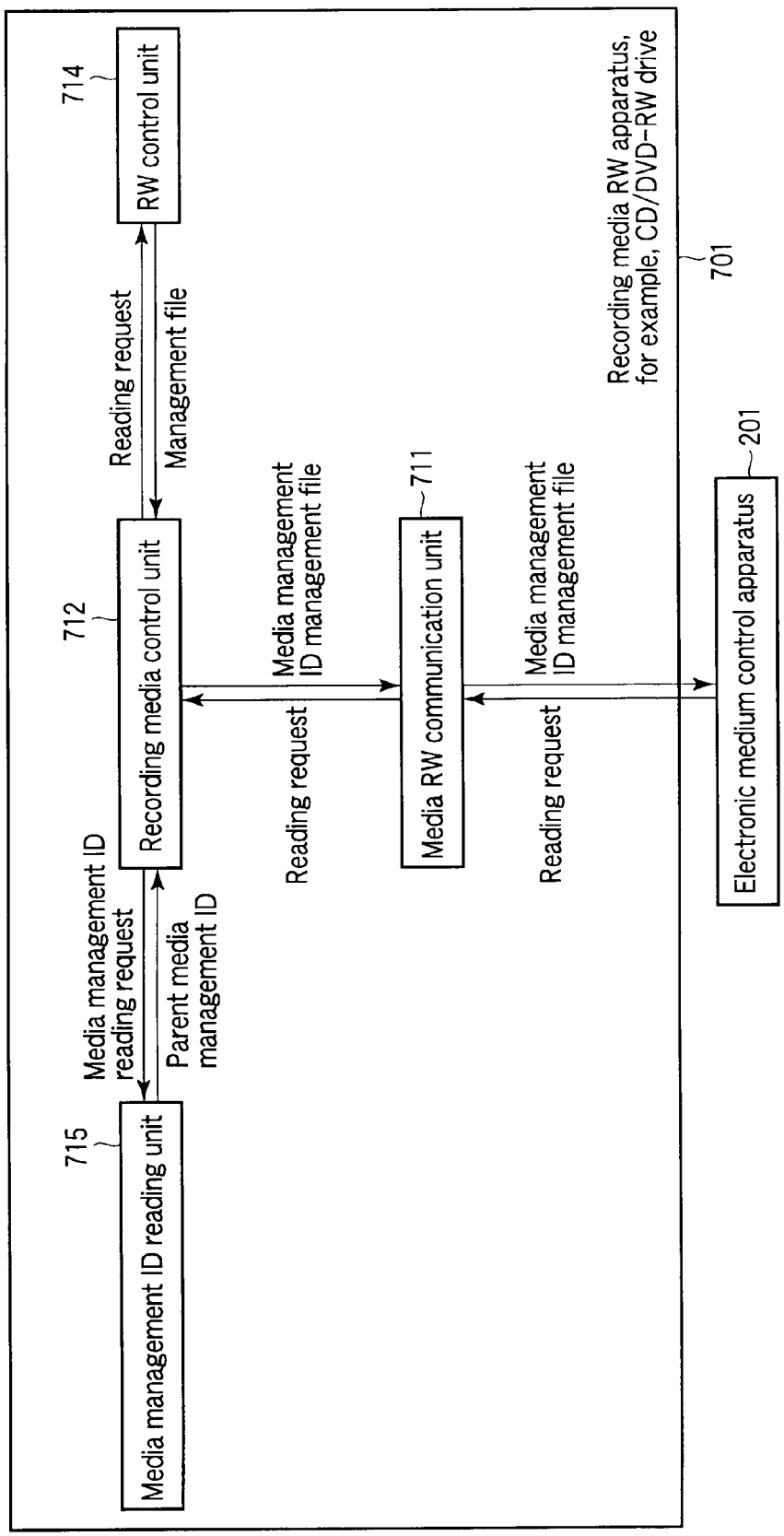
F I G. 38

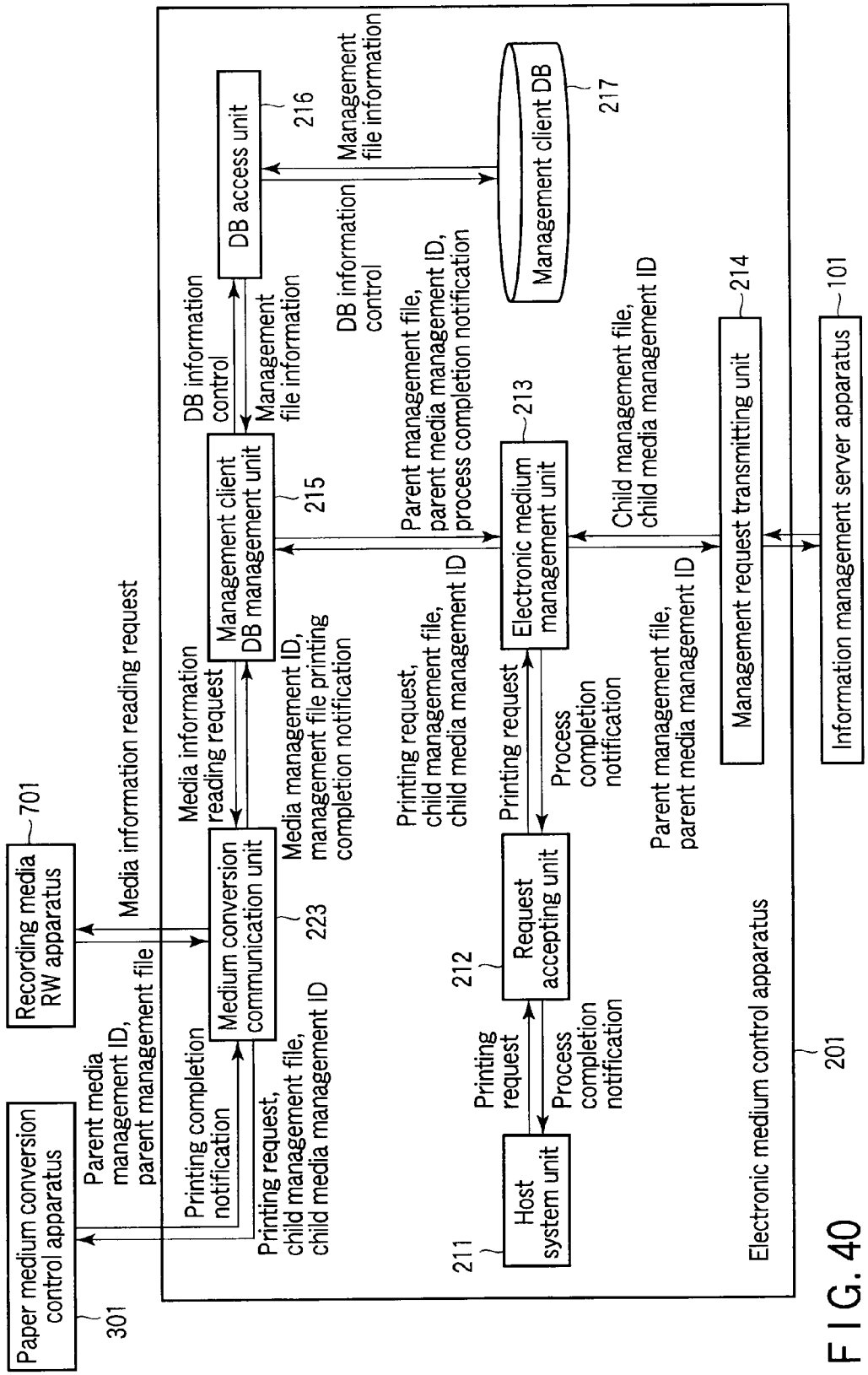
F I G. 40

INFORMATION LIFE-CYCLE MANAGEMENT SYSTEM, INFORMATION MANAGEMENT SERVER APPARATUS, ELECTRONIC MEDIA CONTROL APPARATUS, AND STORAGE MEDIUM

CROSS REFERENCE TO RELATED APPLICATIONS

This is a Continuation Application of PCT Application No. PCT/JP2009/052089, filed Feb. 6, 2009, which was published under PCT Article 21(2) in Japanese.

This application is based upon and claims the benefit of priority from prior Japanese Patent Application No. 2008-027776, filed Feb. 7, 2008, the entire contents of which are incorporated herein by reference.

BACKGROUND OF THE INVENTION

1. Field of the Invention

The present invention relates to an information life-cycle management system, an information management server apparatus, an electronic media control apparatus, and a storage medium which can manage a life cycle of information even though information to be managed is converted into a variety of information media.

2. Description of the Related Art

In recent years, a technique for managing an information life cycle of independent document data has been proposed. For example, there is a system in which a history from printing to discarding of a paper document to which an ID (identification) is given is managed by a server (for example, see Jpn. Pat. Appln. KOKAI Publication No. 2005-190365). There is also a system (for example, see Jpn. Pat. Appln. KOKAI Publication No. 2007-88796) which gives an identifier to print image data to manage document processing information for collection, discarding, and the like.

BRIEF SUMMARY OF THE INVENTION

The information life-cycle management technique described above generally has no particular problem. However, according to studies by the present inventor, when information to be managed is converted into a variety of information media (electronic data, paper, CD-ROM or the like), an information life cycle cannot be disadvantageously managed. This disadvantage may occur because, when information to be managed is converted into a variety of information media, there is no mechanism which cross-sectionally and uniformly manages systems and situations of the variety of information media.

For example, it is assumed that a former sends an original electronic material including secret information to a conference bureau and that the conference bureau distributes the material to conference participants as paper materials to be collected after the meeting. In this case, at present, it is difficult to uniformly recognize the states of deletion of the electronic material sent to the bureau and the states of the collection and discarding of the paper materials.

Similarly, it is assumed that in the nondisclosure agreement with various companies, for example, electronic data of a design specification, three copies of design specification paper media on which the data is printed, and one CD-ROM in which the data is stored are to be provided to the companies. In this case, at present, it is difficult to uniformly and immediately recognize a provider of certain information, provided media (electronic data, paper media, and storage media), and correction/discarding statuses. This also occurs in a business environment in which pieces of customer contract information are present in a variety of forms such as electronic data, paper media, recording media (DVD, CD-ROM, or the like) in a branch or a head office. It is difficult to immediately recognize the form of the customer information, a location of the customer information, or whether the customer information is erroneously discarded.

In the above environment, the types and the number of information media which express information to be managed are unclear, and it is difficult to limit the use of scattered information media. Consequently, control of the information may be lost or the information may be uncontrollably scattered, or the information media to be collected and deleted may not be completely collected and deleted.

It is an object of the present invention to provide an information life-cycle management system, an information management server apparatus, an electronic medium control apparatus, and a storage medium which can manage an information life cycle even though information to be managed is converted into a variety of information media.

One aspect of the present invention is an information life-cycle management system comprising an electronic medium control apparatus and an information management server apparatus which communicate with each other, wherein the electronic medium control apparatus comprises: a management table storing device which stores a management file management table in which a management file to be managed comprising a header portion including a management ID, forming time and date information, forming information, a medium type, a use limitation policy, and information management server information, the management ID, a management ID representing a management file of a copying source of at least the management file are associated with each other; a log table storing device which stores an access log table in which a management ID representing the management file to be managed, operation time and date information of the management file, an operation type, user information, and a management file name are associated with each other; a unit which generates, when an electronic copying request including a management ID representing a management file to be copied, user information, a medium type, and a use limitation policy is input, a management file acquiring request including the electronic copying request; a unit which acquires the management file from the management table storing device on the basis of the management ID in the management file acquiring request; a unit which transmits the copying management request information based on the electronic copying request and the acquired management file to the information management server apparatus; a unit which, after the copying management request information and the management file are transmitted, on the basis of the management file received from the information management server apparatus and an electronic copying completion notification, generates a registration request to the management file; a unit which, on the basis of the management file and the registration request, writes the management ID, a management ID representing the management file of the copying source of the management file, and a management file substance in the management file management table; a unit which, on the basis of the management file and the registration request, writes operation time and date information, an operation type, user information, a management ID, and a management file name on the access log table; a unit which generates a process result after the writing on both the tables; and a unit which, on the basis of the process result, outputs the process completion notification including a management ID of a copied management file to an input source of the electronic copying request to complete the process, and the information management server apparatus comprises: a management ID storing device which stores an issued management ID, an issuing time and date, and request source information in association with each other; an information management relation storing device which stores the issued management ID and forming time and date information, user information, a medium type, a use limitation policy, and information management server information in a header portion of the copied management file in association with each other with respect to a management ID of a management file in management file copying request information; a unit which, when the management file and the copying management request information are received from the electronic medium control apparatus, on the basis of the copying management request information, generates a management ID issuing request including apparatus information in the copying management request information as request source information; a unit which issues a management ID on the basis of the management ID issuing request, registers the management ID, an issuing time and date, and the request source information in the management ID storing device in association with each other to generate a registration process result including the management ID; a unit which, on the basis of the registration process result, generates a management file copying request including a management ID in the registration process result, the copying management request information, and the management file; a unit which, on the basis of the management file copying request, forms a copied management file comprising a header portion including a management ID in the management file in the management file copying request, the issued management ID, forming time and date information, user information, a medium type, a using limitation policy and information management server information; a unit which writes the issued management ID in the information management relation storing device in association with the management ID of the management file in the management file copying request in the information management relation storing device, and writes forming time and date information, user information, a medium type, a use limitation policy, and information management server information in the header portion of the copied management file in the information management relation storing device in association with the issued management ID; and a unit which transmits, after the writing, the copied management file and the electronic copying completion notification to the electronic medium control apparatus.

In one aspect of the present invention, the assembly of the apparatuses is expressed as a system. However, the assembly is not limited to the system, and each of the assemblies of the apparatuses or each of the apparatuses can also be expressed as an apparatus, a method, a program, or a computer-readable recording medium having a program recorded therein.

According to one aspect of the present invention, by a configuration including the information management relation storing device in which a issued management ID, forming time and date information in the header portion of the copied management file, user information, a medium type, a use limitation policy, and information management server information are stored in association with each other to the management ID of the management file in the management file copying request information, an information life cycle can be managed even though information to be managed is converted into a variety of information to be managed.

BRIEF DESCRIPTION OF THE SEVERAL VIEWS OF THE DRAWING

FIG. 1 is a block diagram showing a configuration of an information life-cycle management system according to each embodiment of the present invention.

FIG. 3 shows an example of a configuration of a management file in each of the embodiments.

FIG. 4 is a pattern diagram showing an outline of each of the embodiments.

FIG. 6 is a pattern diagram showing an example of a configuration of a management ID management DB in the embodiment.

FIG. 9 is a pattern diagram showing an example of a configuration of a management client DB in the embodiment.

FIG. 12 is a pattern diagram for explaining a using process in the embodiment.

FIG. 14 is a pattern diagram for explaining the copying process in the embodiment.

FIG. 17 is a pattern diagram for explaining the discarding process in the embodiment.

FIG. 25 is a block diagram showing a configuration of an information life-cycle management system according to a second embodiment of the present invention.

FIG. 26 is a pattern diagram for explaining a printing process in the embodiment.

FIG. 29 is a pattern diagram for explaining the printing process in the embodiment.

FIG. 33 is a block diagram showing a configuration of an information life-cycle management system according to a fifth embodiment of the present invention.

FIG. 38 is a block diagram showing a configuration of an information life-cycle management system according to a ninth embodiment of the present invention.

FIG. 40 is a block diagram showing a configuration of an electronic medium control apparatus in the embodiment.

DETAILED DESCRIPTION OF THE INVENTION

Embodiments of the present invention will be described below with reference to the accompanying drawings. Each of the following apparatuses can be implemented by a hardware configuration or a combined configuration of a hardware resource and software. As the software for the combined configuration, as shown in FIG. 1, FIG. 25, FIG. 32, FIG. 33, FIG. 34, FIG. 35, or the like as examples, programs which are installed from a network or storage media M1, M2, M3, M4, M5, M6, and M7 into computers of corresponding apparatuses 101, 201, 301, 401, 501, 601, and 701 to realize functions of the corresponding apparatuses are used.

Figure 2:
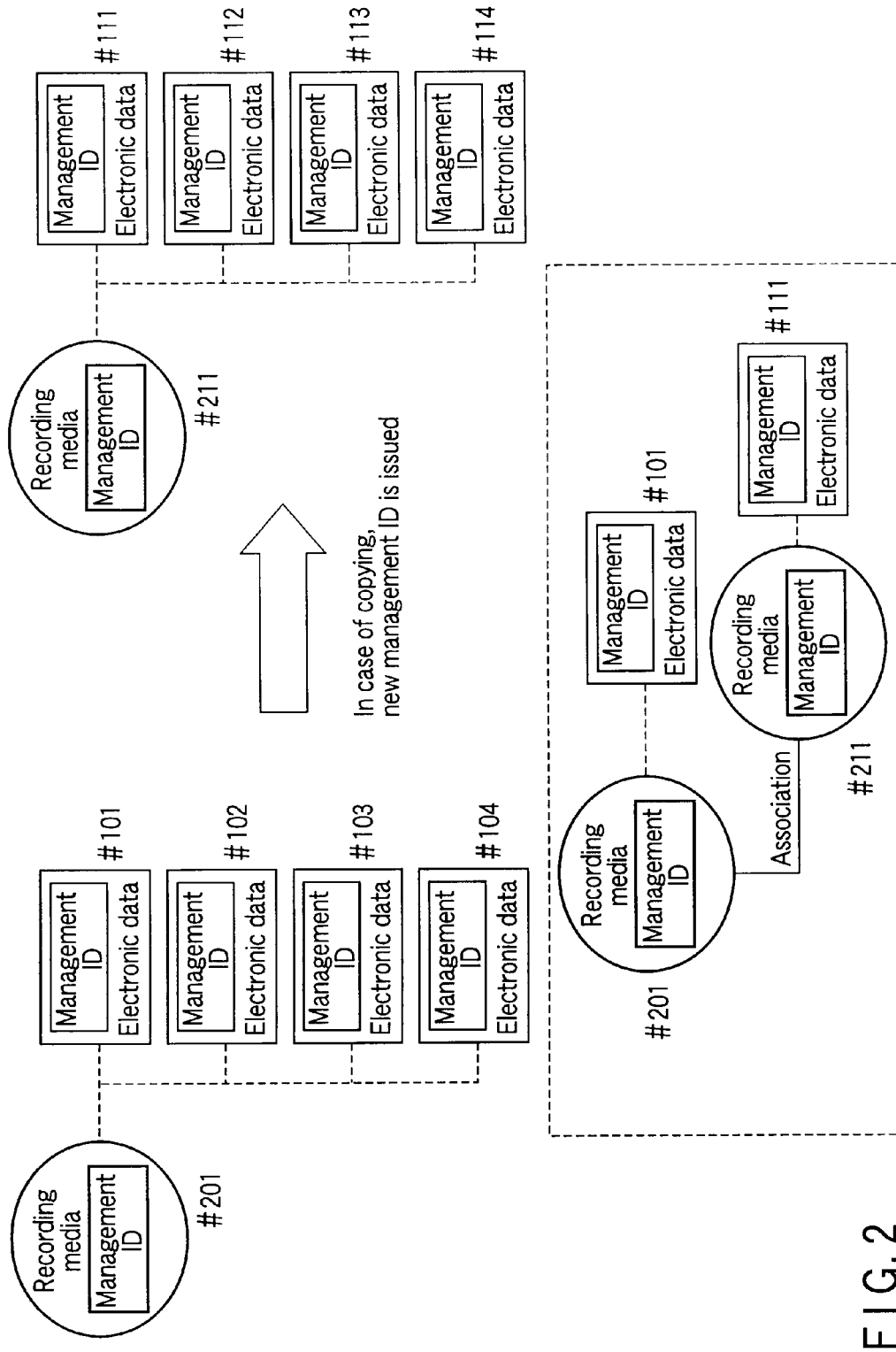
FIG. 2 is a pattern diagram showing an example of a management ID in the system.

FIG. 1 is a block diagram showing a configuration of an information life-cycle management system according to each of the embodiments of the present invention. Various information storage media such as electronic data, paper media, and recording media (CD-ROM, DVD, or the like) are called information media. The information life-cycle management system in each of the embodiments gives a unique management ID (identification) to independently identify "media holding information" such as digital data or a physical medium (paper, CD-ROM, DVD, SD card, FD, or the like) to uniformly manage forming and discarding of the information media, mutual relations (systems or medium types), and statuses related to medium use in relation to an information original. For example, as shown in FIG. 2, different independent unique IDs are given to the information media, respectively to manage forming to discarding of the information media and system relationships between the information media. This unique ID is called a management ID. In the specification, the term "erase" in an erasing process is used for elimination (erasing or deleting) of the information media serving as electronic data. The term "discarding" in the discarding process is used for elimination (crushing) of the information media serving as physical media. However, the term "discarding" in a discarding notification, an electronic discarding control unit, or the like is used as a concept (elimination (dead) state being independent of information media) that includes the "erasing" and "discarding" described above. In this system, there is an information management server which performs life-cycle management of the information media in cooperation with devices such as a mobile device (phone or information terminal), a PC (Personal Computer), a multi-function printer, a printer, a copying machine/scanner, a shredder, and a multi-drive which handle a variety of information media.

In this case, as the management ID, various IDs including an ID such as Ucode of Ubiquitous ID Center or EPC of EPCglobal whose uniqueness is guaranteed worldwide, and an ID whose uniqueness is guaranteed in a domain in which the information management server is present can be applied (for example, see Ubiquitous ID center homepage: http://www.uidcenter.org/japanese.html, www.uidcenter.org/index-en.html, and EPCglobal homepage: http://www.epcglobalinc.org/home).

As a physical storing medium for IDs to be given to the information media, a variety of ID tags including optical media such as a bar-code, a two-dimensional code, a color code, and a watermark and an electronic tag such as an RFID (wireless IC tag) and an infrared tag can be applied.

When an information medium is electronic data, the system converts the electronic data into an electronic file in a file format including a management ID. The converted electronic file is called a management file. The management file includes, in addition to an electronic data body of target information, header information including a management ID or attribute information, and authentication information for the electronic data body and the header information. The management file, as described in a configuration example shown in FIG. 3, includes a header portion, a body portion, and a data authentication portion.

The header portion includes a management ID of the electronic data, a management ID of a parent information medium, file information, file storage information, a use limitation policy, and information management server information. However, the configuration of the header portion is not limited to the configuration described above.

As a management ID of the parent information medium, for example, a management ID of original electronic data when electronic data is copied, a management ID of original electronic data when electronic data is printed to output a paper medium, or a management ID given to a paper medium when the paper medium is converted into electronic data by a scanner is used.

File information includes a file format of the electronic data, a file size, former information of the electronic data, forming date information, and forming place information.

File storage information includes information representing whether the electronic data body stored in the body portion is encrypted. When the electronic data body is encrypted, the file storage information further includes information related to an encryption algorithm, an encryption key, and an encryption module.

The use limitation policy is information related to use limitation of the electronic data such as expiration date of the electronic file, usable place information, user or usable apparatus information, and the number of times of use.

The information management server information is information to verify a MAC address or an IP address, a URI, and an authentication data portion of the information management server. A configuration in which, as information to verify the authentication data portion, encryption key information or an encryption key certificate related to the key is stored may be used.

In the body portion, the electronic data itself or an encrypted data obtained by encrypting the electronic data is stored.

The authentication data portion stores authentication data information, which is cryptographically computed by the information management server apparatus, in the header portion and the body portion. As the authentication data information, an electronic signature based on a public key cryptosystem such as a DSA, an RSA, or an ECDSA or an MAC (Message Authentication Code) based on a hash function or a symmetric cryptosystem can be used.

The information life-cycle management system described above can have various configurations as shown in FIG. 4. Embodiments corresponding to the respective configurations will be sequentially described below. In the embodiments, when the uniqueness of a system of issue numbers of the management IDs is secured in the information life-cycle management system of the invention, and when copied parent-child relationships are managed in relation to the management IDs, the issue numbers may be serial numbers regardless of the type of information media. In addition, the numbers of the management IDs may be issued such that significance is given to the configuration of the issue numbers of the management IDs to understand the parent-child relationships of the management IDs.

First Embodiment

FIG. 1 is a pattern diagram showing a configuration of an information life-cycle management system according to each embodiment of the present invention. This information life-cycle management system comprises an information management server apparatus 101 and an electronic medium control apparatus 201 which can communicate with each other.

Figure 5:
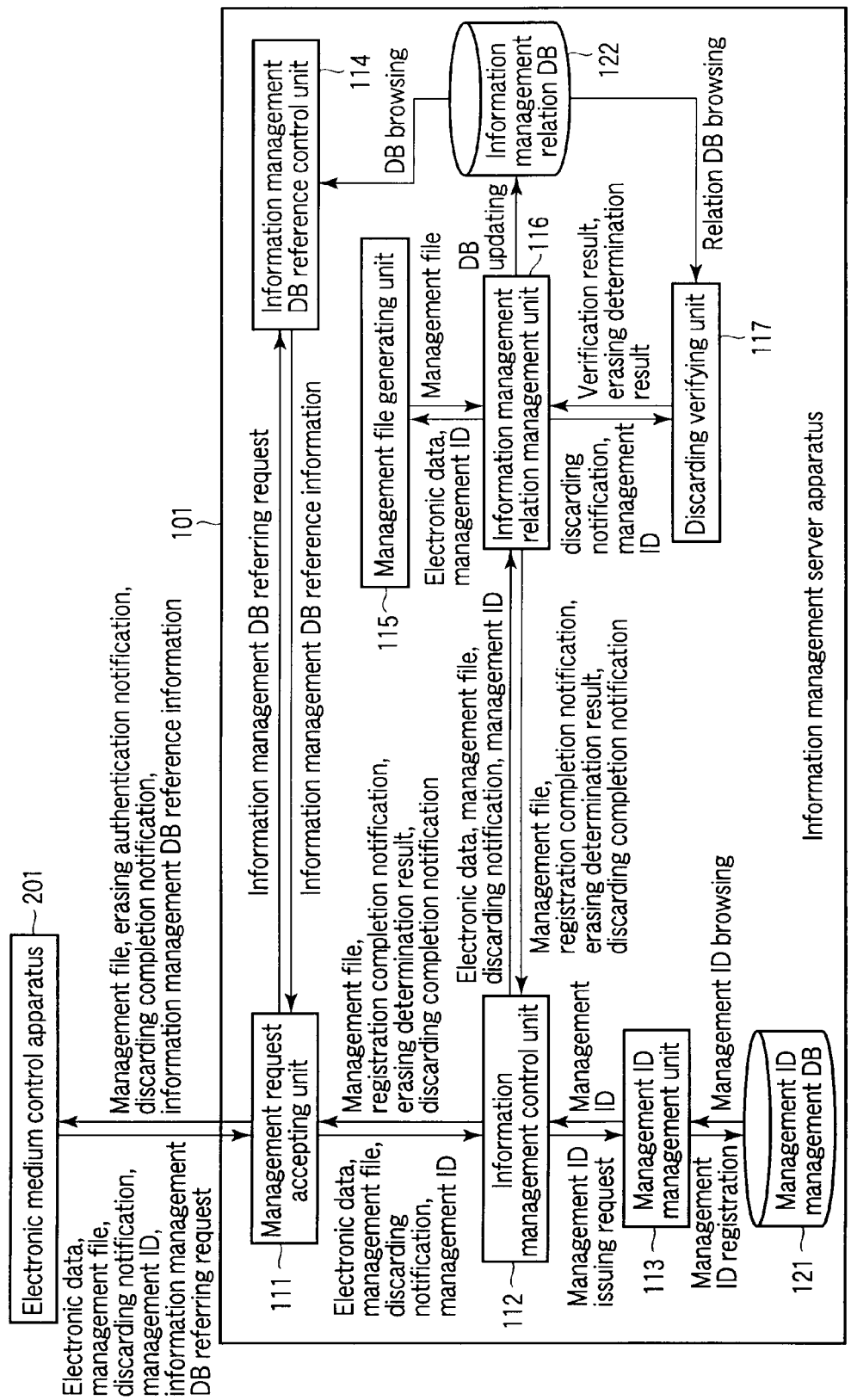
FIG. 5 is a block diagram showing a configuration of an information management server apparatus in the embodiment.

The information management server apparatus 101 comprises, as shown in FIG. 5, a management request accepting unit 111, an information management control unit 112, a management ID management unit 113, an information management DB (database) reference control unit 114, a management file generating unit 115, an information management relation management unit 116, a discarding verifying unit 117, a management ID management DB 121, and an information management relation DB 122. When the units directly send pieces of received information, the units may be arbitrarily integrated with each other. For example, the management request accepting unit 111 and the information management control unit 112 may be integrated with each other when the pieces of received information are directly sent. Similarly, the management file generating unit 115 and the information management relation management unit 116 may also be integrated. The units may be arbitrarily integrated with each other when pieces of received information are directly sent also in the other apparatus and the following embodiments.

In this case, the management request accepting unit 111, the information management control unit 112, the management ID management unit 113, the information management DB reference control unit 114, the management file generating unit 115, the information management relation management unit 116, and the discarding verifying unit 117 serve as functional blocks realized by causing, for example, a CPU (not shown) to execute a program including steps in the information management server apparatus 101 (will be described later).

The management ID management DB 121 and the information management relation DB 122 can be realized as storage apparatuses from/to which data can be read/written by a CPU (not shown).

The management ID management DB 121, as shown in FIG. 6, stores an issued management ID, issue time and date, and an issue request source information in association with each other. When the management ID expires, an expiration date and expiration request source information are further stored in association with each other.

Figure 7:
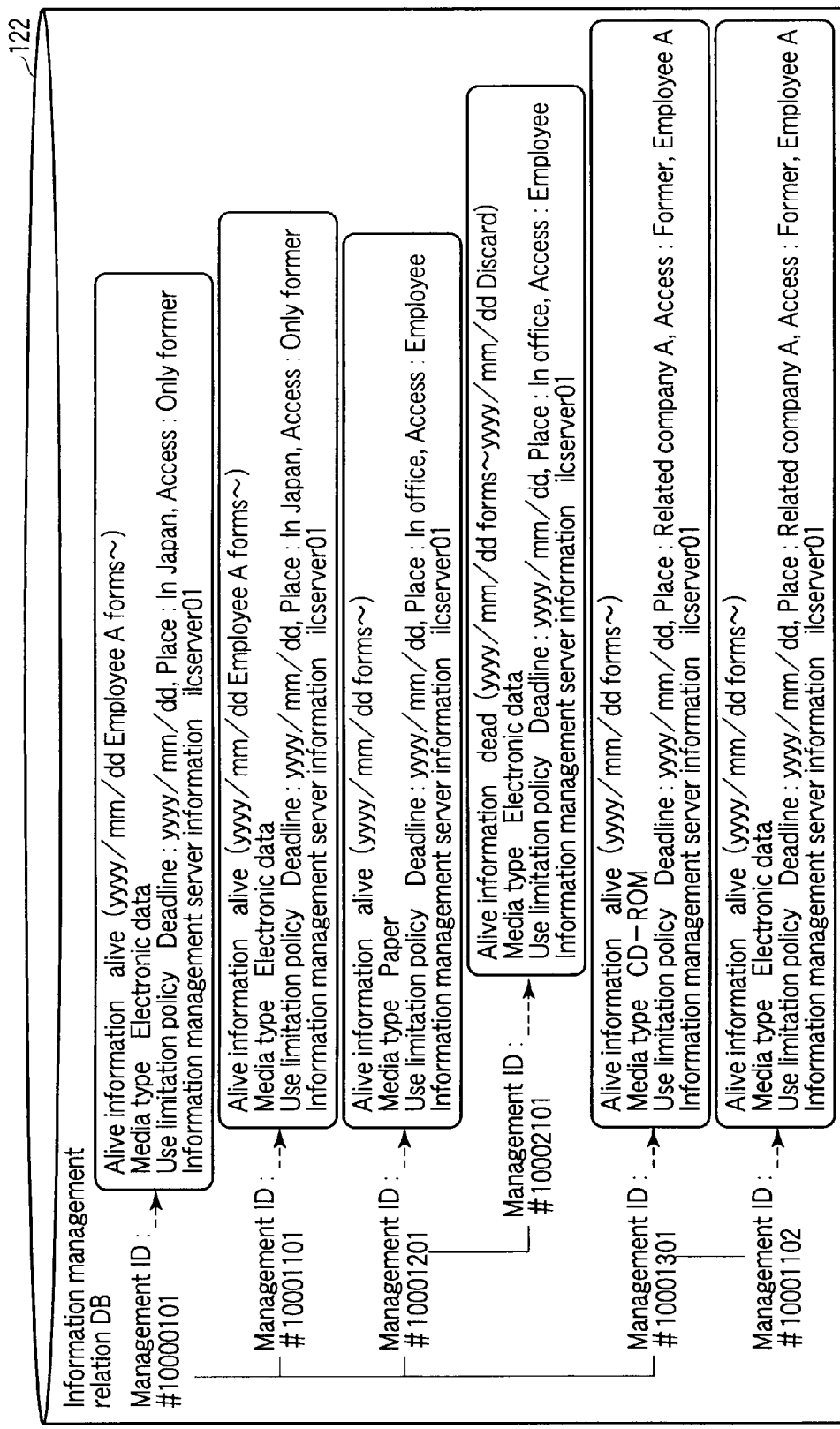
FIG. 7 is a pattern diagram showing an example of a configuration of an information management relation DB in the embodiment.

The information management relation DB 122, as shown in FIG. 7, stores a management ID of a management file, a forming time and date information in a header portion of the management file, user information, a medium type, a use limitation policy, and information management server information in association with each other. When a management file is a copy, the information management relation DB 122 stores a management ID newly issued for the copy, forming time and date information, user information, a medium type, a use limitation policy, and information management server information in the header portion of the copied (child) management file in association with each other for a management ID of a management file of a copy source (parent).

In this case, the management IDs are issued with a significant configuration of issue numbers of the management IDs such that the parent-child relation of the management IDs can be recognized. For example, a value of a specific digit is defined as a parent-child relation value. In an example in FIG. 7, the fourth digit (thousands place) is a parent-child relation value, "0" denotes the uppermost parent, "1" denotes a child of the parent, and "2" denotes a child (grandchild of the parent) of the child. The third digit (hundreds place) denotes a medium type, "1" denotes an electronic data, "2" denotes a paper medium, and "3" denotes a recording media. The first and second digits (ones place and tens place) denote identification numbers in a same-generation/same medium classification. The fifth to eighth digits (# and three-digit value thereof) denote an electronic data ID. Any management files each having the same electronic data ID include the same electronic data although the management files have a parent-child relation.

Figure 8:
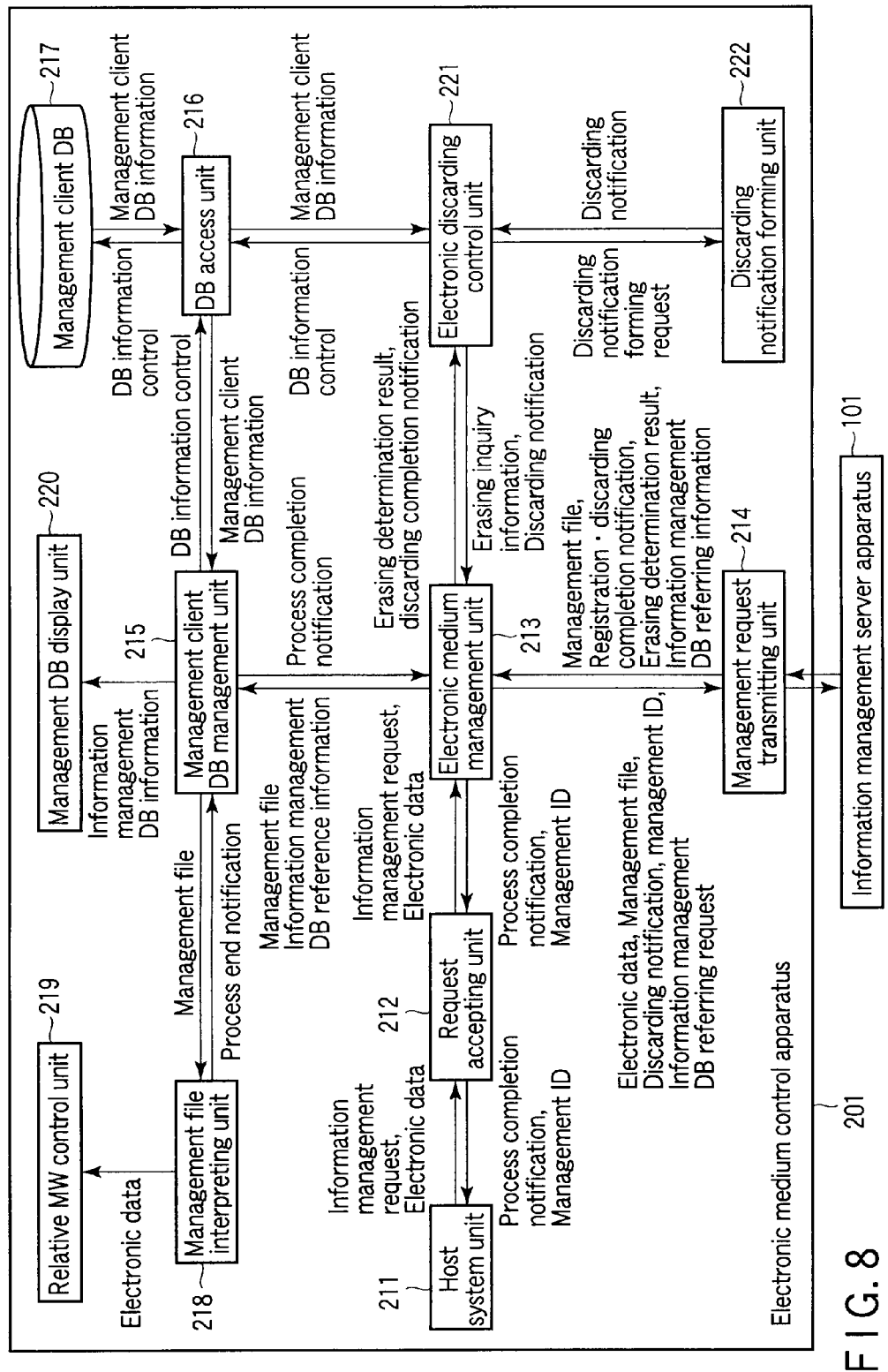
FIG. 8 is a block diagram showing a configuration of an electronic medium control apparatus in the embodiment.

On the other hand, the electronic medium control apparatus 201, as shown in FIG. 8, comprises a host system unit 211, a request accepting unit 212, an electronic medium management unit 213, a management request transmitting unit 214, a management client DB management unit 215, a DB access unit 216, a management client DB 217, a management file interpreting unit 218, a relative MW control unit 219, a management DB display unit 220, an electronic discarding control unit 221, and a discarding notification forming unit 222. The units may be arbitrarily integrated with each other. For example, the request accepting unit 212, the electronic medium management unit 213, the management request transmitting unit 214, and the management client DB management unit 215 may be integrated with each other when pieces of received information are directly sent.

In this case, the host system unit 211, the request accepting unit 212, the electronic medium management unit 213, the management request transmitting unit 214, the management client DB management unit 215, the DB access unit 216, the management file interpreting unit 218, the relative MW control unit 219, the electronic discarding control unit 221, and the discarding notification forming unit 222 serve as functional blocks realized by causing a CPU (not shown) to execute a program including steps in the electronic medium control apparatus 201 (described later).

The management client DB 217 can be realized as a storage apparatus from/to which data can be read/written by a CPU (not shown). In this case, the management client DB 217 is a storage apparatus which can be accessed by the DB access unit 216, and stores a management file management table and an access log table as shown in FIG. 9.

The management file management table includes, for each management ID, status information (for example, in browsing, —(disuse), usable, or the like), management file attribute information (forming time and date information, in case of disuse, disuse time and date information), and a management file substance. As the management file attribute information, in this case, partial information (for example, in addition to the forming/disuse time and date information, a management ID indicating a management file (parent management file) of a copy source of the management file) of a management file header portion is used. However, the range of description of the partial information includes a variety of configurations based on environmental settings of the corresponding apparatus or regulations concerning the information management server apparatus. The management file attribute information may include dynamic use information such as the number of times of accessing the management file by the apparatus which is not described in the management file header portion.

The access log table includes, for each time and date at which the apparatus is operated, an operation type, user information, a management ID, and a management file name. The operation type indicates a type of an operation such as a log-in status, a new registration, electronic data copying, viewing, or erasing. The management ID is a management ID which indicates operated electronic data. The management file name is, for example, information obtained by connecting an extension indicating a file format of the electronic data to the management ID of the electronic data. Contents to be managed by the access log table are not limited to the contents described above. The contents also include place information (inside/outside a company or GPS information) of the apparatus which operates a target management file.

As the management DB display unit 220, for example, a display apparatus controlled by a CPU (not shown) can be used.

Figure 10:
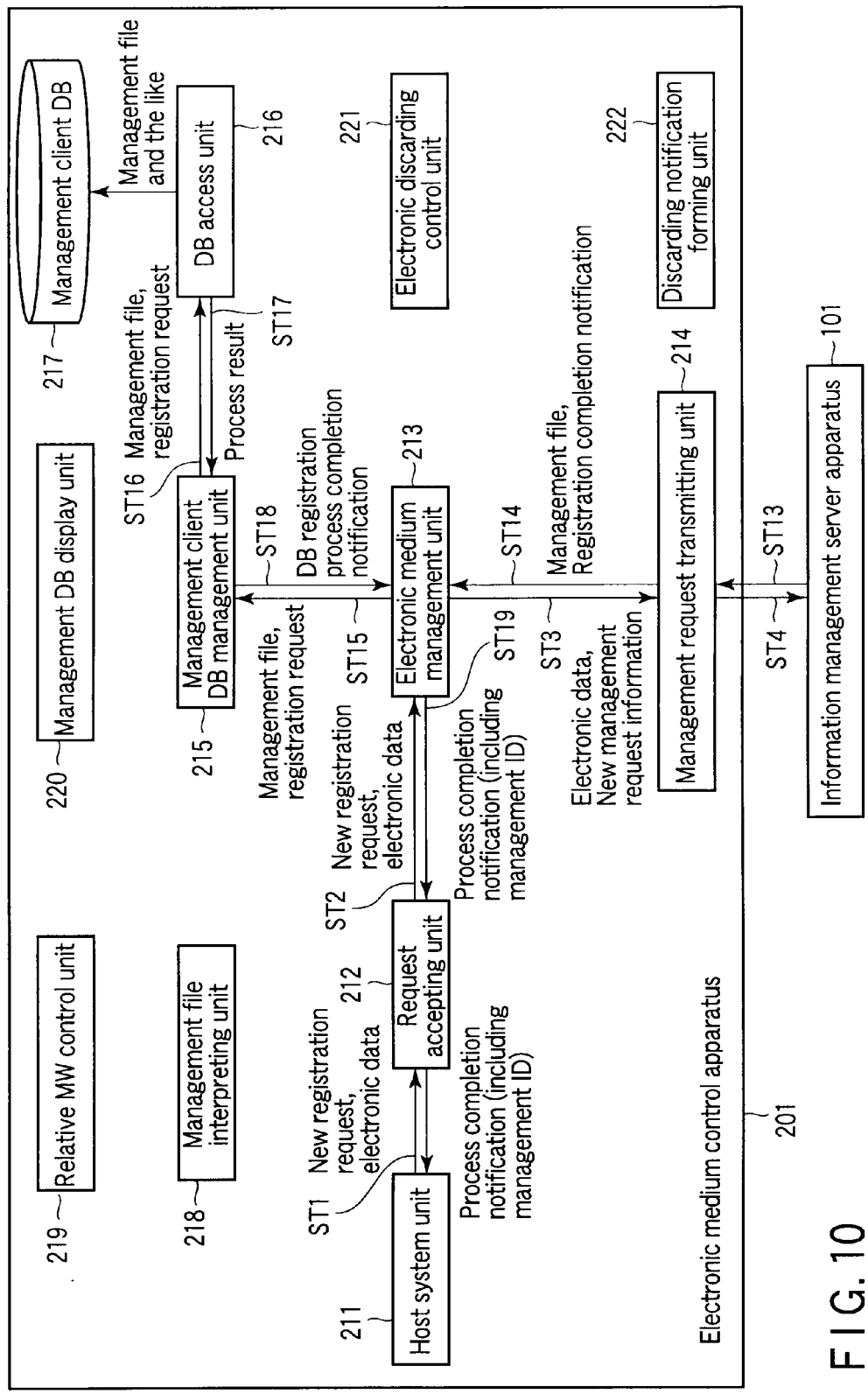
FIG. 10 is a pattern diagram for explaining a new registration process in the embodiment.
Figure 23:
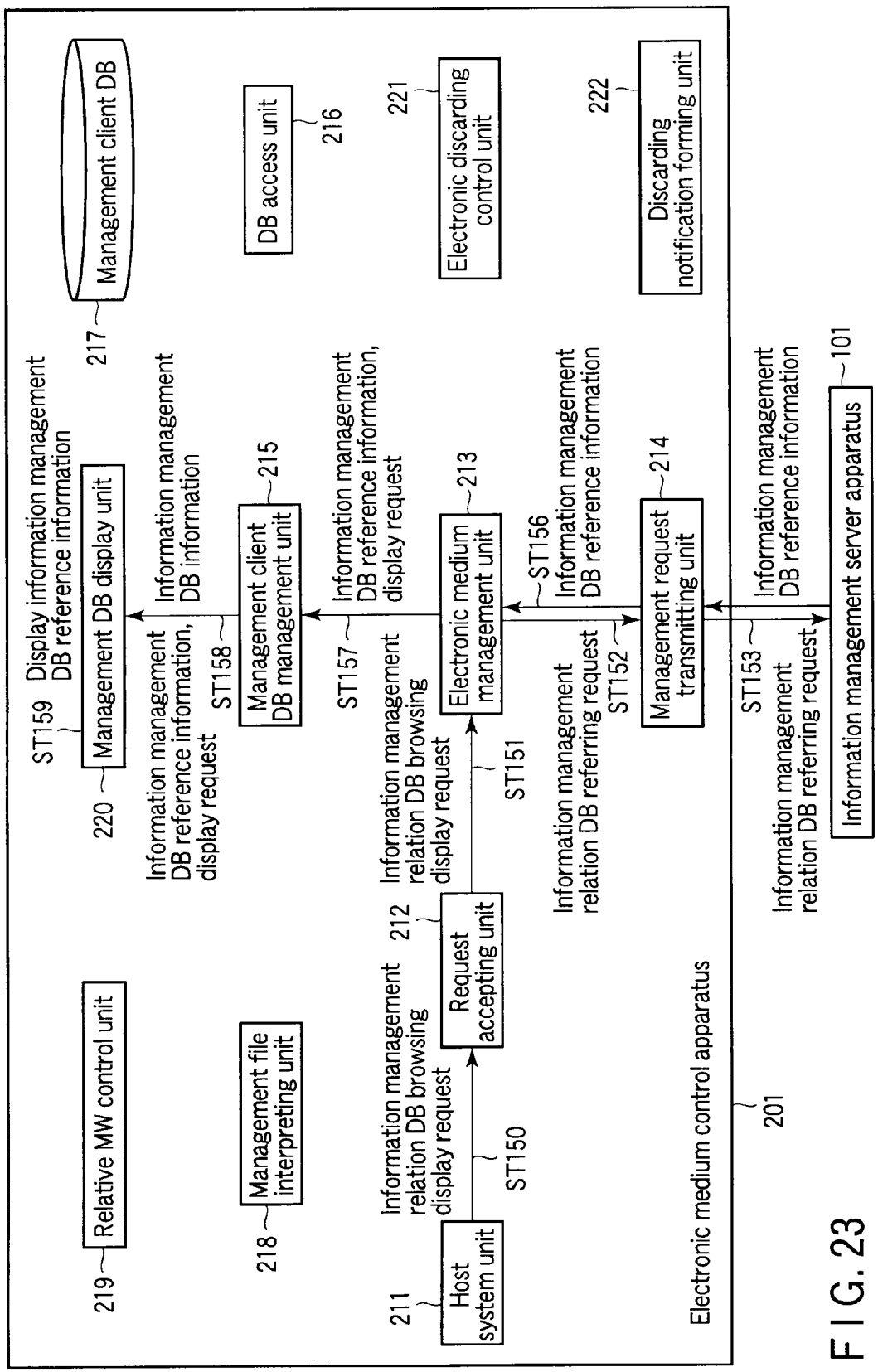
FIG. 23 is a pattern diagram for explaining an information management relation DB referring process in the embodiment.
Figure 24:
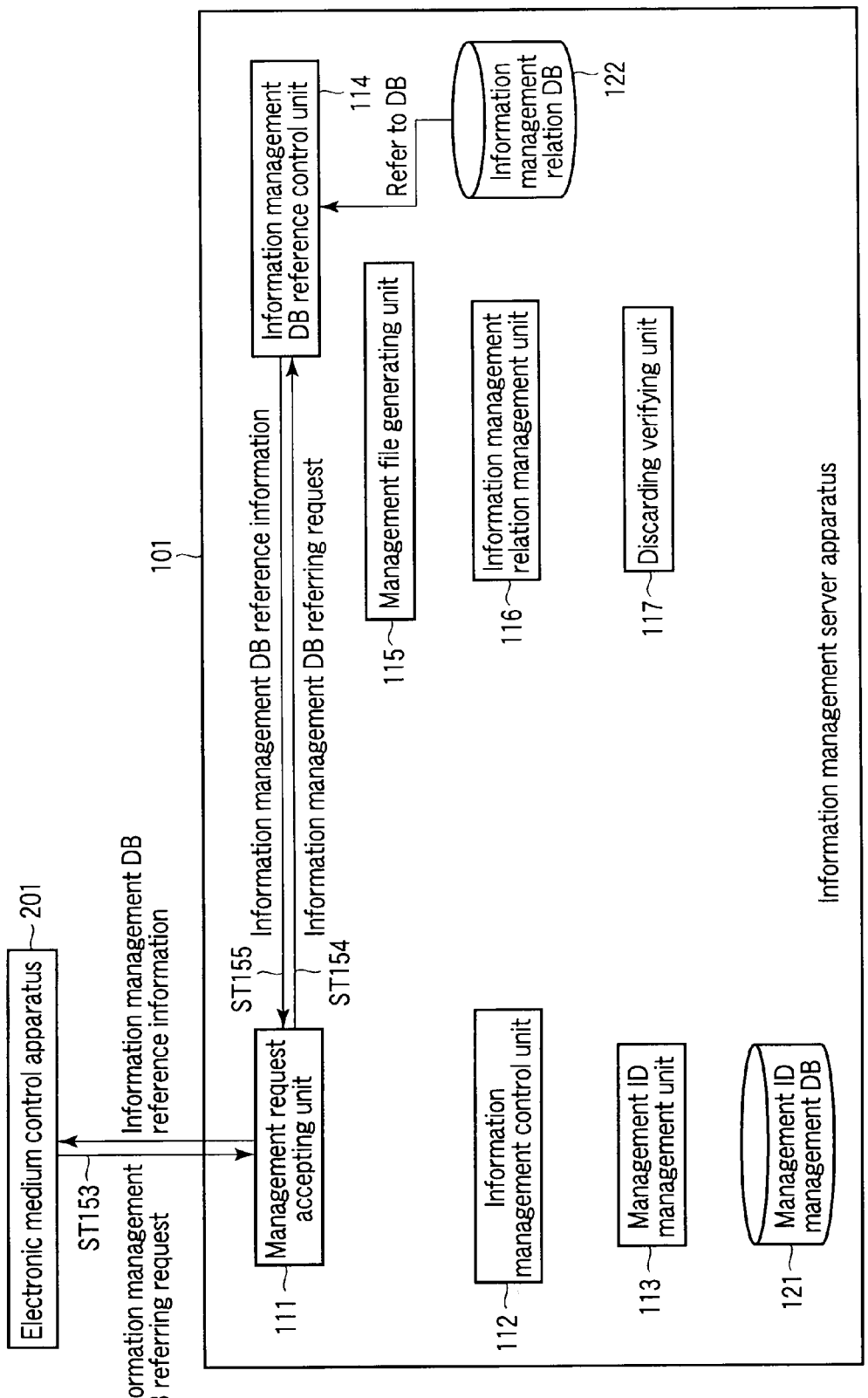
FIG. 24 is a pattern diagram for explaining the information management relation DB referring process in the embodiment.
Figure 27:
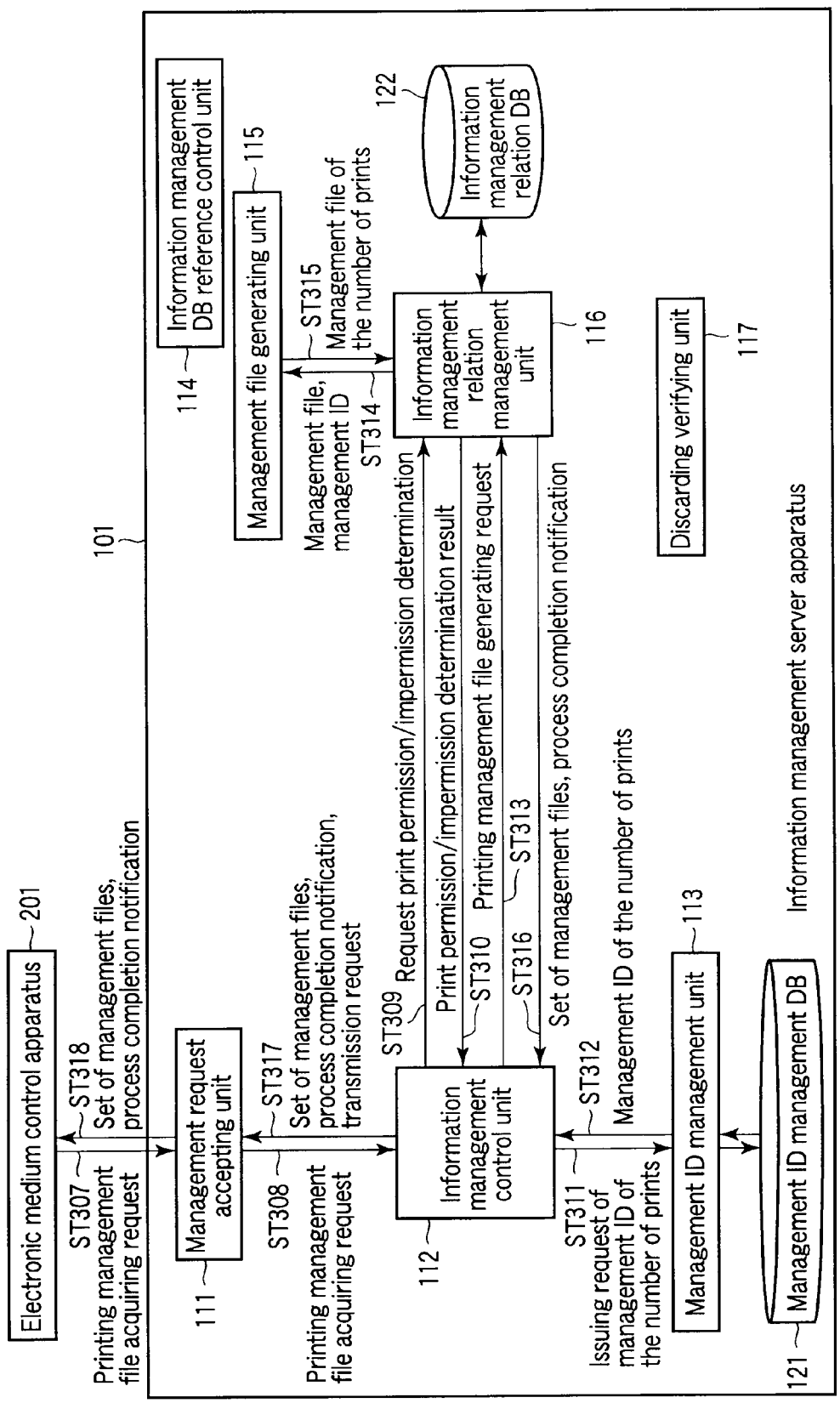
FIG. 27 is a pattern diagram for explaining the printing process in the embodiment.
Figure 28:
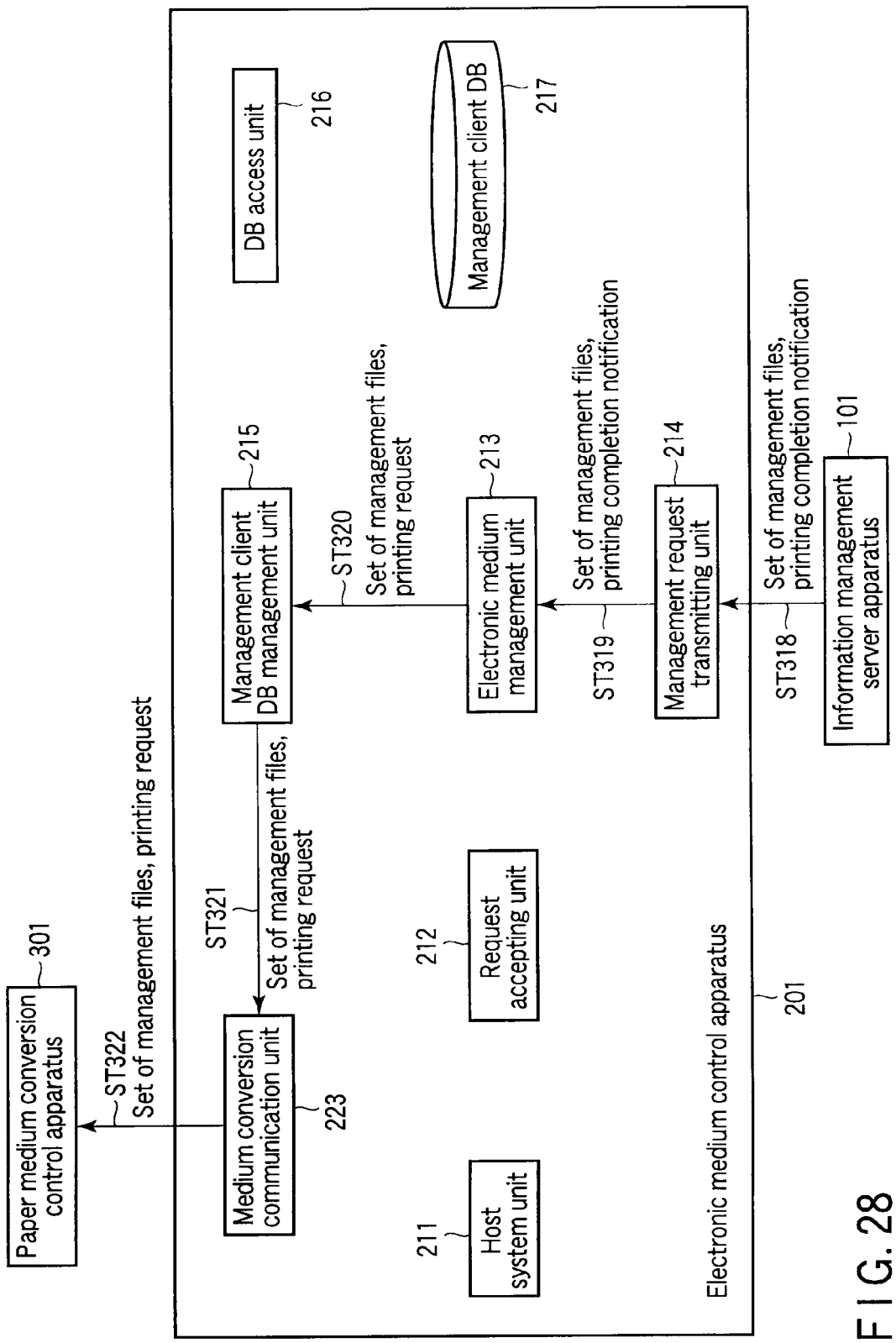
FIG. 28 is a pattern diagram for explaining the printing process in the embodiment.
Figure 30:
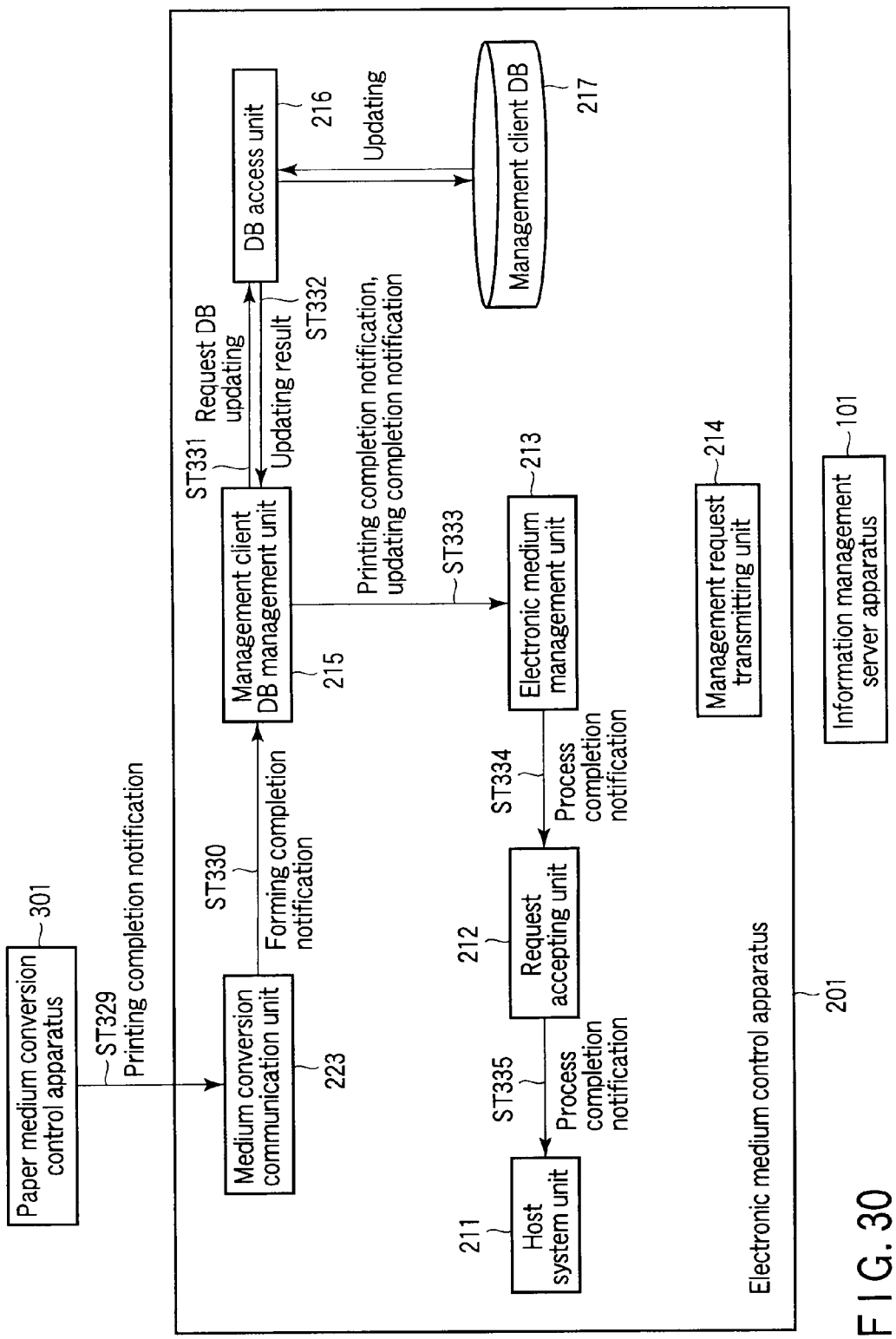
FIG. 30 is a pattern diagram for explaining the printing process in the embodiment.

An operation of the information life-cycle management system configured as described above will be described below with reference to the pattern diagrams in FIGS. 10 and 24. In the following description, an initial registration (FIGS. 10 and 11) of electronic data, use of a management file (FIG. 12), copying of a management file (FIGS. 13 to 15), discarding (FIGS. 16 to 20) of a management file, referring (FIG. 22) to the management client DB, referring (FIGS. 23 and 24) to the information management relation DB will be described in this order.

Figure 11:
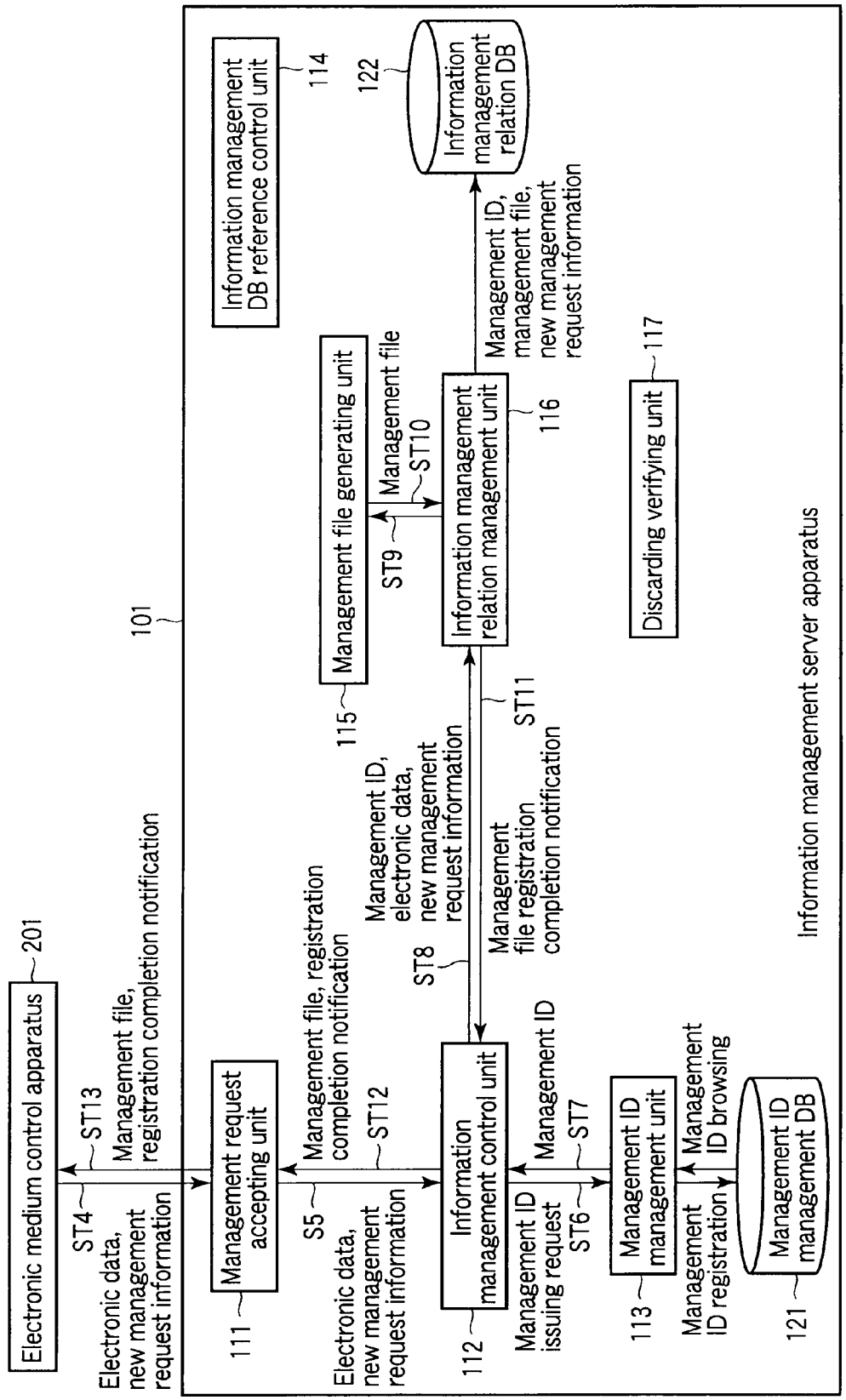
FIG. 11 is a pattern diagram for explaining the new registration process in the embodiment.

(Initial Registration of Electronic Data: FIGS. 10 and 11).

When a management file substance including unregistered electronic data is to be newly registered in the electronic medium control apparatus 201, the electronic medium control apparatus 201 and the information management server apparatus 101 execute the following processes.

The host system unit 211 sends unregistered electronic data and a new registration request to the request accepting unit 212 by an operation of an operator (electronic data former) (ST1). The new registration request includes a use limitation policy related to use limitation of the electronic data and former information indicating an electronic data former.

The request accepting unit 212 sends the electronic data and the new registration request to the electronic medium management unit 213, for example, in order of acceptance (ST2).

When the electronic medium management unit 213 accepts the electronic data and the new registration request, the electronic medium management unit 213 adds apparatus information such as a MAC address or an IP address related to the electronic medium control apparatus 201 and forming time and date information and forming place information of the electronic data to the new registration request to form new management request information. Thereafter, the electronic medium management unit 213 sends the new management request information and the electronic data to the management request transmitting unit 214 (ST3).

The management request transmitting unit 214 transmits the new management request information and the electronic data to the information management server apparatus 101 (ST4).

In the information management server apparatus 101, the management request accepting unit 111 sends the new management request information and the electronic data to the information management control unit 112, for example, in order of acceptance (ST5).

The information management control unit 112, based on the new management request information, requests the management ID management unit 113 to issue a management ID (ST6). At this time, the information management control unit 112 includes the apparatus information, which is in the new management request information, in an issue request as request source information. The request source information can regulate not only the apparatus information of the electronic medium control apparatus 201 but also information such as former information which is optimal for an applied configuration in the corresponding system.

The management ID management unit 113, on the basis of the issue request, issues a management ID, and registers the management ID, the issue time and date, and the request source information (apparatus information) in the management ID management DB 121 in association with each other. Thereafter, the management ID management unit 113 sends a registration process result including the management ID to the information management control unit 112 (ST7).

The information management control unit 112 sends the management ID, and the above-described new management request information and electronic data to the information management relation management unit 116 (ST8).

The information management relation management unit 116 sends a management file generation request including the management ID, the new management request information, and the electronic data to the management file generating unit 115 (ST9).

The management file generating unit 115, on the basis of the management file generation request, generates a management file. A procedure of generating the management file is described below, for example.

The management file generating unit 115 sets the management ID in a region for a management ID of electronic data of the header portion. As the management ID of a parent information medium of the header portion, NULL is set. As the file information of the header portion, a file format, a file size, former information, forming time and date information, and the forming place information are set.

The management file generating unit 115 sets file storage information of the header portion on the basis of the presence/absence of an encrypting process and designation of the cryptographic process for a cryptographic algorithm, a cryptographic key, and a cryptographic module. In this case, as the designation of the encrypting process, for example, various configurations such as a configuration in which the host system unit 211 performs designation by the information of the new registration request, a configuration in which the electronic medium management unit 213 designates registration request information of new registration and a configuration in which the information management relation management unit 116 performs designation by a management file generation request can be used.

The management file generating unit 115 sets file storage information, a use limitation policy, and information management server information in the header portion. In this manner, the header portion is generated.

Subsequently, the management file generating unit 115 performs an encryption process to electronic data on the basis of the file storage information of the header portion and sets the obtained encrypted electronic data in the body portion. In this manner, the body portion is generated.

The management file generating unit 115 generates authentication data for the generated header portion and the body portion on the basis of an electronic signature method based on a public key cryptosystem or a MAC method based on a hash function or a symmetric cryptosystem. The authentication data is set in the authentication data portion of the management file. In this manner, the management file is formed.

The management file generating unit 115 sends the formed management file to the information management relation management unit 116 (ST10).

The information management relation management unit 116 registers the forming time and date information, the former information, the medium type, the user limitation policy, and the information management server information in the information management relation DB 122 in association with the management ID of the electronic data on the basis of the formed management file, the management ID, and the new management request information. In this case, when the management ID of the parent information medium is present, the management ID of the electronic data is registered in the information management relation DB 122 in association with the management ID of the parent information medium.

The information management relation management unit 116 sends the management file and a registration completion notification to the information management control unit 112 (ST11). The information management control unit 112 sends the management file and the registration completion notification to the management request accepting unit 111 (ST12). The management request accepting unit 111 transmits the management file and the registration completion notification to the electronic medium control apparatus 201 (ST13).

In the electronic medium control apparatus 201, the management request transmitting unit 214 sends the received management file and registration completion notification to the electronic medium management unit 213 (ST14).

When the electronic medium management unit 213 receives the management file and the registration completion notification, the electronic medium management unit 213 sends the management file and the registration request to the management client DB management unit 215 (ST15).

The management client DB management unit 215 sends the management file and the registration request to the DB access unit 216 (ST16).

The DB access unit 216 adds an entry to the management file management table of the management client DB 217 by using the management ID as a main key and registers a status, header portion information, and a management file substance.

The DB access unit 216 registers an operation log of a new registration including operation time and date information, an operation type, user information, a management ID, and a management file name in the access log table of the management client DB 217.

Thereafter, the DB access unit 216 outputs a process result to the management client DB management unit 215 (ST17).

When the management client DB management unit 215 receives the process result, the management client DB management unit 215 notifies the electronic medium management unit 213 of completion of the DB registration process of the new registration (ST18).

When the electronic medium management unit 213 receives the notification, the electronic medium management unit 213 sends a process completion notification including the management ID for the newly registered electronic data to the request accepting unit 212 (ST19). The request accepting unit 212 sends the process completion notification including the management ID to the host system unit 211 to complete the process.

(Use of Management File: FIG. 12)

When a registered management file is used, the electronic medium control apparatus 201 executes the following processes.

The host system unit 211 sends a use request including a management ID representing a management file to be used to the request accepting unit 212 (ST41). The use request may include user information, use apparatus information, and use environment information including time and a place.

The request accepting unit 212 sends the use request to the electronic medium management unit 213 in the order of, for example, acceptance (ST42).

The electronic medium management unit 213 sends the use request to the management client DB management unit 215 (ST43).

When the management client DB management unit 215 receives the use request, the management client DB management unit 215 sends a management file acquisition request including the use request to the DB access unit 216 (ST44).

The DB access unit 216 acquires corresponding management file information from the management client DB 217 on the basis of the management ID in the management file acquisition request to send the management file information to the management client DB management unit 215 (ST45). At this time, the DB access unit 216, on the basis of the use request in the management file acquisition request, writes use time and date and the user information in the access log table of the management client DB 217 as a use log related to the management file in association with the management ID or a management file name. In addition, the use environment information including a use place may be recorded.

The management client DB management unit 215 sends the management file received from the DB access unit 216 to the management file interpreting unit 218 (ST46).

The management file interpreting unit 218 verifies the validity of the authentication data included in the authentication data portion of the sent management file. The authentication data is an electronic signature or MAC data of the information management server apparatus 101 which issues the management file. A cipher key used in the verification may have any configuration of a verification cipher key of the information management server apparatus 101 regulated by the system, a verification key stored in the management file, and a verification key linked from the management file, depending on the actual system used.

When the authentication data is not valid as a result of the verification, the management file interpreting unit 218 interrupts the process to output an error to the host system unit 211. An error output pass may be a route which sequentially traces back the management client DB management unit 215, the electronic medium management unit 213, and the request accepting unit 212. At this time, the management client DB management unit 215 may request the DB access unit 216 to record an error history on the access log table of the management client DB.

On the other hand, when the authentication data is valid, the management file interpreting unit 218 extracts electronic data from the body portion of the management file, refers to file format information included in the header portion, and sends the electronic data to the relative MW control unit 219 (ST47). At this time, when the electronic data of the body portion is encrypted, the management file interpreting unit 218 decrypts the body portion by using a cryptographic key which decrypts the encrypted data of the management file to extract the electronic data.

The relative MW control unit 219 activates control middleware or an application associated with the sent electronic data (ST48).

Figure 13:
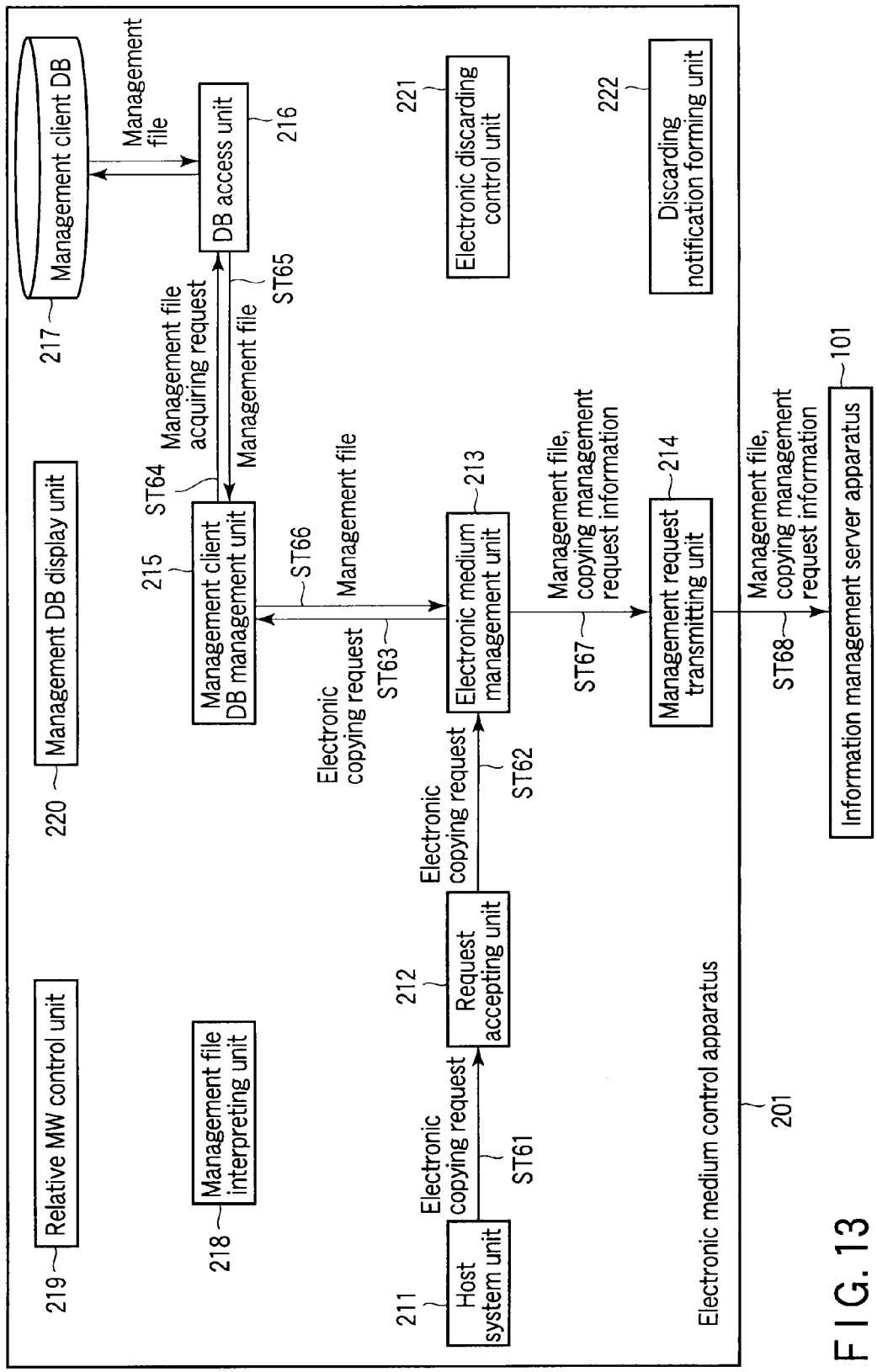
FIG. 13 is a pattern diagram for explaining a copying process in the embodiment.
Figure 15:
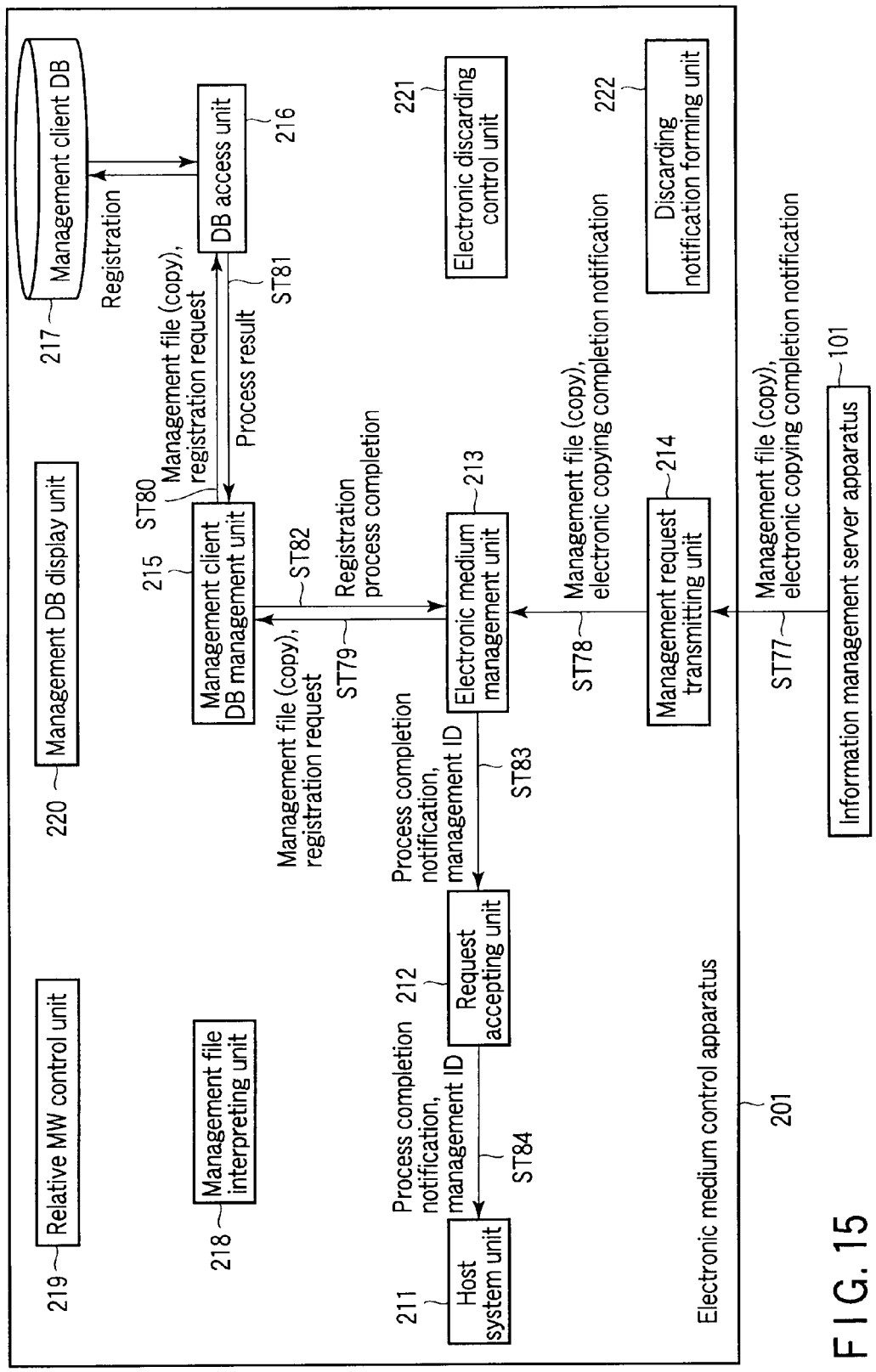
FIG. 15 is a pattern diagram for explaining the copying process in the embodiment.
Figure 16:
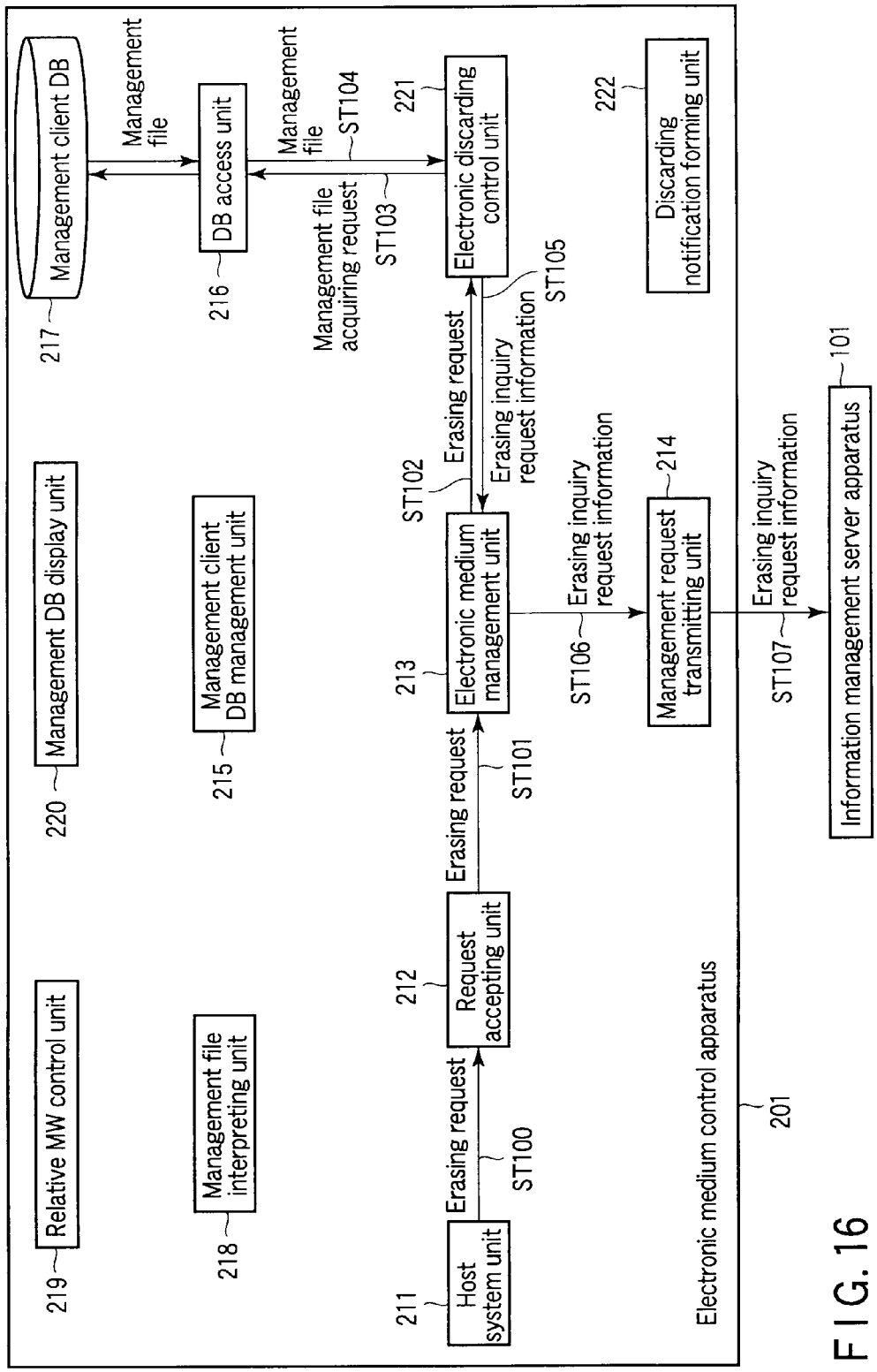
FIG. 16 is a pattern diagram for explaining a discarding process in the embodiment.
Figure 18:
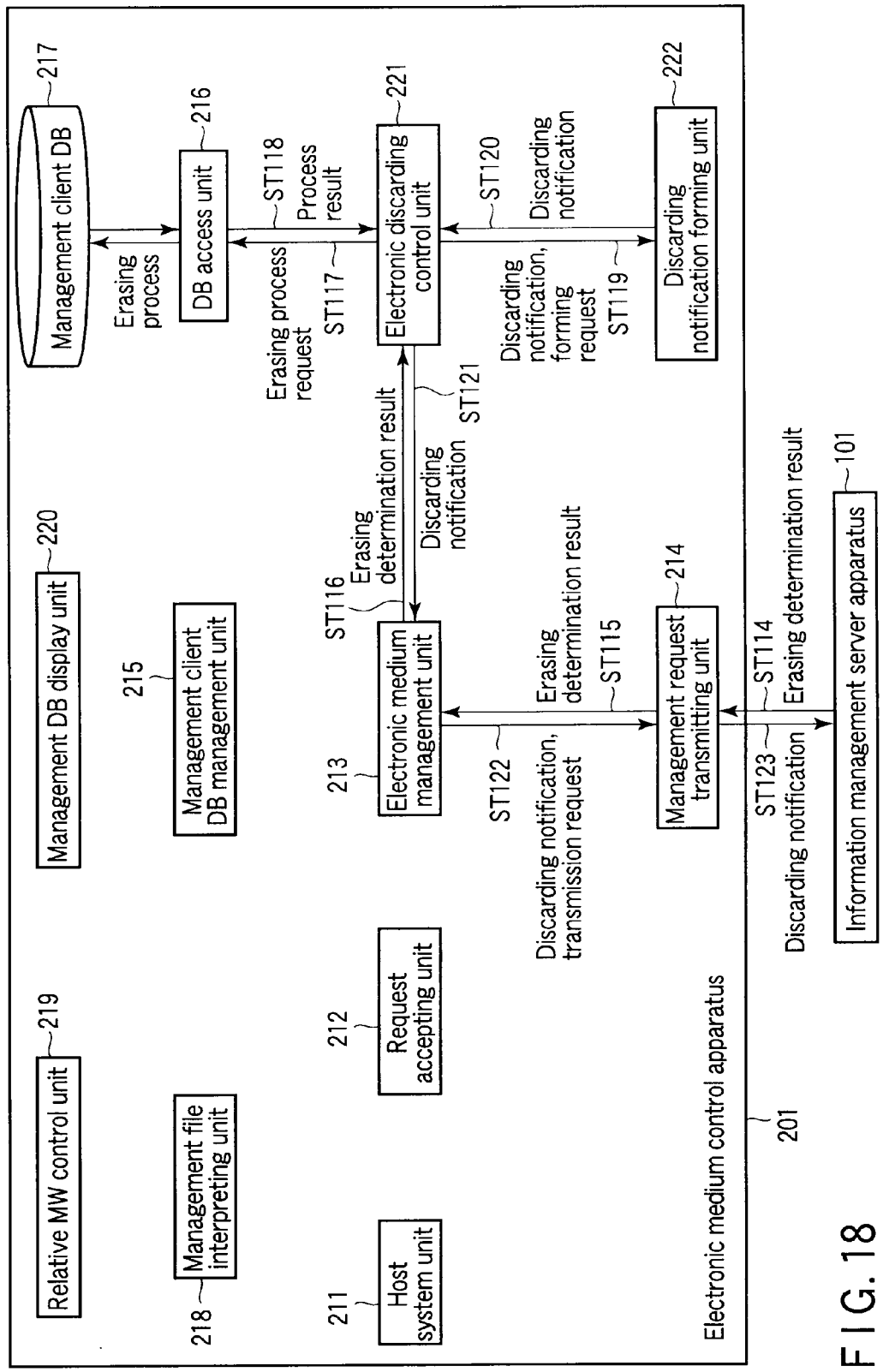
FIG. 18 is a pattern diagram for explaining the discarding process in the embodiment.
Figure 19:
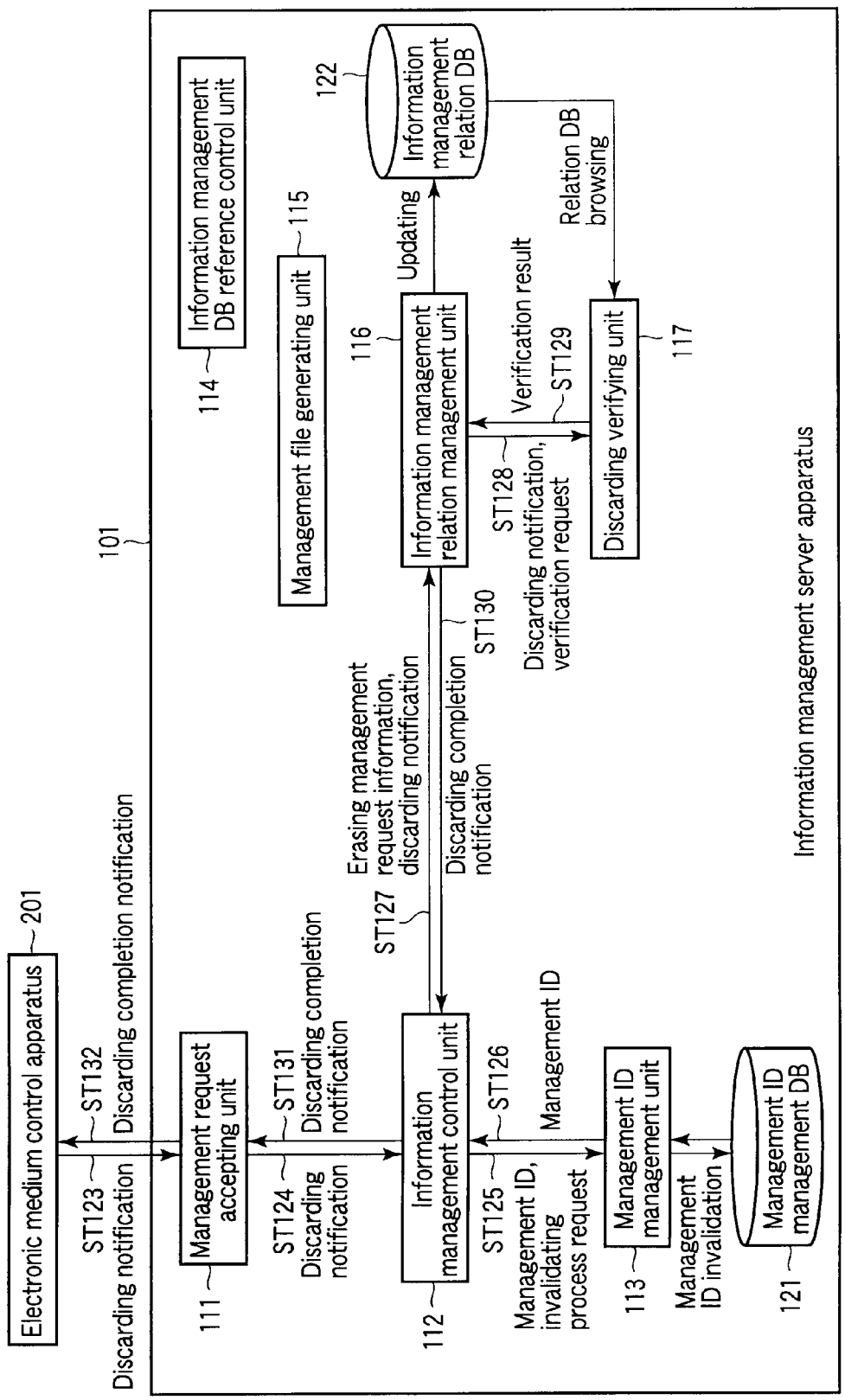
FIG. 19 is a pattern diagram for explaining the discarding process in the embodiment.
Figure 20:
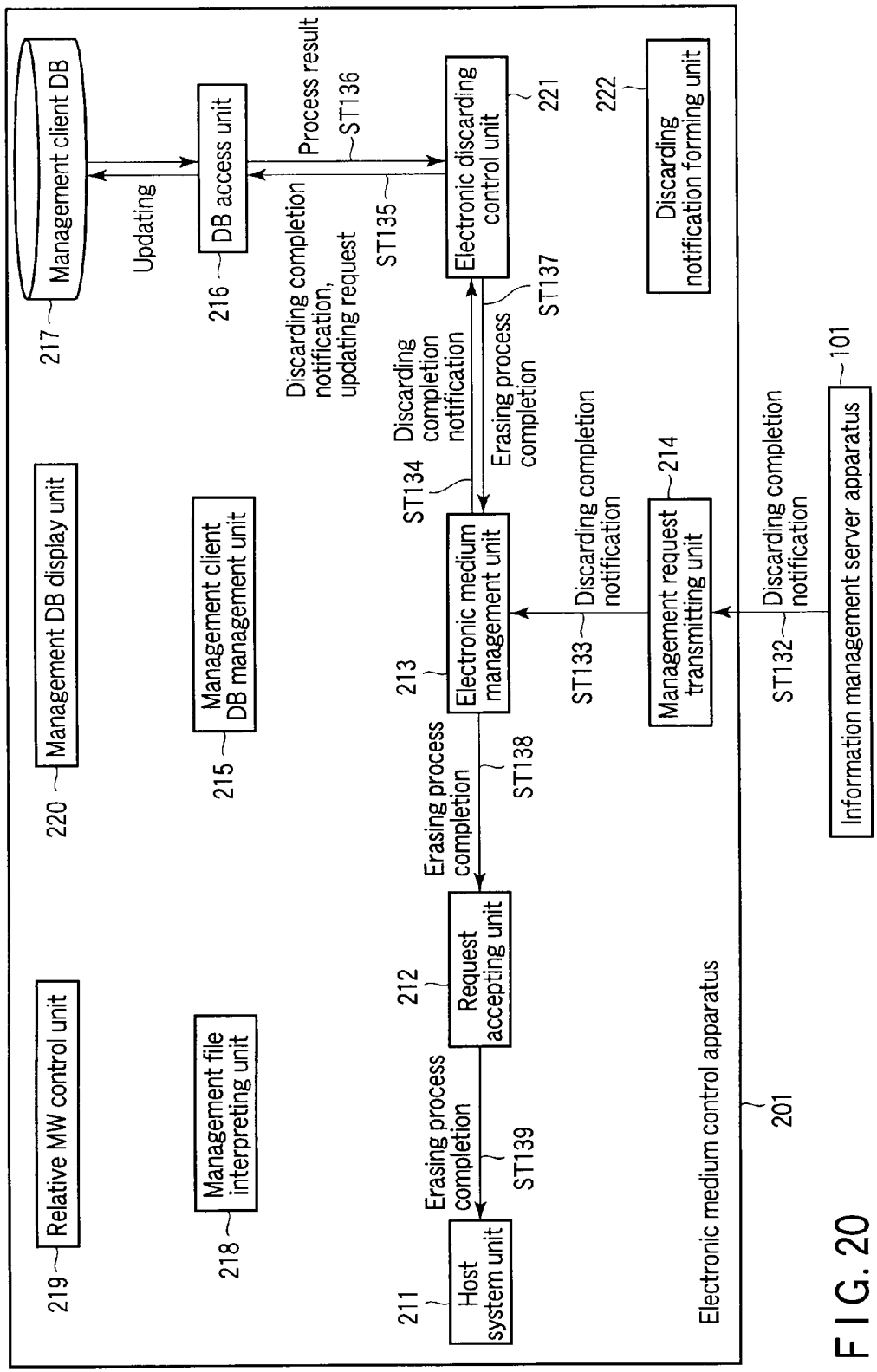
FIG. 20 is a pattern diagram for explaining the discarding process in the embodiment.

(Copying of Management File: FIGS. 13 to 15)

When a registered management file is copied, the electronic medium control apparatus 201 and the information management server apparatus 101 execute the following processes. In this case, operations in units of devices will be described first as an outline, and operations in units of functional blocks of each of the devices will be described next in detail.

[Outline of Copying Operation]

In the electronic medium control apparatus 201, when an electronic copying request including a management ID representing a management file to be copied, user information, a medium type, and a use limitation policy is input, a management file acquiring request including the electronic copying request is generated (ST61 to ST64). On the basis of the management ID in the management file acquiring request, the management file is acquired from the management client DB 217 (ST65), and copying management request information based on the electronic copying request and the acquired management file are transmitted to the information management server apparatus 101 (ST66 to ST68).

In the information management server apparatus 101, when the management file and the copying management request information are received from the electronic medium control apparatus 201, on the basis of the copying management request information, a management ID issue request including apparatus information in the copying management request information as request source information is generated (ST69 to ST70). A management ID is issued on the basis of the management ID issue request, the management ID, an issue time and date, and request source information are registered in the management ID management DB 121 in association with each other, and a registration process result including the management ID is generated (ST71). On the basis of the registration process result, a management file copying request including the management ID in the registration process result, the copying management request information, and the management file is generated (ST72). When the information management server apparatus 101 receives the management file copying request, a copied management file having a header portion including the management ID in the management file in the management file copying request, a management ID issued on the basis of the issue request of the management ID in ST70, the forming time and date information, user information, a medium type, a use limitation policy, and the information management server information is formed (ST73 to ST74). The management ID issued on the basis of the issue request of the management ID in ST70 is associated with the management ID of the management file in the management file copying request in the information management relation DB 122 and written in the information management relation DB 122, and the forming time and date information, the user information, the medium type, the use limitation policy, and the information management server information in the header portions of the plurality of management files are written in the information management relation DB 122 in association with the issued management ID. After the writing, an electronic copying completion notification is transmitted to the electronic medium control apparatus 201 together with the copied management file (ST75 to ST77).

In the electronic medium control apparatus 201, after the transmission of the copying management request information and the management file, on the basis of the management file and the electronic copying completion notification received from the information management server apparatus, a registration request to the management file is generated (ST78 to ST80). On the basis of the management file and the registration request, the management ID, the management ID representing the management file of the copy source of the management file, and the management file substance are written in the management file management table. On the basis of the management file and the registration request, operation time and date information, an operation type, user information, a management ID and a management file name are written in an access log table. After the writing in both the tables, a process result is generated (ST81). On the basis of the process result, the process completion notification including the management ID of the copied management file is output to an input source of the electronic copying request to complete the process (ST82 to ST84).

The above is the outline of the operations in units of devices. Subsequently, operations in units of functional blocks in the device will be described below in detail.

[Details of Copying Operation]

The host system unit 211 inputs an electronic copying request including a management ID representing a management file to be copied, user information, a medium type, and a use limitation policy to the request accepting unit 212 (ST61). The electronic copying request is a copying request of electronic data in a registered management file (parent). More specifically, the copying request includes a management ID to designate the management file (parent) including registered electronic data, user information representing a user who performs an input operation of a copying request, a medium type representing a type of an information medium (child) serving as a copying destination, and a use limitation policy of the copied electronic data in the information medium (child) serving as the copying destination. As the use limitation policy, a use limitation policy (use limitation policy of child) obtained by readjusting a use limitation policy (use limitation policy of parent) in the management file may be used. When the use limitation policy is not changed after and before the copying, the user limitation policy may be omitted from the electronic copying request.

The request accepting unit 212 sends the electronic copying request to the electronic medium management unit 213 in the order of, for example, acceptance (ST62).

The electronic medium management unit 213 sends the electronic copying request to the management client DB management unit 215 (ST63).

When the management client DB management unit 215 receives the electronic copying request, the management client DB management unit 215 generates a management file acquiring request including the electronic copying request to send the management file acquiring request to the DB access unit 216 (ST64).

The DB access unit 216, on the basis of the management ID in the management file acquiring request, acquires a management file from the management client DB and sends the management file to the management client DB management unit 215 (ST65). At this time, the DB access unit 216, on the basis of the electronic copying request in the management file acquiring request, may record "electronic copying process is being executed" on the access log table. A status of the management ID of the management file management table may be changed into "copying process is being executed".

The management client DB management unit 215 sends the management file received from the DB access unit 216 to the electronic medium management unit 213 (ST66).

The electronic medium management unit 213 forms copying management request information based on the electronic copying request from the host system unit 211 and sends the copying management request information to the management request transmitting unit 214 together with the management file received from the management client DB management unit 215 (ST67). The copying management request information may include apparatus information such as a MAC address and IP address related to the electronic medium control apparatus 201, user information, time information, place information, and a use limitation policy. The management request transmitting unit 214 transmits the management file and the copying management request information to the information management server apparatus 101 (ST68).

In the information management server apparatus 101, the management request accepting unit 111 sends the management file and the copying management request information to the information management control unit 112 in the order of, for example, acceptance (ST69).

The information management control unit 112, on the basis of the copying management request information, generates and sends a management ID issue request to the management ID management unit 113 (ST70). At this time, the information management control unit 112 includes apparatus information in the copying management request information in the issue request as request source information. The request source information can regulate information optimal for an applied configuration such as the apparatus information of the electronic medium control apparatus 201 and information related to the user by the corresponding system.

The management ID management unit 113, on the basis of the issue request, issues a management ID and registers the management ID, an issue time and date, and request source information (apparatus information) in the management ID management DB 121 in association with each other. Thereafter, the management ID management unit 113 generates a registration process result including the management ID to send the registration process result to the information management control unit 112 (ST71).

The information management control unit 112 generates a management file copying request including the management ID, and the above-described copying management request information and management file to send the management file copying request to the information management relation management unit 116 (ST72).

The information management relation management unit 116 sends the management file copying request to the management file generating unit 115 (ST73).

The management file generating unit 115, on the basis of the management file copying request, starts copying of the management file.

When authentication data is given to an authentication data portion of the received management file, the management file generating unit 115 verifies the validity of the authentication data. When the authentication data is not valid, the process is interrupted to output an error. When the body portion is encrypted, the encrypted data is decrypted to extract content data.

The management file generating unit 115, as in the new registration, on the basis of the management file copying request, configures a header portion, a body portion, and an authentication data portion. At this time, as a management ID of a parent information medium of the header portion, the management ID of the original management file requested to be copied is input. The copied management file formed as described above is sent to the information management relation management unit 116 (ST74).

The information management relation management unit 116, on the basis of the original management file, the copied management file, the management ID, and the copying management request information, registers forming time and date information, former information (user information), a medium type, a use limitation policy, and the information management server information in the information management relation DB in association with the management ID of the copied management file. In this case, the management ID of the copied management file is registered in association with the management ID of the original management file, and a parent-child relation of the management files is systematically managed.

The information management relation management unit 116 sends an electronic copying completion notification to the information management control unit 112 together with the copied management file (ST75). The information management control unit 112 sends the management file and the electronic copying completion notification to the management request accepting unit 111 (ST76). The management request accepting unit 111 transmits the management file and the electronic copying completion notification to the electronic medium control apparatus 201 (ST77).

In the electronic medium control apparatus 201, the management request transmitting unit 214 sends the received management file and electronic copying completion notification to the electronic medium management unit 213 (ST78).

When the electronic medium management unit 213 receives the management file and the electronic copying completion notification, the electronic medium management unit 213 generates a registration request to the management file and sends the management file and the registration request to the management client DB management unit 215 (ST79).

The management client DB management unit 215 sends the management file and the registration request to the DB access unit 216 (ST80).

When the DB access unit 216 receives the management file and the registration request, the DB access unit 216 adds an entry to the management file management table of the management client DB 217 by using the management ID as a main key and registers a status, header portion information, and a management file substance. As the header portion information, a management ID of a parent management file of the management file may be registered.

The DB access unit 216 registers an electronic copying operation log including operation time and date information, an operation type, user information, a management ID, and a management file name in an access log table.

Thereafter, the DB access unit 216 generates and sends the process result to the management client DB management unit 215 (ST81).

The management client DB management unit 215, on the basis of the process result, notifies the electronic medium management unit 213 of DB registration process completion of electronic copying (ST82).

The electronic medium management unit 213 sends a process completion notification including the management ID of the copied management file to the request accepting unit 212 (ST83). The request accepting unit 212 outputs the process completion notification including the management ID to the host system unit 211 to complete the process (ST84).

(Discarding of Management File: FIGS. 16 to 20)

When the registered management file is to be erased, the electronic medium control apparatus 201 and the information management server apparatus 101 execute the following processes. In this case, operations in units of devices will be described first as an outline, and operations in units of functional blocks of each of the devices will be described next in detail.

[Outline of Discarding Operation]

In the electronic medium control apparatus 201, an erasing request including a management ID representing a management file to be erased, erasing request source information, and user information is input (ST100). When the electronic medium control apparatus 201 receives the erasing request, the electronic medium control apparatus 201 generates a management file acquiring request including the erasing request (ST101 to ST103), and acquires the management file from the management client DB 217 on the basis of the management ID in the management file acquiring request (ST104). On the basis of the management file, erasing inquiry request information including the management ID of the management file, apparatus information of the electronic medium control apparatus 201, erasing request source information in the erasing request, and user information is formed, and the erasing inquiry request information is transmitted to the information management server apparatus 101 (ST105 to ST107).

In the information management server apparatus 101, on the basis of the erasing inquiry request information received from the electronic medium control apparatus 201, an erasing permission/impermission determination is requested (ST108 to ST110). On the basis of the erasing inquiry request information, with reference to the information management relation DB 122, it is determined whether the management ID in the erasing inquiry request information is present in the information management relation DB 122, and it is determined whether the apparatus information of the electronic medium control apparatus 201, the erasing request source information, and the user information satisfy authority of erasing in the use limitation policy in the management file. From these determination results, an erasing determination result representing erasable or inerasable is generated. The erasing determination result is transmitted to the electronic medium control apparatus 201 (ST111 to ST114).

In the electronic medium control apparatus 201, the erasing determination result received from the information management server apparatus 101 is verified. When the erasing determination result represents that an erasing process is possible, an erasing process result including the management ID is generated (ST115 to ST117). On the basis of the erasing process request, discarding time and date information is added to the management file management table to erase the management file substance, an operation time and date of the access log table and the operation type are erased, and the user information and the management ID are updated. A process result including the management ID representing the erased management file is notified (ST118), and a discarding notification forming request including the process result is generated (ST119). On the basis of the discarding notification forming request, a discarding notification including the management ID of the erased management file, the apparatus information of the electronic medium control apparatus, the user information, and notification information constituted by a forming time and date information of the notification in the header portion is formed (ST120). The discarding notification is transmitted to the information management server apparatus 101 (ST121 to ST123).

In the information management server apparatus 101, on the basis of the discarding notification received from the electronic medium control apparatus 201, an invalidation process request is generated by using the apparatus information in the discarding notification as request source information (ST125). On the basis of the invalidation process request, the management ID is invalidated to update the management ID management DB 121, and an invalidation process result including the invalid management ID is generated (ST126). On the basis of the erasing management request information including the management ID in the invalidation process result and the discarding notification, a verification request of the discarding notification is generated (ST127 to ST128). On the basis of the discarding notification and the verification request, with reference to the information management relation DB 122, it is verified whether the management ID in the discarding notification is present in the information management relation DB 122, and it is verified whether the notification information in the discarding notification satisfies the erasing authority in the use limitation policy in the information management relation DB 122 (ST129). When the verification result represents validity, a discarding time and date is recorded in association with the management ID in the information management relation DB 122 corresponding to the management ID in the discarding notification, and a discarding completion notification is transmitted to the electronic medium control apparatus 201 (ST130 to ST132).

In the electronic medium control apparatus 201, on the basis of the discarding completion notification received from the information management server apparatus 101, the discarding time and date is written in association with the management ID of the management file management table, and a log of the process completion is stored in the access log table to generate a process result (ST133 to ST136). On the basis of the process result, the input source of the erasing request is notified of the erasing process completion of the management file, and the process is completed (ST139).

The above is the outline of the operations in units of devices. Subsequently, operations in units of functional blocks in the device will be described in detail.

[Details of Discarding Operation]

The host system unit 211 inputs an erasing request including the management ID representing a management file to be erased, erasing request source information (host system information), and user information to the request accepting unit 212 (ST100).

The request accepting unit 212 sends the erasing requests to the electronic medium management unit 213 in the order of, for example, acceptance (ST101).

The electronic medium management unit 213 sends the erasing request to the electronic discarding control unit 221 (ST102).

When the electronic discarding control unit 221 receives the erasing request, the electronic discarding control unit 221 generates a management file acquiring request including the erasing request to send the management file acquiring request to the DB access unit 216 (ST103).

The DB access unit 216 acquires the management file from the management client DB on the basis of the management ID in the management file acquiring request to send the management file to the electronic discarding control unit 221 (ST104). At this time, the DB access unit 216, on the basis of the erasing request in the management file acquiring request, may record "erasing process is being executed" on the access log table. A status of the management ID of the management file management table may be changed into "erasing process is being executed".

The electronic discarding control unit 221 forms erasing inquiry request information to inquire about erasing permission/impermission of the management file on the basis of the management file received from the DB access unit 216, and sends the erasing inquiry request information to the electronic medium management unit 213 (ST105). The management ID of the management file is included in the erasing inquiry request information. In addition, the apparatus information of the electronic medium control apparatus 201, the erasing request source information in the erasing request, the user information, and the place information of the erasing request may be included in the erasing inquiry request information.

The electronic medium management unit 213 sends the erasing inquiry request information to the management request transmitting unit 214 (ST106). The management request transmitting unit 214 transmits the erasing inquiry request information to the information management server apparatus 101 (ST107).

In the information management server apparatus 101, the management request accepting unit 111 sends the erasing inquiry request information to the information management control unit 112 in the order of, for example, acceptance (ST108). The information management control unit 112 sends the erasing inquiry request information to the information management relation management unit 116 (ST109).

The information management relation management unit 116 sends the erasing inquiry request information to the discarding verifying unit 117 to request an erasing permission/impermission determination (ST110).

The discarding verifying unit 117, on the basis of the erasing inquiry request information, with reference to the information management relation DB 122, performs an erasing determination of the management file. More specifically, the discarding verifying unit 117 verifies whether the management ID in the erasing inquiry request information is present in the information management relation DB 122 or whether a request environment satisfies an erasability condition. For example, it is determined whether the apparatus information of the electronic medium control apparatus 201 serving as a request source, the host system information, the user information, the place information of the request, and the like satisfy an erasing authority in the use limitation policy in the management file. The discarding verifying unit 117 generates an erasing determination result representing erasable or inerasable from the determination results and sends the erasing determination result to the information management relation management unit 116 (ST111). The erasing determination result representing erasable is obtained when the management ID in the erasing inquiry request information is present in the information management relation DB 122 and when the request environment satisfies an erasability condition. When the erasing determination result represents inerasable, an erasing determination result representing inerasable is obtained.

The information management relation management unit 116 sends the erasing determination result to the information management control unit 112 (ST112). The information management control unit 112 sends the erasing determination result to the management request accepting unit 111 (ST113). The management request accepting unit 111 sends the erasing determination results to the electronic medium control apparatus 201 in the order of acceptance (ST114).

In the electronic medium control apparatus 201, the management request transmitting unit 214 sends the received erasing determination result to the electronic medium management unit 213 (ST115).

The electronic medium management unit 213 sends the erasing determination result to the electronic discarding control unit 221 (ST116).

The electronic discarding control unit 221 verifies the erasing determination result. When the erasing determination result represents that the erasing process is improper, an error notification is sent to the host system unit 211 through the electronic medium management unit 213 and the request accepting unit 212.

On the other hand, when the erasing determination result represents that the erasing process is possible, the electronic discarding control unit 221 generates the erasing process request including the management ID to send the erasing process request to the DB access unit 216 (ST117). The DB access unit 216, on the basis of the erasing process request, performs the erasing process to the management client DB 217.

More specifically, the discarding time and date information is added to the header portion information of the management file management table to change the status into discarding (dead), and the management file substance is erased. An operation time and date and an operation type of the access log table are erased, and the user information and the management ID are updated. Thereafter, the DB access unit 216 notifies the electronic discarding control unit 221 of the process result including the management ID representing the erased management file (ST118).

The electronic discarding control unit 221, on the basis of the process result, confirms that the management client DB 217 could be normally updated from the DB access unit 216, and generates and sends a discarding notification forming request including the process result to the discarding notification forming unit 222 (ST119).

Figure 21:
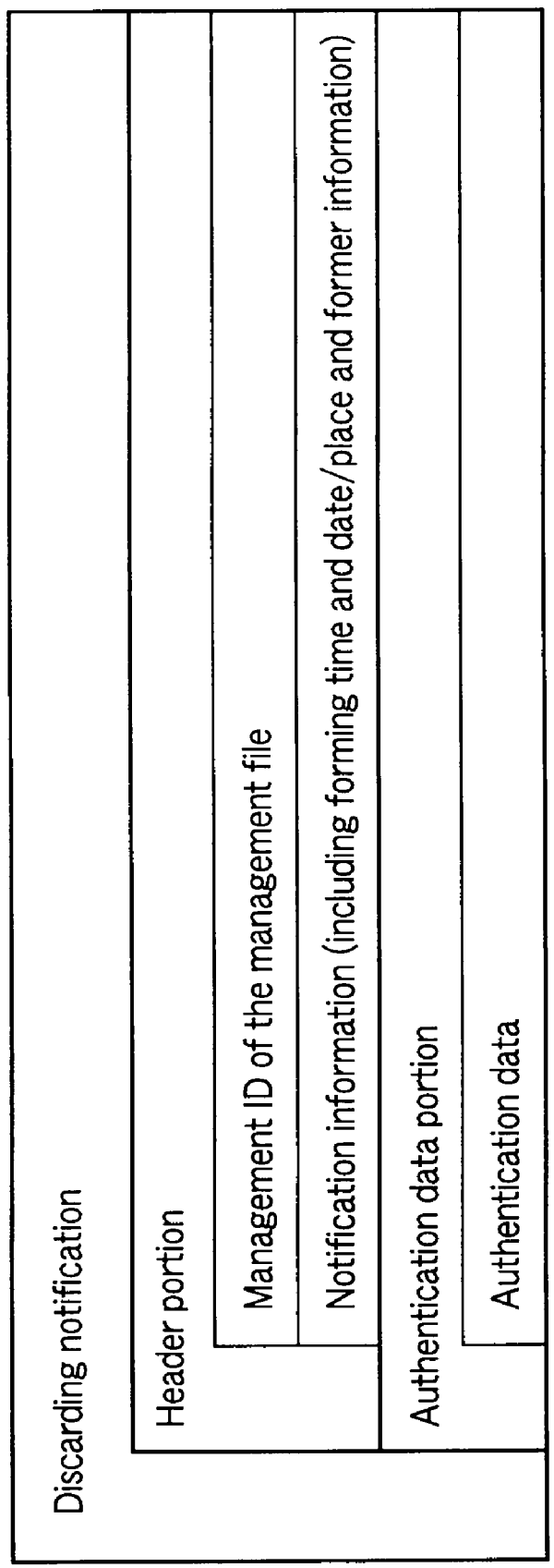
FIG. 21 is a pattern diagram for explaining a discard notification in the embodiment.

The discarding notification forming unit 222, on the basis of the discarding notification forming result, as shown in FIG. 21, starts forming of the discarding notification.

The header portion includes the management ID of the erased management file and the notification information. If necessary, authentication data is given to the authentication data portion. In this case, in the notification information, apparatus information such as a MAC address or an IP address related to the electronic medium control apparatus 201, user information, and a forming time and date and place information of the notification may be included or may not be included. For example, the place information may be omitted from the notification information. As the authentication data, like the authentication data of the management file, an electronic signature based on a public key cryptosystem such as DSA, RSA, or ECDSA or a MAC (Message Authentication Code) using a hash function or a symmetric cryptosystem can be used. The discarding notification forming unit 222 sends the formed discarding notification to the electronic discarding control unit 221 (ST120).

The electronic discarding control unit 221 notifies the electronic medium management unit 213 of the discarding notification (ST121). The electronic medium management unit 213 sends the discarding notification and a transmission request to the information management server apparatus 101 to the management request transmitting unit 214 (ST122). The management request transmitting unit 214 sends the discarding notification to the information management server apparatus 101 (ST123).

In the information management server apparatus 101, the management request accepting unit 111 sends the discarding notifications to the information management control unit 112 in the order of, for example, acceptance (ST124).

The information management control unit 112, on the basis of the discarding notification, generates and sends an invalidation process request of the management ID to the management ID management unit 113 (ST125). At this time, the information management control unit 112 includes the apparatus information in the discarding notification in the invalidation process request as request source information. The request source information can regulate information optimal for an applied configuration such as the apparatus information of the electronic medium control apparatus 201 and information related to the user of the apparatus by the corresponding system. The management ID management unit 113, on the basis of the invalidation request from the information management control unit 112, invalidates the management ID and updates the management ID management DB 121. The management ID management unit 113 generates the invalidation process result including the management ID to send the invalidation process result to the information management control unit 112 (ST126).

The information management control unit 112 sends the erasing management request information including the management ID in the invalidation process result and the discarding notification to the information management relation management unit 116 (ST127).

When the information management relation management unit 116 receives the erasing management request information and the discarding notification, the information management relation management unit 116 generates a verification request to the discarding notification and sends the discarding notification and the verification request to the discarding verifying unit 117 (ST128).

The discarding verifying unit 117 verifies the validity of the discarding notification on the basis of the discarding notification and the verification request, with reference to the information management relation DB 122. More specifically, the discarding verifying unit 117 executes both the content verification which verifies whether the management ID in the discarding notification is present in the information management relation DB 122 or whether the notification information in the discarding notification satisfies the erasing authority in the use limitation policy in the information management relation DB 122 and authentication data verification which verifies the authentication data of the discarding notification by the public key of the electronic medium control apparatus 201. When the authentication data is not present, authentication data verification is not executed. The discarding verifying unit 117 sends a verification result to the information management control unit 112 (ST129).

The information management relation management unit 116 interrupts the process when the verification result represents invalidity, and outputs an error. The error is transmitted from the management request accepting unit 111 to the electronic medium control apparatus 201. When the verification result represents validity, the information management relation management unit 116 updates the information management relation DB 122 to reflect the erasing process. More specifically, the information management relation management unit 116 describes a dead state and a discarding time and date in presence information. Information such as apparatus information, user information, and place information related to an erasing requester or a situation may be recorded. The information management relation management unit 116 forms a discarding completion notification representing that the process is validly completed and sends the discarding completion notification to the information management control unit 112 (ST130).

The information management control unit 112 sends the discarding completion notification to the management request accepting unit 111 (ST131). The management request accepting unit 111 transmits the discarding completion notification to the electronic medium control apparatus 201 in the order of, for example, acceptance (ST132).

In the electronic medium control apparatus 201, the management request transmitting unit 214 sends the received discarding completion notification to the electronic medium management unit 213 (ST133). The electronic medium management unit 213 sends the discarding completion notification to the electronic discarding control unit 221 (ST134). The electronic discarding control unit 221 sends the discarding completion notification and the updating request to the DB access unit 216 (ST135). The DB access unit 216 updates the management client DB 217 on the basis of the discarding completion notification. More specifically, the DB access unit 216 writes the discarding time and date in association with the management ID of the management file management table, sets the status as discarding (−), and stores a log of process completion in the access log table. Thereafter, the DB access unit 216 generates the process result to send the process result to the electronic discarding control unit 221 (ST136).

The electronic discarding control unit 221, on the basis of the process result, notifies the electronic medium management unit 213 of completion of the erasing process of the management file (ST137).

The electronic medium management unit 213 notifies the request accepting unit 212 of the completion of the erasing process (ST 138). The request accepting unit 212 notifies the host system unit 211 of the completion of the erasing process to complete the process (ST139).

During the above operation, the DB access unit 216 may change a timing at which a management file substance in the management client DB 217 is erased into a timing at which the final completion of the erasing process in step ST136 is reflected on the DB. As the management file erasing process, a timed erasing process which is automatically activated at a certain time of day may be implemented. In this implementation, for example, the electronic medium management unit 213 or the electronic discarding control unit 221 is activated to send an erasing request.

Figure 22:
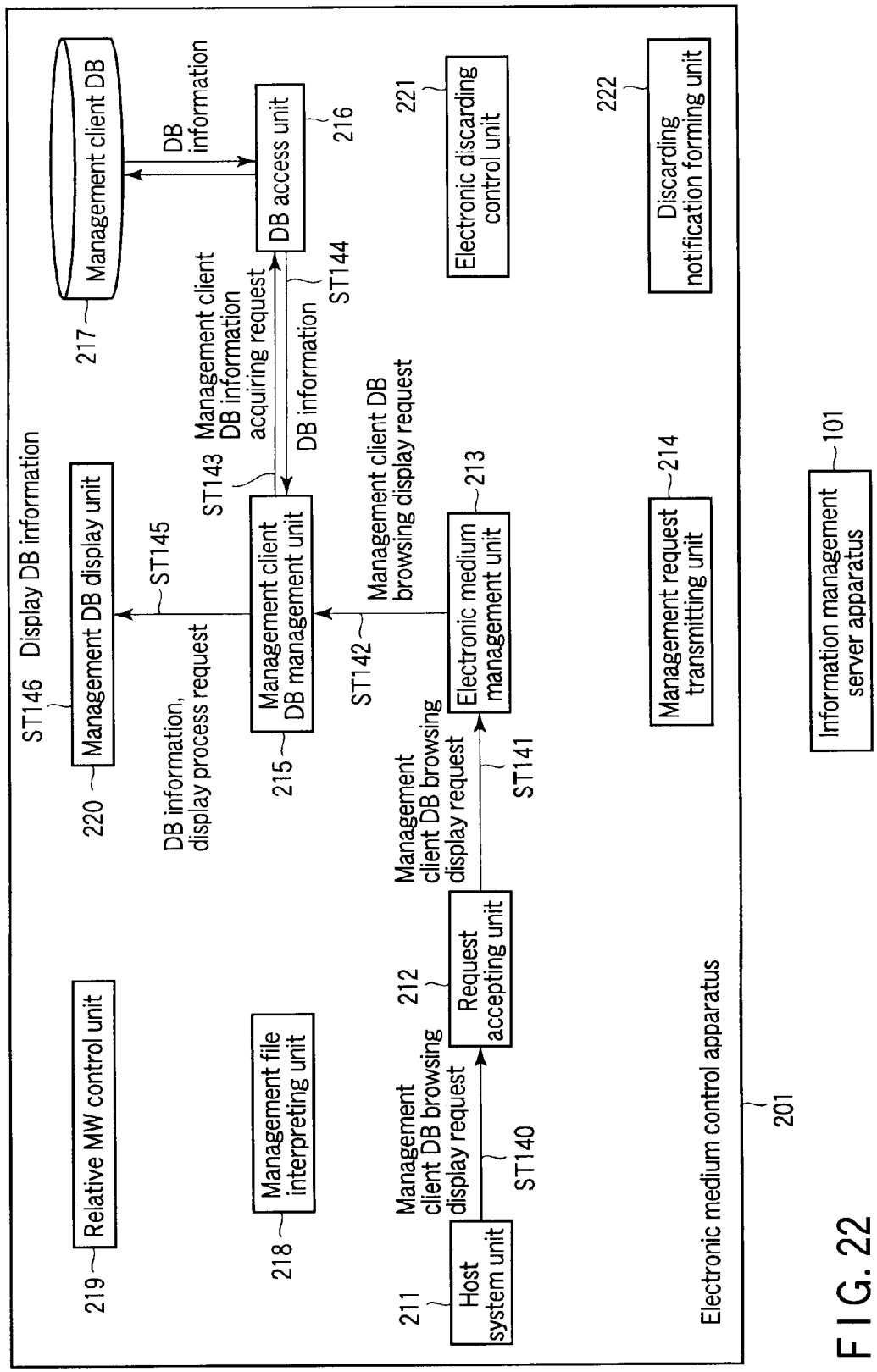
FIG. 22 is a pattern diagram for explaining a management client DB referring process in the embodiment.

(Referring to Management Client DB: FIG. 22)

When the management client DB information in the management client DB 217 is browsed and displayed, the electronic medium control apparatus 201 performs the following process.

The host system unit 211 sends a management client DB browsing display request to the request accepting unit 212

(ST140). The request accepting unit 212 sends the management client DB browsing display requests to the electronic medium management unit 213 in the order of, for example, acceptance (ST141). The electronic medium management unit 213 sends the management client DB browsing display request to the management client DB management unit 215 (ST142).

The management client DB management unit 215, on the basis of the management client DB browsing display request, sends the management client DB information acquiring request to the DB access unit 216 (ST143).

The DB access unit 216, on the basis of the management client DB information acquiring request, acquires the management client DB information from the management client DB 217 to send the management client DB information to the management client DB management unit 215 (ST144).

The management client DB management unit 215 sends the acquired management client DB information and the display process request to the management DB display unit 220 (ST145). The management DB display unit 220 displays the acquired management client DB information (ST146).

(Referring to Information Management Relation DB: FIGS. 23 and 24)

When the information management relation DB information in the information management server apparatus 101 is browsed and displayed, the electronic medium control apparatus 201 and the information management server apparatus 101 execute the following processes.

The host system unit 211 sends an information management relation DB viewing display request to the request accepting unit 212 (ST150). The request accepting unit 212 sends the information management relation DB browsing display requests to the electronic medium management unit 213 in the order of, for example, acceptance (ST151). The electronic medium management unit 213 sends an information management relation DB reference request to the management request transmitting unit 214 (ST152).

The management request transmitting unit 214 transmits the information management relation DB reference request to the information management server apparatus 101 (ST153).

In the information management server apparatus 101, the management request accepting unit 111 sends the information management relation DB reference requests to the information management DB reference control unit 114 in the order of, for example, acceptance (ST154).

The information management DB reference control unit 114 acquires information in response to the information management relation DB reference request from the information management relation DB, and sends the acquired information management DB reference information to the management request accepting unit 111 (ST155). At this time, the information management DB reference control unit 114, on the basis of information such as the apparatus information (MAC address, IP address, or the like) related to the electronic medium control apparatus 201, user information, a request time and date, or a request place, may control access to the information management relation DB 122. The management request accepting unit 111 transmits the acquired information management DB reference information to the electronic medium control apparatus 201.

In the electronic medium control apparatus 201, the management request transmitting unit 214 sends the received information management DB reference information to the electronic medium management unit 213 (ST156). The electronic medium management unit 213 sends the information management DB reference information and a display request to the management client DB management unit 215 (ST157).

The management client DB management unit 215 sends the information management DB reference information and the display request to the management DB display unit (ST158). The management DB display unit 220 displays the information management DB reference information (ST159).

As described above, according to the embodiment, by a configuration including the information management relation DB 122 in which a management ID newly issued for copying, forming time and date information in the header portion of the copied management file, user information, a medium type, a use limitation policy, and information management server information are stored in association with each other to the management ID of the management file in the management file copying request information, an information life cycle can be managed even though information to be managed is converted into a variety of information to be managed.

Accordingly, a medium-cross-sectional monitor for a variety of "information media" such as digital data, paper media, and a CD-ROM and efficiency and completeness of appropriate collecting, deleting, and discarding processes are improved to make it possible to prevent information from unexpectedly leaking (out-of-control) and to reinforce complete management of an information asset.

Second Embodiment

FIG. 25 is a block diagram showing a configuration of an information life-cycle management system according to a second embodiment of the invention. The same reference symbols as in the above drawings denote the same parts in FIG. 25, and a detailed description thereof will be omitted. Different parts will be mainly described below.

More specifically, the second embodiment is a concrete example of the first embodiment, and has a configuration in which electronic data in a management file is copied to be printed on a paper medium together with a management ID for the paper medium. More specifically, the second embodiment is constituted by the information management server apparatus 101, the electronic medium control apparatus 201 which requires the management file to be printed, and a paper medium conversion control apparatus 301 which prints the management file on the paper medium.

An operation of a print process of an information life-cycle management system constituted as described above will be described below with reference to FIGS. 26 to 30.

The host system unit 211 sends a management ID of a management file to be printed and a print request including the number of prints to the request accepting unit 212 (ST300). The request accepting unit 212 sends the print requests to the electronic medium management unit 213 (ST301) in the order of, for example, acceptance. The electronic medium management unit 213 sends the print request to the management client DB management unit 215 (ST302).

The management client DB management unit 215 sends a management file acquiring request including the management ID in the print request to the DB access unit 216 (ST303).

The DB access unit 216, on the basis of the management file acquiring request, acquires the management file from the management client DB 217 to send the management file to the management client DB management unit 215 (ST304). At this time, the DB access unit 216 may record the start of the printing process on the access log table.

The management client DB management unit 215 sends the printing management file acquiring request including the management file and the above-described print request to the electronic medium management unit 213 (ST305). The printing management file acquiring request is to request acquisition of a set of management files (management file of the number of prints) for paper medium printing derived from the management file.

The electronic medium management unit 213 sends the printing management file acquiring request to the management request transmitting unit 214 (ST306). The management request transmitting unit 214 transmits the printing management file acquiring request to the information management server apparatus 101 (ST307).

In the information management server apparatus 101, the management request accepting unit 111 sends the received printing management file acquiring request to the information management control unit 112 in the order of, for example, acceptance (ST308).

The information management control unit 112 sends the printing management file acquiring request and a printing permission/impermission determination request to the information management relation management unit 116 to request a printing permission/impermission determination of the management file (ST309). The information management relation management unit 116 refers to and browses the information management relation DB 122 on the basis of the printing management file acquiring request to execute the printing permission/impermission determination of the management file. As an example of the permission/impermission determination, it is verified whether information such as a printing authority holder, a designation period, a designation place, and a designation apparatus satisfy a printability condition in the use limitation policy in the information management relation DB 122. When the information does not satisfy the printability condition, the management request accepting unit 111 notifies the electronic medium control apparatus 201 of error information. When the information satisfies the printability condition, the information management relation management unit 116 sends a printing permission/impermission determination result to the information management control unit 112 (ST310).

The information management control unit 112, on the basis of the printing permission/impermission determining result, requests the management ID management unit 113 to issue a management ID for a paper medium of the number of prints (ST311). The management ID management unit 113 issues the management ID for the paper medium of the number of prints and sends the management ID to the information management control unit 112 (ST312).

As the management ID for the paper medium, for example, a management ID including a medium type "paper" is used. In the example in FIG. 6, a medium type "2" of the lower third digit of a management ID "1001201" represents a paper medium. In FIG. 6, a medium type "1" of the lower third digit of another management ID represents electronic data, and a medium type "3" of the lower third digit of still another management ID represents a CD-ROM.

The information management control unit 112 sends a printing management file generating request including the management ID of the number of prints to the information management relation management unit 116 (ST313).

When the information management relation management unit 116 receives the printing management file generating request, the information management relation management unit 116 sends a management file serving as a parent and the management ID of the number of prints to the management file generating unit 115 (ST314). The management file generating unit 115 generates a management file for printing of the number of prints by using the management file serving as a parent and the management ID of the number of prints. At this time, as the management file for printing, since electronic data in the body portion is not changed, a configuration in which the body portion is empty may be used. In the management ID of the electronic data of the header portion, a management ID issued for a paper medium is stored. A management ID designated by the host system unit 211 as parent data is stored as the management ID of the parent information medium. Thereafter, the management file generating unit 115 sends the formed management file for printing of the number of prints to the information management relation management unit 116 (ST315).

The information management relation management unit 116, on the basis of the management file of the parent information medium and the management file for printing, updates the information management relation DB 122. More specifically, the management ID of the number of prints of the printing management file is written in association with the management ID serving as a parent, and information of the header portion of the printing management file is recorded in association with the management ID of the number of prints. A paper medium is recorded as a medium type in association with the management ID for the paper medium. Upon completion of updating to the information management relation DB, the information management relation management unit 116 sends a process completion notification to the information management control unit 112 together with a set of management files (management file of the number of prints) for printing (ST316).

The information management control unit 112 sends the set of management files, the process completion notification, and a transmission request to the management request accepting unit 111 (ST317). The management request accepting unit 111, on the basis of the transmission request, transmits the set of management files and the process completion notification to the electronic medium control apparatus 201 (ST318).

In the electronic medium control apparatus 201, the management request transmitting unit 214 sends the received set of management files and process completion notification to the electronic medium management unit 213 (ST319).

The electronic medium management unit 213 sends the set of management files and the printing request to the management client DB management unit 215 (ST320).

The management client DB management unit 215 sends the set of management files and the printing request to a medium conversion communication unit 223 (ST321). The medium conversion communication unit 223 transmits the set of management files and the printing request to the paper medium conversion control apparatus 301 (ST322).

In the paper medium conversion control apparatus 301, a paper medium conversion communication unit 311 sends the received set of management files and printing request to a paper medium conversion control unit 312 (ST323).

The paper medium conversion control unit 312 extracts the management ID from the received set of management files, and sends the management ID to a management ID code generating unit 313 (ST324).

The management ID code generating unit 313 generates a management ID code to the received management ID. The management ID code is an engineering code such as a bar code, a two-dimensional code, a color code, or a watermark. When the management ID code generating unit 313 can functionally cooperate with the printing control unit 314, an electronic tag such as an RFID tag may be stuck to the paper medium. The generated management ID code is sent from the management ID code generating unit 313 to the paper medium conversion control unit 312 (ST325).

The paper medium conversion control unit 312 generates print data with a management ID code of the number of prints from the management ID code and the paper medium management file or the electronic data body stored in the body portion of the parent management file, and sends the print data to the printing control unit 314 (ST326).

The printing control unit 314 performs a printing process to the print data of the number of prints. When the printing process is normally completed, the printing control unit 314 sends a printing completion notification to the paper medium conversion control unit 312 (ST327). The paper medium conversion control unit 312 sends the printing completion notification to the paper medium conversion communication unit 311 (ST328). The paper medium conversion communication unit 311 transmits the printing completion notification to the electronic medium control apparatus 201 (ST329).

In the electronic medium control apparatus 201, the medium conversion communication unit 223 sends the printing completion notification to the management client DB management unit 215 (ST330).

When the management client DB management unit 215 receives the printing completion notification, the management client DB management unit 215 sends a DB updating request including the printing completion notification to the DB access unit 216 (ST331).

The DB access unit 216, on the basis of the DB updating request, writes a management ID of a parent management file as an item of the management ID of the access log table of the management client DB 217 and writes a file name of the parent management file as an item of a management file. The management ID for paper medium may be described as log information. Since a management file substance for printing is not present, the management file substance for printing is not recorded on the management file management table. The management file substance for printing is a temporary virtual information medium used until the information is printed on paper to generate a paper medium. This is because, although the management file substance is present as a paper medium after the printing, the management file substance is not present as electronic information.

After the management client DB 217 is updated, the DB access unit 216 sends an updating result to the management client DB management unit 215 (step 332).

The management client DB management unit 215 sends the printing completion notification and the updating completion notification to the electronic medium management unit 213 (ST333). The electronic medium management unit 213 sends printing management process completion including both the completion notifications to the request accepting unit 212 (ST334).

The request accepting unit 212 notifies the host system unit 211 of the printing management process completion to complete the process (ST335).

As described above, according to the embodiment, even in the configuration in which electronic data in a management file is copied and printed on a paper medium together with the management ID for the paper medium, the same effect as in the first embodiment can be obtained.

Third Embodiment

Figure 31:
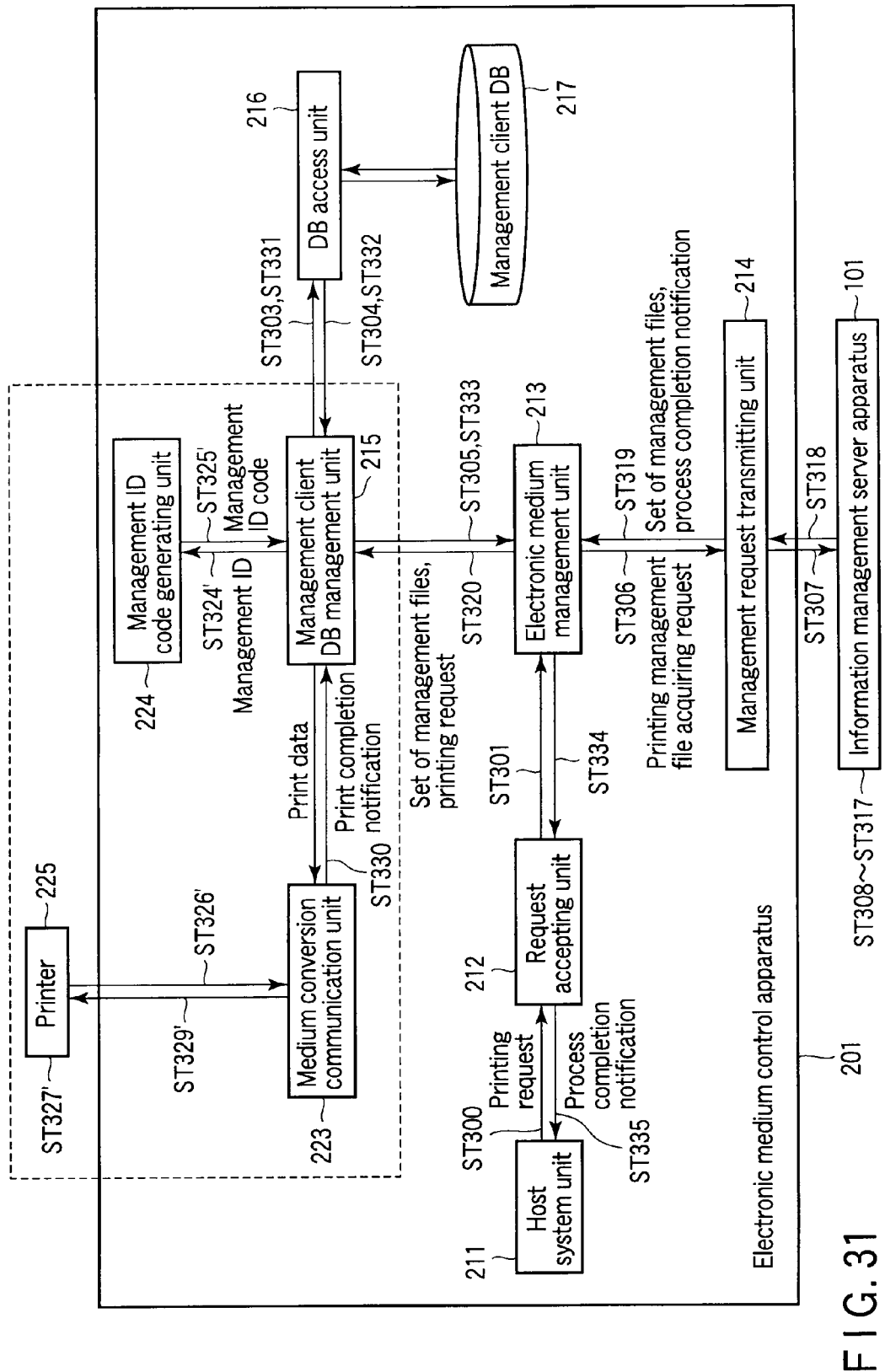
FIG. 31 is a block diagram showing a configuration of an information life-cycle management system according to a third embodiment of the present invention.

FIG. 31 is a block diagram showing a configuration of an information life-cycle management system according to a third embodiment of the present invention.

The embodiment is a modification of the second embodiment, and has a configuration in which the management ID code generating unit 313 is mounted on the electronic medium control apparatus 201. More specifically, the management client DB management unit 215 includes a partial function of the paper medium conversion control unit 312 and cooperates with the management ID code generating unit 313 to give management-ID-embedded print data to a printer or a multi-function printer having an existing printing function.

The third embodiment is different from the second embodiment in the management client DB management unit 215, the medium conversion communication unit 223, and a management ID code generating unit 224. To the management client DB management unit 215, a function of requesting the management ID code generating unit 224 to generate a management ID code to receive a management ID code and a function of storing the management ID code in print electronic data to output the electronic data to the medium conversion communication unit 223 as print data are added. For example, management ID codes are given to the front page of a WORD document serving as an object to be printed to request the printer 225 for each file.

The technical effect can be used in a printer or a multi-function printer having an existing printing function, not in the paper medium conversion control apparatus 301 corresponding to the system. However, the embodiment can be applied not to a configuration which gives a physical ID tag such as RFID in which a management ID is stored on the printer side or the multi-function printer side but to a configuration in which an ID tag can be realized as electronic data such as a bar code, a two-dimensional code, or a color code.

In an operation of the embodiment, of the steps of the second embodiment, steps ST321 to ST323 and step ST328 are omitted.

More specifically, steps ST300 to ST320 are executed as in the second embodiment. After step ST320, the management client DB management unit 215 extracts a management ID from a set of management files and sends the management ID to the management ID code generating unit 224 (ST324').

The management ID code generating unit 224 generates a management ID code to the management ID to send the management ID code to the management client DB management unit 215 (ST325').

The management client DB management unit 215 generates print data with a management ID code of the number of prints from the management ID code and a management file for a paper medium or an electronic data body stored in the body portion of the parent management file, and transmits the print data from the medium conversion communication unit 223 to the printer 225 (ST326').

The printer 225 performs a printing process to the print data of the number of prints. When the process is normally completed, the printer 225 sends a printing completion notification to the electronic medium control apparatus 201 (ST327', ST329').

In the electronic medium control apparatus 201, the paper medium conversion communication unit 223 sends the printing completion notification to the management client DB management unit 215 (ST330).

As described above, steps ST331 to ST335 are executed.

As described above, according to the embodiment, as in a configuration in which the management ID code generating unit 313 is mounted on the electronic medium control apparatus 201, the effect of the second embodiment can be obtained by using the ordinary printer 225.

Fourth Embodiment

Figure 32:
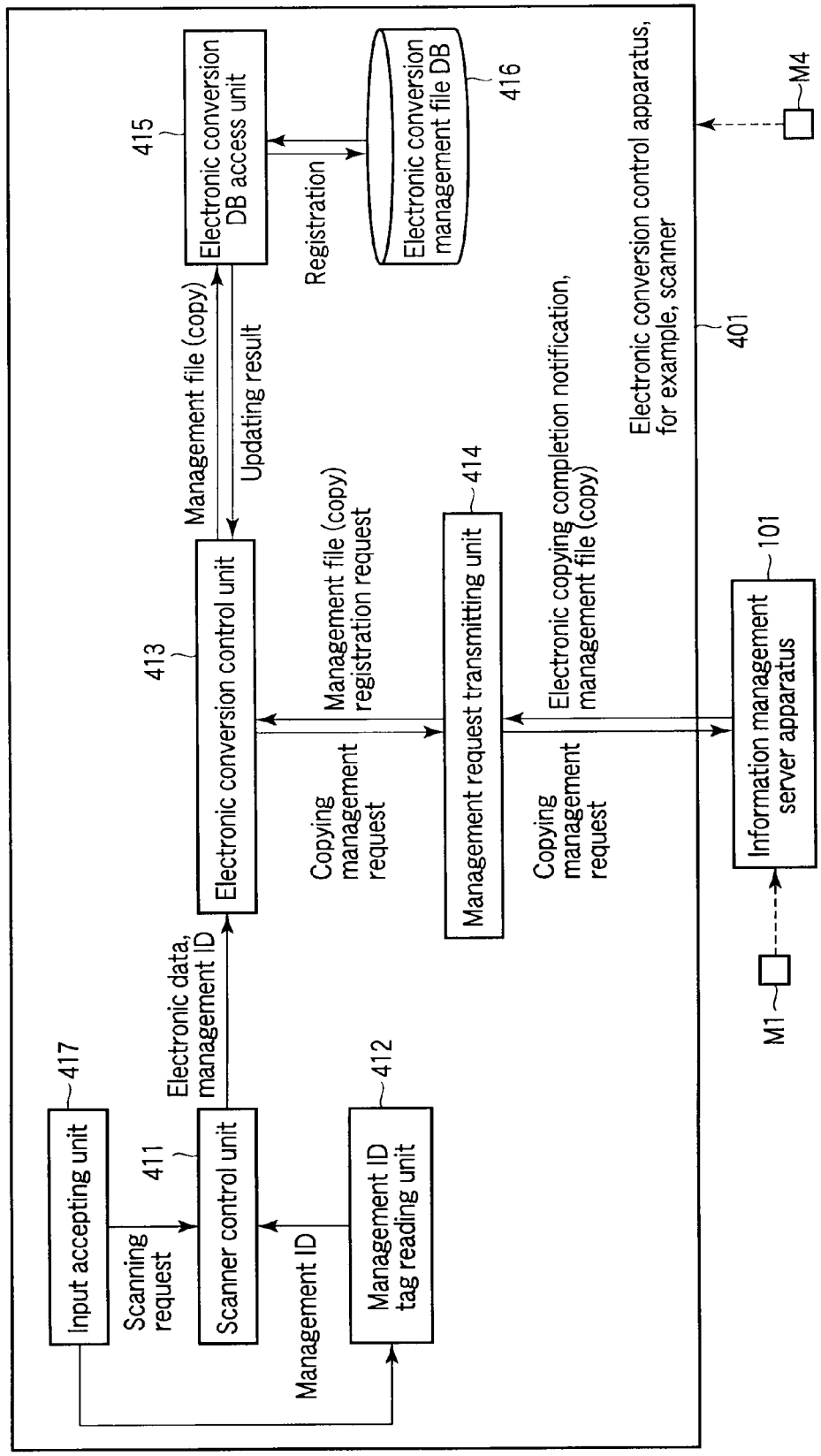
FIG. 32 is a block diagram showing a configuration of an information life-cycle management system according to a fourth embodiment of the present invention.

FIG. 32 is a block diagram showing a configuration of an information life-cycle management system according to a fourth embodiment of the present invention.

The fourth embodiment, unlike in the first embodiment in which electronic data of a parent information medium is electronically copied to generate electronic data of a child information medium, electronically copies the electronic data read from the paper medium serving as a parent information medium to generate electronic data of the child information medium. Accordingly, in place of the electronic medium control apparatus 201 according to the first embodiment, an electronic conversion control apparatus 401 is arranged.

The electronic conversion control apparatus 401 is an apparatus having a network communication function and a function of converting information written on a paper medium into electronic data. For example, a scanner and a multi-function printer are applied. Described below is an operation flow in which the apparatus and the information management server apparatus 101 cooperate with each other to output a management file serving as a child of the information medium from a paper medium to which the management ID is given as an information medium and which serves as a systematical parent. In this case, the parent information medium has a management ID by using a storage medium of identification information such as a bar code, a two-dimensional code, a color code, or an RFID.

The electronic conversion control apparatus 401 comprises a scanner control unit 411, a management ID tag reading unit 412, an electronic conversion control unit 413, a management request transmitting unit 414, an electronic conversion DB access unit 415, an electronic conversion management file DB 416, and an input accepting unit 417.

An operation of an information life-cycle management system configured as described above will be described below.

In the electronic conversion control apparatus 401, the input accepting unit 417 inputs a scanning request to the management ID tag reading unit 412 and the scan control unit 411.

When the management ID tag reading unit 412 receives the scanning request, the management ID tag reading unit 412 reads the management ID from the management ID tag given to a parent paper medium input to the electronic conversion control apparatus 401. The management ID tag reading unit 412 can be realized by a variety of devices such as a bar code reader, a two-dimensional code reader, a color code reader, and an RFID reader according to a physical storage system of the management ID. The management ID tag reading unit 412 sends the management ID of the parent paper medium serving as a target to the scan control unit 411.

When the scan control unit 411 receives the scanning request, the scan control unit 411 converts a paper medium description content into electronic data, and, at the same time, receives the management ID from the management ID tag reading unit 412. The scan control unit 411 sends the electronic data and the management ID to the electronic conversion control unit 413.

The electronic conversion control unit 413 sends the electronic data and a copying management request including the management ID to the management request transmitting unit 414. In this case, the copying management request is a request for generating a management file which is electronic data serving as a child of the electronic data serving as a parent and for management by the information management relation DB 122. The management file serving as the child has the management ID of the child systematically linked to the management ID of the parent. The copying management request also includes an issuing request of the child management ID.

The management request transmitting unit 414 transmits the copying management request to the information management server apparatus 101.

After the information management server apparatus 101 performs the same process operation as the electronic copying process of the management file described in the first embodiment, the information management server apparatus 101 returns a management file of a child generated by using the electronic data having the management ID in the copying management request as a parent and an electronic copying completion notification to the management request transmitting unit 414.

The management request transmitting unit 414 sends the received management file and the electronic copying completion notification to the electronic conversion control unit 413. As the subsequent processes, in the electronic copying process of the management file described in the first embodiment, the operations and functions in the management client DB management unit 215, the DB access unit 216, and the management client DB 217 are similarly executed in the electronic conversion control unit 413, the electronic conversion DB access unit 415, and the electronic conversion management file DB 416.

As described above, according to the embodiment, as in a configuration in which electronic data read from the paper medium serving as the parent information medium is electronically copied to generate the electronic data of the child information medium, the same effect as in the first embodiment can be obtained.

Fifth Embodiment

FIG. 33 is a block diagram showing a configuration of an information life-cycle management system according to a fifth embodiment of the present invention.

In the fifth embodiment, unlike in the fourth embodiment which copies a management file serving as electronic data from a paper medium, a paper medium having a management ID is copied from a paper medium. As a paper medium copying output, a process similar to a paper medium output with a management ID according to the second embodiment is performed. Accordingly, in place of the electronic conversion control apparatus 401 according to the fourth embodiment, a paper medium copying apparatus 501 is arranged.

In this case, the paper medium copying apparatus 501 comprises a scanning control unit 511, a management ID tag reading unit 512, a paper medium copying control unit 513, a management request transmitting unit 514, a management ID code generating unit 515, a printing control unit 516, and an input accepting unit 517.

An operation of the information life-cycle management system configured as described above will be described below.

In the paper medium copying apparatus 501, when the input accepting unit 517 receives a copying request including the number of prints, as in the fourth embodiment, the scanning control unit 511 and the management ID tag reading unit 512 read a parent management ID from an input parent paper medium and output the parent management ID to the paper medium copying control unit 513 together with a scanned electronic data body. At this time, the scanning control unit 511 also outputs the number of prints to the paper medium copying control unit 513. The paper medium copying control unit 513 sends a copying management request including the number of prints, the electronic data, and the parent management ID to the management request transmitting unit 514.

The management request transmitting unit 514 transmits the printing management file acquiring request including the number of prints, the electronic data, and the parent management ID received from the paper medium copying control unit 513 to the information management server apparatus 101.

In the information management server apparatus 101, the same process as that of electronic copying of a management file in the first embodiment is performed, and the management file which is a result is output to the paper medium copying apparatus 501. In the first embodiment, an input is a management file including a management ID. However, in the embodiment, the management ID and the electronic data serving as the management file body portion are input as different data. A process of reading the management ID from the management file by the information management relation management unit 116 is not necessary.

From the information management server apparatus 101, the paper medium copying apparatus 501 which has received a child management file outputs a paper medium with a management ID by the same process as in the third embodiment. More specifically, the same processes as those of the paper medium conversion control unit 312, the management ID code generating unit 313, and the printing control unit 314 are executed by the paper medium copying control unit 513, the management ID code generating unit 515, and the printing control unit 516, respectively. The paper medium copying control unit 513 receives a printing completion notification to complete the process. A graphical display unit may be mounted on the apparatus to display the process completion to a user.

As described above, according to the embodiment, even in a configuration in which a paper medium having a management ID is copied from the paper medium, the same effect as that of the fourth embodiment can be obtained.

Sixth Embodiment

Figure 34:
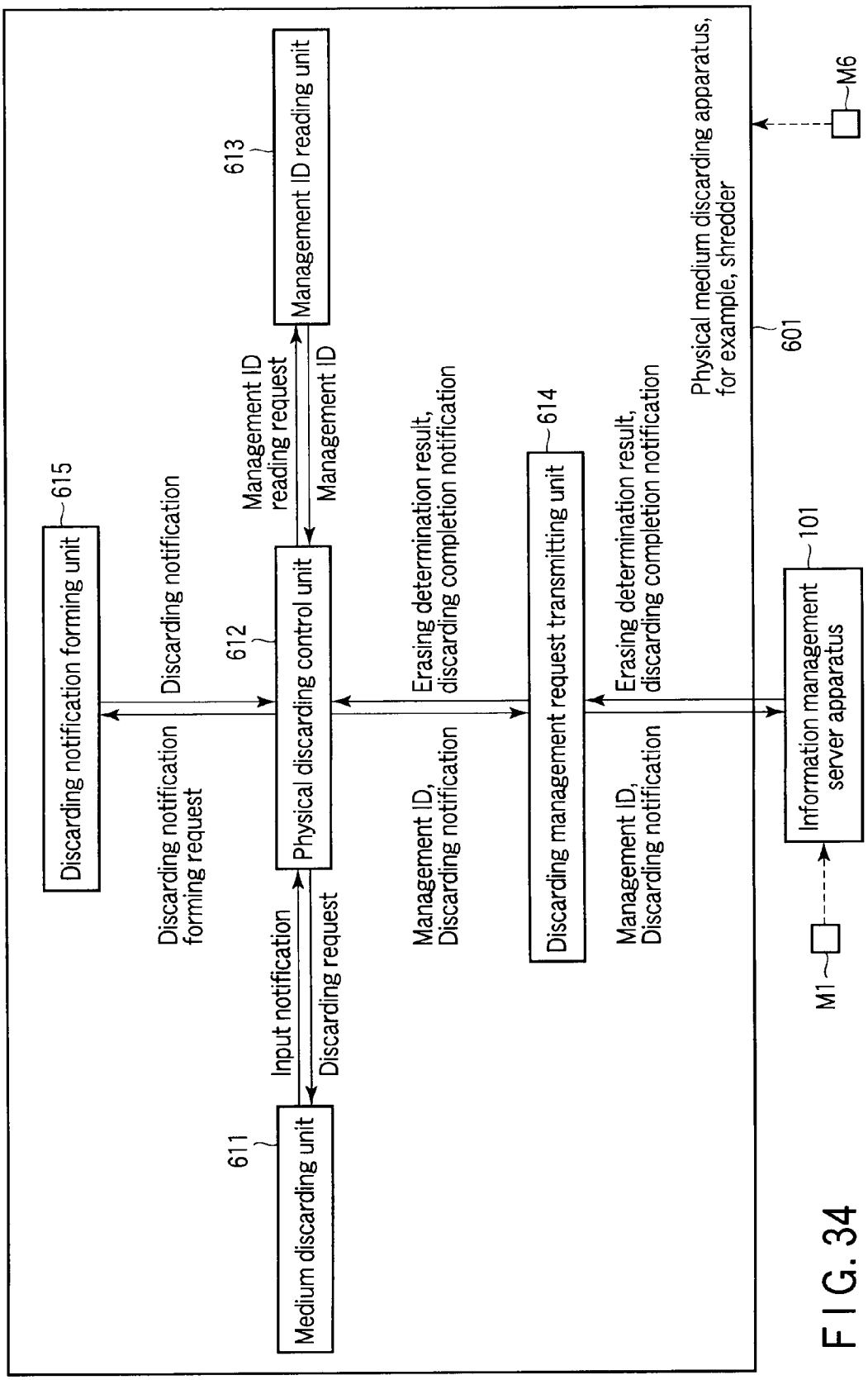
FIG. 34 is a block diagram showing a configuration of an information life-cycle management system according to a sixth embodiment of the present invention.

FIG. 34 is a block diagram showing a configuration of an information life-cycle management system according to a sixth embodiment of the present invention.

In the sixth embodiment, unlike in the first embodiment which performs a discarding process to a management file serving as an electronic medium of information, a physical discarding process is performed to a paper medium including a management ID tag. The processes in the sixth embodiment are almost the same as those in the first embodiment. With the physical discarding process, in place of the electronic medium control apparatus 201 according to the first embodiment, for example, a physical medium discarding apparatus 601 such as a shredder is arranged.

In this case, the physical medium discarding apparatus 601 comprises a medium discarding unit 611, a physical discarding control unit 612, a management ID reading unit 613, a discarding management request transmitting unit 614, and a discarding notification forming unit 615.

An operation of the information life-cycle management system configured as described above will be described below.

When the medium discarding unit 611 detects an input of a paper medium having a management ID tag, the medium discarding unit 611 notifies the physical discarding control unit 612 of the start of a discarding process. The physical discarding control unit 612 requests a management ID of the paper medium input to the management ID reading unit 613 to be read. The management ID reading unit 613 reads the management ID from the management ID tag of the input paper medium and sends the management ID to the physical discarding control unit 612. The management ID tag may have any one of an optical ID tag such as a bar code, a two-dimensional code, or a color code and an electronic tag such as an RFID.

The physical discarding control unit 612, like the electronic discarding control unit 221 according to the first embodiment, transmits the obtained management ID from the discarding management request transmitting unit 614 to the information management server apparatus 101 to perform an erasing inquiry. The information management server apparatus 101 similarly executes the processes in steps ST108 to ST114 in the first embodiment to transmit an erasing determination result to the physical medium discarding apparatus 601.

When the erasing determining result represents erasing impossible, the physical discarding control unit 612 ends the process. When the process is ended by the erasing impossible, the physical discarding control unit 612 pushes out the input paper medium in a reverse direction of the input direction to return the paper medium to a user. If a display is present, the contents of the erasing impossible are displayed.

On the other hand, when the erasing determination result represents erasing possible, the physical discarding control unit 612 sends a discarding request to the medium discarding unit 611. The medium discarding unit 611 discards the paper medium of the management ID and notifies the physical discarding control unit 612 of completion of the processing. The physical discarding control unit 612 sends a discarding notification forming request to the discarding notification forming unit 615 like the electronic discarding control unit 221 according to the first embodiment.

The discarding notification forming unit 615 forms a discarding notification in the same manner as described above to send the discarding notification to the physical discarding control unit 612.

The physical discarding control unit 612 transmits the discarding notification to the information management server apparatus 101 by the discarding management request transmitting unit 614.

The information management server apparatus 101 performs the processes in steps ST124 to ST132 in the first embodiment to transmit a process completion notification to the physical medium discarding apparatus 601. When the process completion notification is received by the discarding management request transmitting unit 614, the physical discarding control unit 612 completes the process. The completion process may be displayed on the display mounted on the apparatus. The physical medium discarding apparatus 601 may hold the management client DB as in the first embodiment and manage an erasing history of the paper medium in association with the management ID.

As described above, according to the embodiment, even in the configuration in which a physical discarding process is performed to a paper medium including the management ID tag, the same effect as that in the first embodiment can be obtained.

Seventh Embodiment

Figure 35:
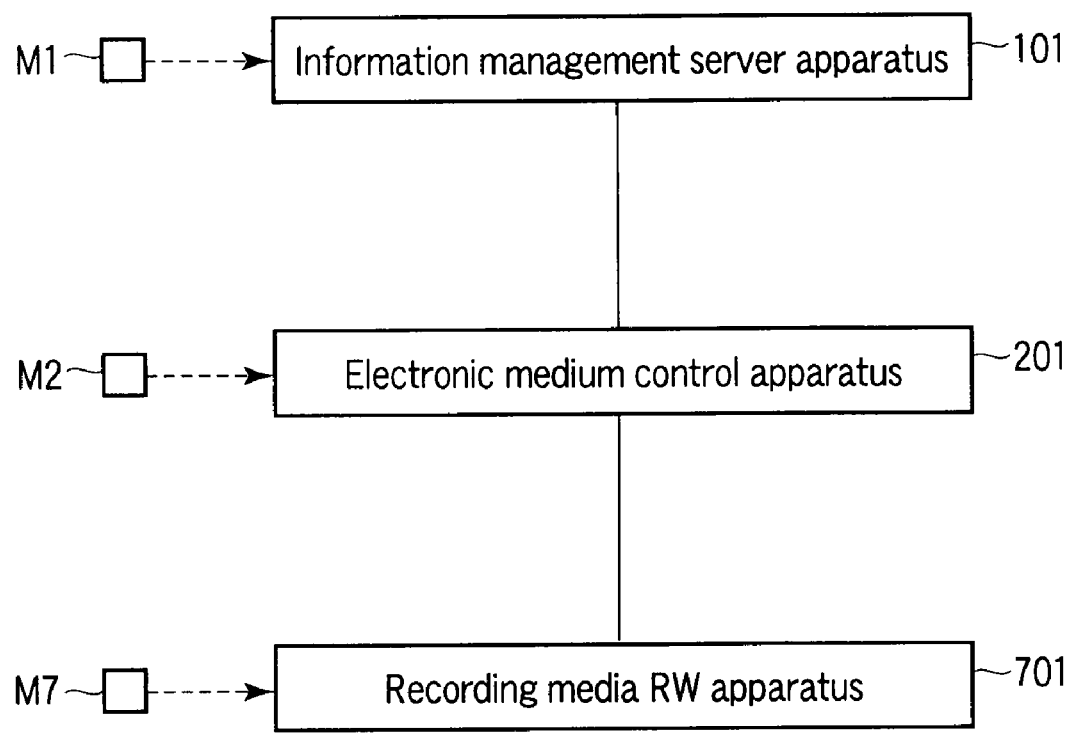
FIG. 35 is a block diagram showing a configuration of an information life-cycle management system according to a seventh embodiment of the present invention.
Figure 36:
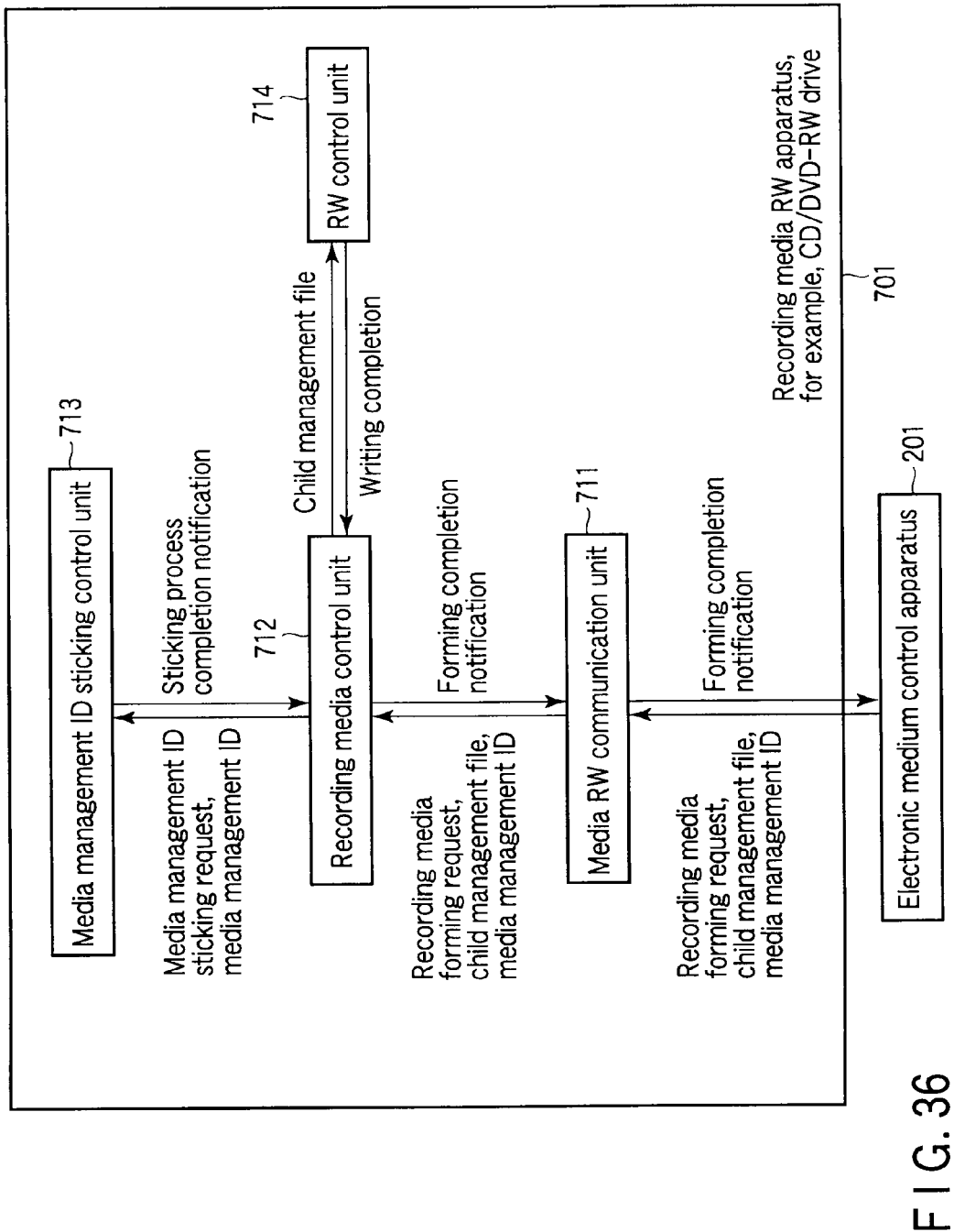
FIG. 36 is a block diagram showing a configuration of a recording media RW apparatus in the embodiment.
Figure 37:
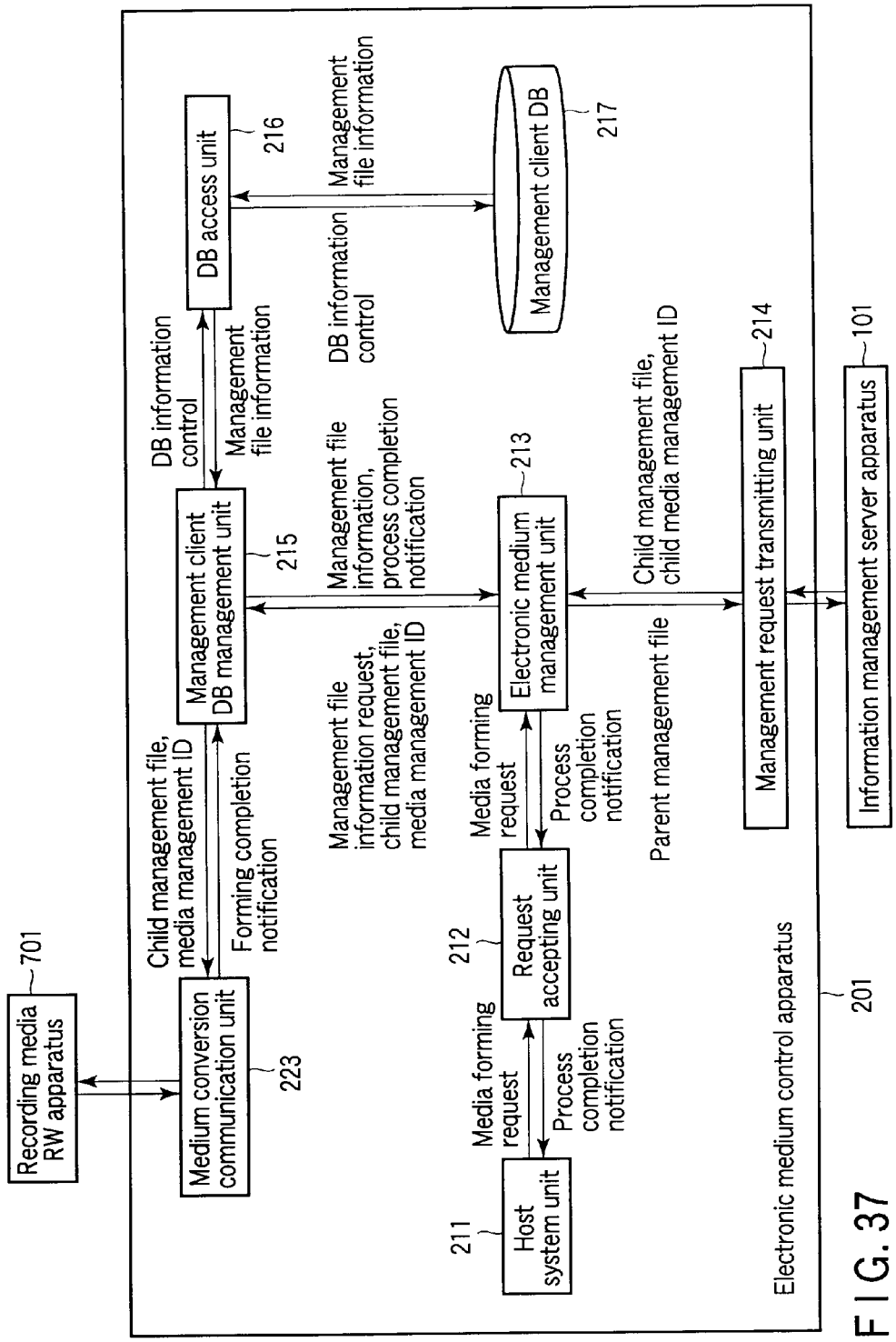
FIG. 37 is a block diagram showing a configuration of an electronic medium control apparatus in the embodiment.

FIG. 35 is a block diagram showing a configuration of an information life-cycle management system according to a seventh embodiment of the invention, FIG. 36 is a block diagram showing a configuration of a recording media RW apparatus in the system, and FIG. 37 is a block diagram showing a configuration of an electronic medium control apparatus in the system.

The seventh embodiment is a modification of the first embodiment, and has a configuration in which a management file is written in a recording medium such as a CD or a DVD. Accordingly, the electronic medium control apparatus 201 executes a copying process of the management file as in the first embodiment and requests the information management server apparatus 101 to issue a management ID stuck on a recording medium.

The electronic medium control apparatus 201 performs the same processes as those in steps ST61 to ST68 in the first embodiment to transmit a management file and copying management request information to the information management server apparatus 101 to request a child management file having the management file as a parent. At this time, the electronic medium control apparatus 201 also requests the information management server apparatus 101 to issue a recording media management ID given to a recording medium in which the child management file is stored.

The information management server apparatus 101 performs the same processes as those in steps ST69 to ST77 in the first embodiment to transmit the child management file and the recording media management ID to the electronic medium control apparatus 201. In this case, in steps ST70 and ST71, in addition to the management ID given to the child management file, a recording media management ID given to the recording media is also issued. In step ST75, the recording media ID and the child management ID information are systematically stored in the information management relation DB 122 in association with the parent management ID. The relation represents that a child management file electronically copied from the parent management file is stored in target recording media to which the recording media management ID is given.

When the electronic medium control apparatus 201 receives the child management file and the recording media management ID, the electronic medium control apparatus 201 transmits a recording media forming request including the child management file and the media management ID information to a recording media RW apparatus 701 through the management request transmitting unit 214, the electronic medium management unit 213, the management client DB management unit 215, and the medium conversion communication unit.

In the recording media RW apparatus 701, a recording media forming request received by a media RW communication unit 711 is sent to the recording media control unit 712. The recording media control unit 712 sends a media management ID in the recording media forming request to a media management ID sticking control unit 713. The media management ID sticking control unit 713, on the basis of the media management ID, forms recording media having the media management ID. For example, a configuration in which a management ID tag obtained by expressing a media management ID in a two-dimensional code is printed on a label surface of a CD or a DVD is conceived. In addition, a configuration in which an RFID tag in which to store the media management ID is selected and stuck on the recording media is conceived. The media management ID sticking control unit 713 sends a sticking process completion notification to the recording media control unit 712 when printing or sticking of the media management ID tag on a target recording medium is completed.

When the recording media control unit 712 receives the sticking process completion notification, the recording media control unit 712 sends a writing request including a child management file to an RW control unit 714. The RW control unit 714 writes the child management file on the recording media on which the management ID is stuck. When the process is normally completed, the RW control unit 714 sends a writing completion notification to the recording media control unit 712. When the recording media control unit 712 receives the writing completion notification, the recording media control unit 712 transmits a forming completion notification to the electronic medium control apparatus 201 by the media RW communication unit 711.

In the electronic medium control apparatus 201, the medium conversion communication unit 223 receives a forming completion notification to send the forming completion notification to the management client DB management unit 215.

When the management client DB management unit 215 receives the forming completion notification, the management client DB management unit 215 performs the same processes as those in steps ST80 and ST81 in the first embodiment to systematically store the generated recording media management ID information generated and the child management file in the management client DB 217 in association with each other. Thereafter, the same processes as those in steps ST82 to ST84 in the first embodiment are performed, and a media forming completion notification is transmitted to the host system unit 211 to complete the process.

In this case, the electronic medium control apparatus 201 and the recording media RW apparatus 701 may be integrated with each other.

As described above, according to the embodiment, even in the configuration in which the management file is written in the recording media, the same effect as that in the first embodiment can be obtained.

Eighth Embodiment

An information life-cycle management system according to an eighth embodiment of the present invention will be described below.

The eighth embodiment is a modification of the first, fourth, or fifth embodiment, and has a configuration in which different information management server apparatuses 101 are installed in units of domains and an information medium having a management ID registered in an information management server apparatus 101' in a certain domain is newly registered in the information management server apparatus 101 in another domain. In this case, as the management ID, an ID such as a ucode of the Ubiquitous ID Center or an EPC of EPCglobal whose uniqueness is assured worldwide or an ID whose uniqueness is assured in a domain-cross-sectional manner can be used.

In an electronic medium, when a management file registered in a certain domain is input to the information management server apparatus 101 in another domain, the information management server apparatus 101 registers the input management file in the information management relation DB 122 by the same processes as in the first embodiment. A management ID issuing process in steps ST6 to ST7 and a management file forming processes in steps ST9 to ST10 are omitted. As registration in the information management relation DB 122 after step ST10, on the basis of the input management file, forming time and date information, forming information, a medium type, a use limitation policy, and information management server information are registered in the information management relation DB 122 in association with the management ID of the electronic data.

In a paper medium, a management ID read by the management ID tag reading unit 412 of the electronic conversion control apparatus 401 according to the fourth embodiment or the management ID tag reading unit 512 according to the fifth embodiment is transmitted to the information management server apparatus 101. The information management server apparatus 101 is notified that the information medium is a paper medium, and the information management server apparatus 101 requests new registration.

In the information management server apparatus 101, as in the electronic medium, information related to a paper medium having the management ID is registered in the information management relation DB 122. Unlike in the electronic medium, a management file is not necessary. An apparatus which reads the management ID may have a configuration in which an apparatus having a management ID tag reading function is USB-connected to the electronic medium control apparatus 201 to transmit and register the read management ID to the information management server apparatus through the electronic medium control apparatus 201.

As described above, according to the embodiment, even in the configuration in which the different information management server apparatuses 101 are installed in units of domains, the same effects as those in the first, fourth, or fifth embodiment can be obtained.

Ninth Embodiment

FIG. 38 is a block diagram showing a configuration of an information life-cycle management apparatus according to a ninth embodiment of the present invention.

In the ninth embodiment, unlike in the eighth embodiment in which a management file or a paper medium with a management ID which is registered by another information management server apparatus 101 is newly registered by the information management server apparatus 101 in the domain, the recording medium with the media management ID registered by the other information management server apparatus 101 is newly registered. In this case, it is assumed that, in the recording media, as in the eighth embodiment, a management file registered by the other information management server apparatus 101 is stored.

An operation of the information life-cycle management system described above will be described below.
(New Registration)

When the recording media RW apparatus 701 receives the media management ID of the recording media registered by the other information management server apparatus 101 and a reading request of the stored management file from the electronic medium control apparatus 201, the recording media RW apparatus 701 executes the following processes.

In the recording media RW apparatus 701, the media RW communication unit 711 sends the reading request from the electronic medium control apparatus 201 to the recording media control unit 712.

When the recording media control unit 712 receives the reading request, the recording media control unit 712 sends a media management ID reading request to a media management ID reading unit 715.

When the media management ID reading unit 715 receives the media management ID reading request, the media management ID reading unit 715 reads a media management ID from a media management ID tag realized by a variety of configurations such as a bar code, a two-dimensional code, a color code, and an RFID to send the media management ID to the recording media control unit 712.

When the recording media control unit 712 receives the media management ID, the recording media control unit 712 sends a reading request of a management file in the recording media to the RW control unit 714.

When the RW control unit 714 receives the reading request, the RW control unit 714 reads the management file from the recording media to send the management file to the recording media control unit 712. In this case, reading of the media management ID and reading of the management file may be reversed in order or may be simultaneously performed. The number of management files stored in the recording media is not limited to one, and a plurality of management files may be present. In any case, the recording media control unit 712 transmits the media management ID and the management file to the electronic medium control apparatus 201 through the media RW communication unit 711.

The electronic medium control apparatus 201 sends the received media management ID and management file to the information management server apparatus 101 and requests the information management server apparatus 101 to perform the new registration processes.

The information management server apparatus 101 performs the same processes as the new registration process of an existing management file according to the eighth embodiment. At this time, in step ST11 according to the first embodiment, the received media management ID and the management ID of the management file are registered in the information management relation DB 122 in association with each other. When a plurality of management files are received, the management Ids of the plurality of management files are registered in association with the media management ID, so that the information management relation DB 122 manages information which indicates the management file group is related to the recording media.
(Copying Process)

A process of electronically copying a management file of a recording medium will be described below.

At first, the recording media RW apparatus 701 executes the same process as a registration process of the existing registration management file according to the embodiment to transmit the media management ID and the management file to be copied to the electronic medium control apparatus 201 through the media RW communication unit 711.

The electronic medium control apparatus 201 and the information management server apparatus 101 perform the same process as the electronic copying process of the management file according to the first embodiment. The embodiment is different from the first embodiment in the process of transmitting/receiving the media management ID and the process in which the information management server apparatus 101 records a systematic relation between a management file of a copying source and an electronically copied management file in the information management relation DB 122 in association with the media management ID. A process of reading the media management ID may be omitted to execute the same process as the electronic copying process of the management file according to the first embodiment.

As described above, according to the embodiment, even in a configuration in which the registered recording medium with a media management ID is newly registered by the information management server apparatus 101, the same effect as that in the eighth embodiment can be obtained.

Tenth Embodiment

Figure 39:
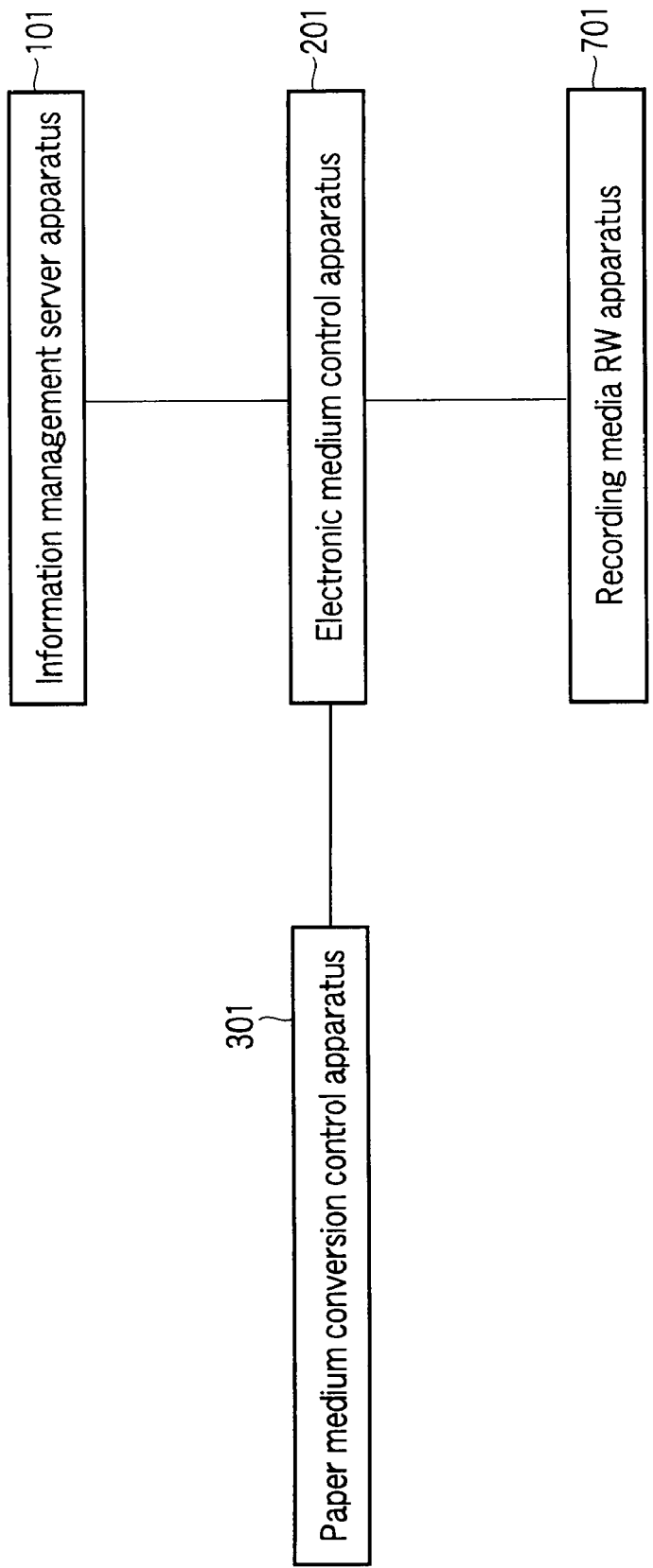
FIG. 39 is a block diagram showing a configuration of an information life-cycle management system according to a tenth embodiment of the present invention.

FIG. 39 is a block diagram showing a configuration of an information life-cycle management system according to a tenth embodiment of the present invention, and FIG. 40 is a block diagram showing a configuration of an electronic medium control apparatus in the system.

The embodiment is an example obtained by combining the ninth embodiment and the second or third embodiment and has a configuration in which a management file in recording media is printed on a paper medium. Supplementarily, the process in the ninth embodiment is performed as a process of reading the media management ID and a stored management file from the recording media, and the process in the second or third embodiment is performed as a process of printing the management file.

In the electronic medium control apparatus 201, a printing request of a management file in recording media input from the host system unit 211 reaches the management client DB management unit 215 through the request accepting unit 212 and the electronic medium management unit 213.

When the management client DB management unit 215 receives a printing request, the management client DB management unit 215 transmits a media information reading request to the recording media RW apparatus 701 through the medium conversion communication unit 223.

The recording media RW apparatus 701 performs the same processes as those in the ninth embodiment. The recording media control unit 712 reads the media management ID from the media management ID reading unit 715, reads a management file to be printed from the RW control unit 714, and transmits the media management ID and the management file from the media RW communication unit 711 to the electronic medium control apparatus 201.

In the electronic medium control apparatus 201, the management client DB management unit 215 transmits a parent media management ID and a parent management file received from the recording media RW apparatus 701 by the medium conversion communication unit 223 to the information management server apparatus 101 through the electronic medium management unit 213 and the management request transmitting unit 214.

In the information management server apparatus 101, when the parent media management ID and the parent management file are received from the electronic medium control apparatus 201, the same processes as those in steps ST308 to ST318 in the second embodiment are executed. The information management relation management unit 116 records, on the information management relation DB 122, that a set of management files (including a management ID for a paper medium) for paper printing to be sent in step ST316 is an information medium derived from the management file in the recording media having the parent media management ID such that the management ID for a paper medium is associated with the parent media management ID and the management ID of the parent management file.

The electronic medium control apparatus 201 and the paper medium conversion control apparatus 301 perform the same processes as those in steps ST319 to ST324 in the second embodiment to execute paper medium printing of the management file in the recording media. In the management client DB 217, like the recording to the information management relation DB 122, the management ID for a paper medium is recorded in association with the parent media management ID and the management ID of the parent management file.

As described above, according to the embodiment, even in the configuration in which the management file in the recording media is printed on a paper medium, the same effect as that in the second or third embodiment can be obtained.

Eleventh Embodiment

Figure 41:
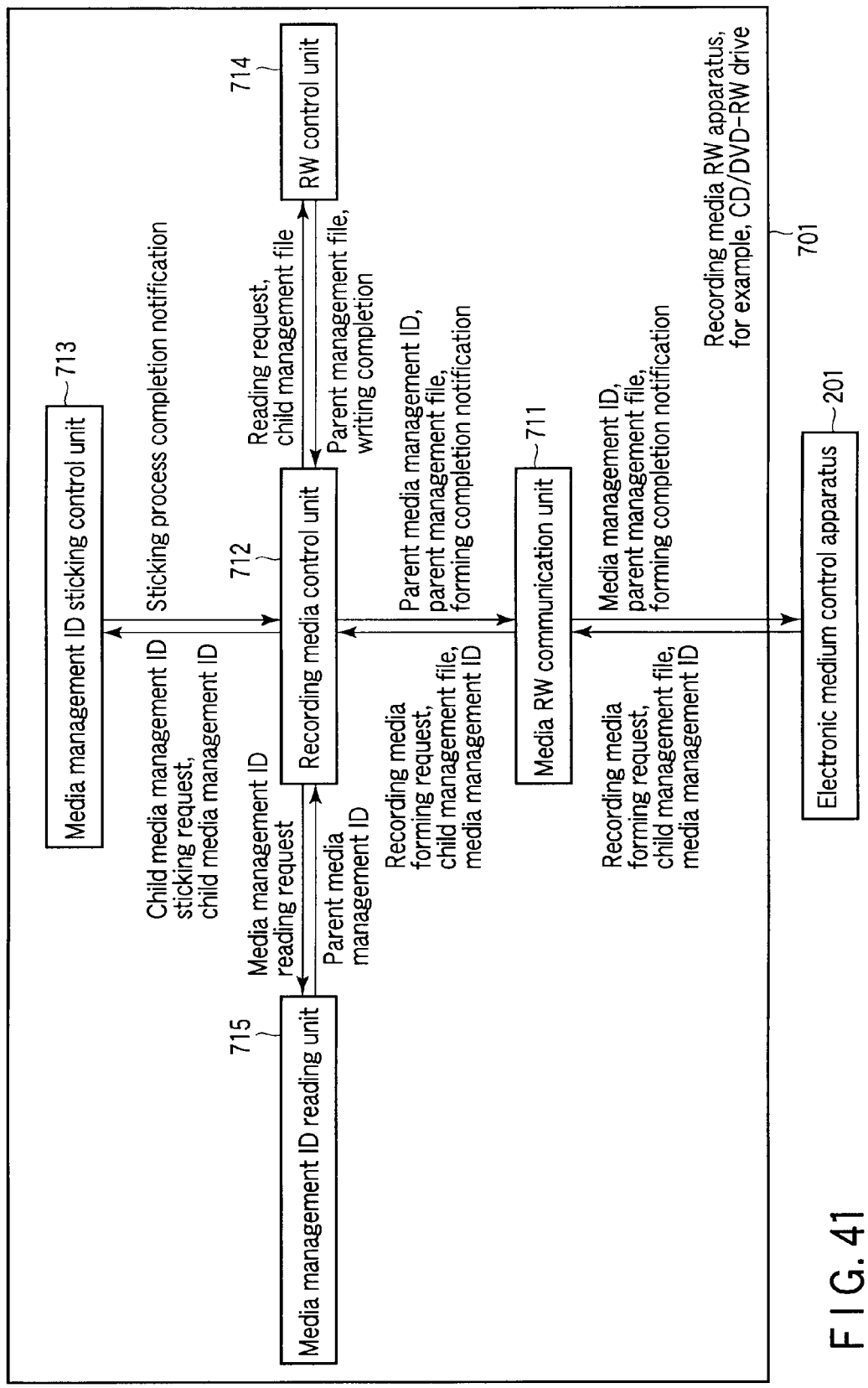
FIG. 41 is a block diagram showing a configuration of an information life-cycle management system according to an eleventh embodiment of the present invention.

FIG. 41 is a block diagram showing a configuration of an information life-cycle management system according to an eleventh embodiment of the present invention.

The eleventh embodiment has a configuration in which all management files (parent management files) in recording media to be copied are copied as media.

At first, the electronic medium control apparatus 201 and the recording media RW apparatus 701 execute the same processes as those in the tenth embodiment and read a parent recording media management ID and a parent management file from recording media to be copied. Thereafter, the same processes as those in the seventh embodiment are executed, the information management server apparatus 101 generates a child recording media management ID and a child management file to the parent management file and forms recording media which have a recording media management ID and in which the recording media RW apparatus 701 stores the child management file, on the basis of the child recording media management ID and the child management file. However, in the information management relation DB 122 of the information management server apparatus 101 and the management client DB 217 of the electronic medium control apparatus 201, the parent recording media management ID, the child recording media management ID, the parent management file, and the child management file are systematically stored in association with each other.

As described above, according to the embodiment, even in the configuration in which all the management files in the recording media to be copied are copied as media, the same effect as that in the first embodiment can be obtained.

Twelfth Embodiment

An information life-cycle management system according to a twelfth embodiment of the present invention will be described below.

The twelfth embodiment is an embodiment in which recording media on which a management ID tag is stuck are discarded. The same process as a discarding process of a paper medium having a management ID according to the sixth embodiment is executed.

Figure 42:
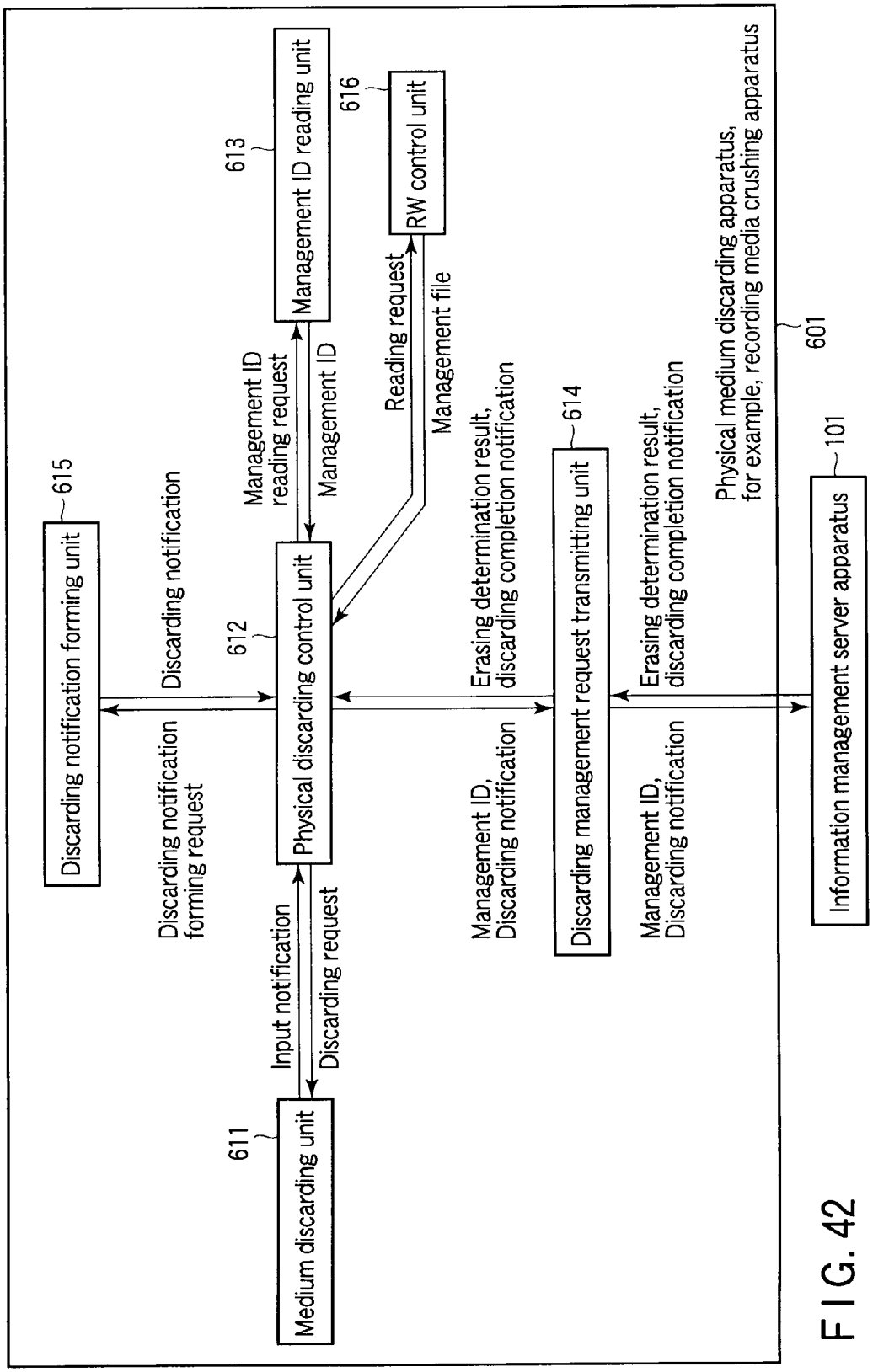
FIG. 42 is a block diagram showing an example of a configuration of a physical medium discarding apparatus in an information life-cycle management system according to a twelfth embodiment of the present invention.

A medium discarding unit 611 has a crushing function for, for example, a CD, a DVD, and a floppy (trademark) disk. In the information life-cycle management system, a media management ID stuck on recording media and management IDs of all the management files in the recording media are systematically managed in association with each other. However, all the management files in the recording media may be read before discarding and collated with system information of the information management relation DB 122 by the information management server apparatus 101. In this case, as shown in FIG. 42, a management file in the recording medium is read by using an RW control unit 616 similar to the RW control unit 714 of the recording media RW apparatus 701.

As described above, according to the embodiment, even in the configuration in which the recording media to which the management ID tag is stuck are discarded, the same effect as that in the sixth embodiment can be obtained.

The method described in the embodiment can also be stored in a storage medium such as a magnetic disk (floppy (trademark) disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in the present invention includes not only a personal computer but also an arithmetic processing apparatus, a microcomputer, or the like included in an information processing apparatus. The computer is a generic name of an apparatus and a device which can realize the functions of the present invention by a program.

The present invention is not limited to the embodiments. The invention can be embodied by changing the constituent elements in an execution phase without departing from the spirit and scope of the invention. In addition, various inventions can be formed by appropriate combinations of the plurality of constituent elements disclosed in the embodiments. For example, several constituent elements may be deleted from all the constituent elements described in the embodiments. Furthermore, the constituent elements over the different embodiments may be appropriately combined with each other.

As described above, according to the present invention, even though information to be managed is converted into a variety of information media, an information life cycle can be managed.

What is claimed is:

1. An information life-cycle management system comprising an electronic medium control apparatus and an information management server apparatus which communicate with each other, wherein the electronic medium control apparatus comprises:

a management table storing device which stores a management file management table in which a management file to be managed comprising a header portion including a management ID, forming time and date information, forming information, a medium type, a use limitation policy, and information management server information, the management ID, a management ID representing a management file of a copying source of at least the management file are associated with each other;

a log table storing device which stores an access log table in which a management ID representing the management file to be managed, operation time and date information of the management file, an operation type, user information, and a management file name are associated with each other;

a unit which generates, when an electronic copying request including a management ID representing a management file to be copied, user information, a medium type, and a use limitation policy is input, a management file acquiring request including the electronic copying request;

a unit which acquires the management file from the management table storing device on the basis of the management ID in the management file acquiring request;

a unit which transmits the copying management request information based on the electronic copying request and the acquired management file to the information management server apparatus;

a unit which, after the copying management request information and the management file are transmitted, on the basis of the management file received from the information management server apparatus and an electronic copying completion notification, generates a registration request to the management file;

a unit which, on the basis of the management file and the registration request, writes the management ID, a management ID representing the management file of the copying source of the management file, and a management file substance in the management file management table;

a unit which, on the basis of the management file and the registration request, writes operation time and date information, an operation type, user information, a management ID, and a management file name on the access log table;

a unit which generates a process result after the writing on both the tables; and a unit which, on the basis of the process result, outputs the process completion notification including a management ID of a copied management file to an input source of the electronic copying request to complete the process, and the information management server apparatus comprises:

a management ID storing device which stores an issued management ID, an issuing time and date, and request source information in association with each other;

an information management relation storing device which stores the issued management ID and forming time and date information, user information, a medium type, a use limitation policy, and information management server information in a header portion of the copied management file in association with each other with respect to a management ID of a management file in management file copying request information;

a unit which, when the management file and the copying management request information are received from the electronic medium control apparatus, on the basis of the copying management request information, generates a management ID issuing request including apparatus information in the copying management request information as request source information;

a unit which issues a management ID on the basis of the management ID issuing request, registers the management ID, an issuing time and date, and the request source information in the management ID storing device in association with each other to generate a registration process result including the management ID;

a unit which, on the basis of the registration process result, generates a management file copying request including a management ID in the registration process result, the copying management request information, and the management file;

a unit which, on the basis of the management file copying request, forms a copied management file comprising a header portion including a management ID in the management file copying request, the issued management ID, forming time and date information, user information, a medium type, a using limitation policy and information management server information;

a unit which writes the issued management ID in the information management relation storing device in association with the management ID of the management file in the management file copying request in the information management relation storing device, and writes forming time and date information, user information, a medium type, a use limitation policy, and information management server information in the header portion of the copied management file in the information management relation storing device in association with the issued management ID; and a unit which transmits, after the writing, the copied management file and the electronic copying completion notification to the electronic medium control apparatus.

2. The information life-cycle management system according to claim 1, wherein the electronic medium control apparatus comprises:

a unit which receives a management ID representing a management file to be erased and an erasing request including erasing request source information and user information;

a unit which, when the erasing request is received, generates a management file acquiring request including the erasing request;

a unit which acquires the management file from the management table storing device on the basis of the management ID in the management file acquiring request;

a unit which, on the basis of the management file, forms the management ID of the management file, the apparatus information of the electronic medium control apparatus, and erasing inquiry request information including the erasing request source information in the erasing request and the user information;

a unit which transmits the erasing inquiry request information to the information management server apparatus;

a unit which verifies an erasing determination result received from the information management server apparatus and, when the erasing determination result represents that an erasing process is possible, generates an erasing process request including a management ID;

a unit which, on the basis of the erasing process request, adds discarding time and date information to a management file management table to erase a management file substance, erases an operation time and date and an operation type of the access log table, updates the user information and the management ID, and notifies of a process result including the management ID representing the erased management file;

a unit which generates a discarding notification forming request including the process result;

a unit which, on the basis of the discarding notification forming request, forms a discarding notification which stores the management ID of the erased management file, the apparatus information of the electronic medium control apparatus, the user information, and notification information constituted by the forming time and date information of the notification in a header portion;

a unit which transmits the discarding notification to the information management server apparatus;

a unit which, on the basis of the discarding completion notification received from the information management server apparatus, writes a discarding time and date in association with the management ID of the management file management table, stores a log of process completion in the access log table, and generates a process result; and a unit which, on the basis of the process result, notifies an input source of the erasing request of erasing process completion of the management file to complete the process, and the information management server apparatus comprises:

a unit which, on the basis of the erasing inquiry request information received from the electronic medium control apparatus, requests an erasing permission/impermission determination;

a unit which, on the basis of the erasing inquiry request information, with reference to the information management relation storing device, determines whether the management ID in the erasing inquiry request information is present in the information management relation storing device, determines whether the apparatus information of the electronic medium control apparatus, the erasing request source information, and the user information satisfy the authority of erasing in the use limitation policy in the management file, and generates an erasing determination result representing erasable or inerasable on the basis of the determination results;

a unit which transmits the erasing determination result to the electronic medium control apparatus;

a unit which, on the basis of the discarding notification received from the electronic medium control apparatus, generates an invalidating process request by using the apparatus information in the discarding notification as request source information;

a unit which, on the basis of the invalidating process request, invalidates the management ID to update the management ID storing device and generates an invalidating process result including the invalidated management ID;

a unit which, on the basis of erasing management request information including the management ID in the invalidating process result and the discarding notification, generates a verification request to the discarding notification;

a unit which, on the basis of the discarding notification and the verification request, with reference to the information management relation storing device, verifies whether the management ID in the discarding notification is present in the information management relation storing device and verifies whether notification information in the discarding notification satisfies an erasing authority in the use limitation policy in the information management relation storing device; and a unit which, when the verification result represents validity, records a discarding time and date in association with the management ID in the information management relation storing device corresponding to the management ID in the discarding notification and transmits a discarding completion notification to the electronic medium control apparatus.

3. An information management server apparatus configured to communicate with an electronic medium control apparatus, comprising:

a management ID storing device which stores an issued management ID, an issuing time and date, and request source information in association with each other;

an information management relation storing device which stores the issued management ID, and forming time and date information, user information, a medium type, a use limitation policy, and information management server information in a header portion of a copied management file in association with each other with respect to a management ID of a management file in management file copying request information;

a unit which, when the management file to be copied comprising a header portion including a management ID, forming time and date information, former information, a medium type, a use limitation policy, and information management server information and the copying management request information based on an electronic copying request including the management ID representing the management file to be copied, the user information, the medium type, and the use limitation policy are received from the electronic medium control apparatus, on the basis of the copying management request information, generates a management ID issuing request including apparatus information in the copying management request information as request source information;

a unit which issues a management ID on the basis of the management ID issuing request, registers the management ID, an issuing time and date, and the request source information in the management ID storing device in association with each other to generate a registration process result including the management ID;

a unit which, on the basis of the registration process result, generates a management file copying request including a management ID in the registration process result, the copying management request information, and the management file;

a unit which, on the basis of the management file copying request, forms a copied management file comprising a header portion including a management ID in the management file in the management file copying request, the issued management ID, forming time and date information, user information, a medium type, a use limitation policy and information management server information;

a unit which writes the issued management ID in the information management relation storing device in association with the management ID of the management file in the management file copying request in the information management relation storing device, and writes forming time and date information, user information, a medium type, a use limitation policy, and information management server information in the header portion of the copied management file in the information management relation storing device in association with the issued management ID; and a unit which transmits, after the writing, the copied management file and an electronic copying completion notification to the electronic medium control apparatus.

4. The information management server apparatus according to claim 3, comprising:

a unit which, when erasing inquiry request information including the management ID representing a management file to be erased, the apparatus information of the electronic medium control apparatus, erasing request source information in an erasing request and user information is received from the electronic medium control apparatus, on the basis of the erasing inquiry request information, requests an erasing permission/impermission determination;

a unit which, on the basis of the erasing inquiry request information, with reference to the information management relation storing device, determines whether the management ID in the erasing inquiry request information is present in the information management relation storing device, determines whether the apparatus information of the electronic medium control apparatus, the erasing request source information, and the user information satisfy the authority of erasing in the use limitation policy in the management file, and generates an erasing determination result representing erasable or inerasable on the basis of the determination results;

a unit which transmits the erasing determination result to the electronic medium control apparatus;

a unit which, on the basis of the discarding notification received from the electronic medium control apparatus, generates an invalidating process request by using the apparatus information in the discarding notification as request source information;

a unit which, on the basis of the invalidating process request, invalidates the management ID to update the management ID storing device and generates an invalidating process result including the invalidated management ID;

a unit which, on the basis of erasing management request information including the management ID in the invalidating process result and the discarding notification, generates a verification request to the discarding notification;

a unit which, on the basis of the discarding notification and the verification request, with reference to the information management relation storing device, verifies whether the management ID in the discarding notification is present in the information management relation storing device and verifies whether notification information in the discarding notification satisfies an erasing authority in the use limitation policy in the information management relation storing device; and a unit which, when the verification result represents validity, records a discarding time and date in relation to the management ID in the information management relation storing device corresponding to the management ID in the discarding notification and transmits a discarding completion notification to the electronic medium control apparatus.

5. An electronic medium control apparatus configured to communicate with an information management server apparatus, comprising:

a management table storing device which stores a management file management table in which a management file to be managed comprising a header portion including a management ID, forming time and date information, forming information, a medium type, a use limitation policy, and information management server information, the management ID, a management ID representing a management file of a copying source of at least the management file are associated with each other;

a log table storing device which stores an access log table in which a management ID representing the management file to be managed, operation time and date information of the management file, an operation type, user information, and a management file name are associated with each other;

a unit which generates, when an electronic copying request including a management ID representing a management file to be copied, user information, a medium type, and a use limitation policy is input, a management file acquiring request including the electronic copying request;

a unit which acquires the management file from the management table storing device on the basis of the management ID in the management file acquiring request;

a unit which transmits the copying management request information based on the electronic copying request and the acquired management file to the information management server apparatus;

a unit which, after the copying management request information and the management file are transmitted, when a copied management file comprising the header portion including the management ID in the management file, the management ID issued to the information management server apparatus, the forming time and date information, the user information, the medium type, the use limitation policy, and the information management server information and an electronic copying completion notification are received, on the basis of the copied management file and the electronic copying completion notification, generates a registration request to the copied management file;

a unit which, on the basis of the copied management file and the registration request, writes the management ID, a management ID representing the management file of the copying source of the management file, and a management file substance in the management file management table;

a unit which, on the basis of the management file and the registration request, writes operation time and date information, an operation type, user information, a management ID, and a management file name on the access log table;

a unit which generates a process result after the writing on both the tables; and a unit which, on the basis of the process result, outputs the process completion notification including a management ID of the copied management file to an input source of the electronic copying request to complete the process.

6. The electronic medium control apparatus according to claim 5, comprising:

a unit which receives an erasing request including a management ID representing a management file to be erased, erasing request source information and user information;

a unit which, when the erasing request is received, generates a management file acquiring request including the erasing request;

a unit which acquires the management file from the management table storing device on the basis of the management ID in the management file acquiring request;

a unit which, on the basis of the management file, forms erasing inquiry request information including the management ID of the management file, the apparatus information of the electronic medium control apparatus, the erasing request source information in the erasing request and the user information;

a unit which transmits the erasing inquiry request information to the information management server apparatus;

a unit which, after the erasing inquiry request information is transmitted, verifies an erasing determination result received from the information management server apparatus and, when the erasing determination result represents that an erasing process is possible, generates an erasing process request including a management ID;

a unit which, on the basis of the erasing process request, adds discarding time and date information to the management file management table to erase a management file substance, erases an operation time and date and an operation type of the access log table, updates the user information and the management ID, and notifies of a process result including the management ID representing the erased management file;

a unit which generates a discarding notification forming request including the process result;

a unit which, on the basis of the discarding notification forming request, forms a discarding notification including the management ID of the erased management file, and notification information constituted by the apparatus information of the electronic medium control apparatus, the user information and the forming time and date information of the notification in a header portion;

a unit which transmits the discarding notification to the information management server apparatus;

a unit which, on the basis of a discarding completion notification received from the information management server apparatus in which the management ID is invalidated on the basis of the discarding notification, writes a discarding time and date in association with the management ID of the management file management table, stores a log of process completion in the access log table, and generates a process result; and a unit which, on the basis of the process result, notifies an input source of the erasing request of erasing process completion of the management file to complete the process.

7. A non-transitory computer-readable storage medium storing a computer program executed by an information management server apparatus, the information management server apparatus configured to communicate with an electronic medium control apparatus and comprising a management ID storing device and an information management relation storing device, the program comprising:

a program code configured to cause the information management server apparatus to execute a process of writing an issued management ID, an issuing time and date, and request source information in the management ID storing device in association with each other;

a program code configured to cause the information management server apparatus to execute a process of writing the issued management ID and forming time and date information, user information, a medium type, a use limitation policy, and information management server information in a header portion of a copied management file in the information management relation storing device in association with each other with respect to a management ID of a management file in management file copying request information;

a program code configured to cause the information management server apparatus to execute a process of, when the management file to be copied comprising a header portion including a management ID, forming time and date information, former information, a medium type, a use limitation policy, and information management server information and the copying management request information based on an electronic copying request including the management ID representing the management file to be copied, the user information, the medium type, and the use limitation policy are received from the electronic medium control apparatus, on the basis of the copying management request information, generating a management ID issuing request including apparatus information in the copying management request information as request source information;

a program code configured to cause the information management server apparatus to execute a process of issuing a management ID on the basis of the management ID issuing request, registering the management ID, an issuing time and date, and the request source information in the management ID storing device in association with each other to generate a registration process result including the management ID;

a program code configured to cause the information management server apparatus to execute a process of, on the basis of the registration process result, generating a management file copying request including a management ID in the registration process result, the copying management request information, and the management file;

a program code configured to cause the information management server apparatus to execute a process of, on the basis of the management file copying request, forming a copied management file comprising a header portion including a management ID in the management file in the management file copying request, the issued management ID, forming time and date information, user information, a medium type, a use limitation policy and information management server information;

a program code configured to cause the information management server apparatus to execute a process of writing the issued management ID in the information management relation storing device in association with the management ID of the management file in the management file copying request in the information management relation storing device, and writing forming time and date information, user information, a medium type, a use limitation policy, and information management server information in the header portion of the copied management file in the information management relation storing device in association with the issued management ID; and a program code configured to cause the information management server apparatus to execute a process of transmitting, after the writing, the copied management file and an electronic copying completion notification to the electronic medium control apparatus.

8. A non-transitory computer-readable storage medium storing a computer program executed by an electronic medium control apparatus, electronic medium control apparatus configured to communicate with an information management server apparatus and comprising a management table storing device and a log table storing device, the program comprising:

a program code configured to cause the electronic medium control apparatus to execute a process of writing a management file management table, in which a management file to be managed comprising a header portion including a management ID, forming time and date information, former information, a medium type, a use limitation policy, and information management server information, the management ID, and a management ID representing a management file of a copying source of at least the management file are associated with each other, in the management table storing device;

a program code configured to cause the electronic medium control apparatus to execute a process of storing an access log table, in which a management ID representing the management file to be managed, operation time and date information of the management file, an operation type, user information, and a management file name are associated with each other, in the log table storing device;

a program code configured to cause the electronic medium control apparatus to execute a process of generating, when an electronic copying request including a management ID representing a management file to be copied, user information, a medium type, and a use limitation policy is input, a management file acquiring request including the electronic copying request;

a program code configured to cause the electronic medium control apparatus to execute a process of acquiring the management file from the management table storing device on the basis of the management ID in the management file acquiring request;

a program code configured to cause the electronic medium control apparatus to execute a process of transmitting the copying management request information based on the electronic copying request and the acquired management file to the information management server apparatus;

a program code configured to cause the electronic medium control apparatus to execute a process of, after the copying management request information and the management file are transmitted, when a copied management file comprising the header portion including the management ID in the management file, the management ID issued to the information management server apparatus, the forming time and date information, the user information, the medium type, the use limitation policy, and the information management server information and an electronic copying completion notification are received, on the basis of the copied management file and the electronic copying completion notification, generating a registration request to the copied management file;

a program code configured to cause the electronic medium control apparatus to execute a process of, on the basis of the copied management file and the registration request, writing the management ID, a management ID representing the management file of the copying source of the management file, and a management file substance in the management file management table;

a program code configured to cause the electronic medium control apparatus to execute a process of, on the basis of the management file and the registration request, writing operation time and date information, an operation type, user information, a management ID, and a management file name on the access log table;

a program code configured to cause the electronic medium control apparatus to execute a process of generating a process result after the writing on both the tables; and a program code configured to cause the electronic medium control apparatus to execute a process of, on the basis of the process result, outputting the process completion notification including a management ID of the copied management file to an input source of the electronic copying request to complete the process.

9. The computer-readable storage medium according to claim 8, wherein the program further comprises:

a program code configured to cause the electronic medium control apparatus to execute a process of receiving an erasing request including a management ID representing a management file to be erased, erasing request source information and user information;

a program code configured to cause the electronic medium control apparatus to execute a process of, when the erasing request is received, generating a management file acquiring request including the erasing request;

a program code configured to cause the electronic medium control apparatus to execute a process of acquiring the management file from the management table storing device on the basis of the management ID in the management file acquiring request;

a program code configured to cause the electronic medium control apparatus to execute a process of, on the basis of the management file, forming erasing inquiry request information including the management ID of the management file, the apparatus information of the electronic medium control apparatus, the erasing request source information in the erasing request and the user information;

a program code configured to cause the electronic medium control apparatus to execute a process of transmitting the erasing inquiry request information to the information management server apparatus;

a program code configured to cause the electronic medium control apparatus to execute a process of, after the erasing inquiry request information is transmitted, verifying an erasing determination result received from the information management server apparatus and, when the erasing determination result represents that an erasing process is possible, generating an erasing process request including a management ID;

a program code configured to cause the electronic medium control apparatus to execute a process of, on the basis of the erasing process request, adding discarding time and date information to the management file management table to erase a management file substance, erasing an operation time and date and an operation type of the access log table, updating the user information and the management ID, and notifying of a process result including the management ID representing the erased management file;

a program code configured to cause the electronic medium control apparatus to execute a process of generating a discarding notification forming request including the process result;

a program code configured to cause the electronic medium control apparatus to execute a process of, on the basis of the discarding notification forming request, forming a discarding notification includes the management ID of the erased management file, and notification information constituted by the apparatus information of the electronic medium control apparatus, the user information and the forming time and date information of the notification in a header portion;

a program code configured to cause the electronic medium control apparatus to execute a process of transmitting the discarding notification to the information management server apparatus;

a program code configured to cause the electronic medium control apparatus to execute a process of, on the basis of a discarding completion notification received from the information management server apparatus which has invalidated the management ID on the basis of the discarding notification, writing a discarding time and date in association with the management ID of the management file management table, storing a log of process completion in the access log table, and generating a process result; and a program code configured to cause the electronic medium control apparatus to execute a process of, on the basis of the process result, notifying an input source of the erasing request of erasing process completion of the management file to complete the process.

* * * * *